US012675331B2

(12) United States Patent
Rhyu et al.

(10) Patent No.: US 12,675,331 B2
(45) Date of Patent: Jul. 7, 2026

(54) METHOD AND DEVICE FOR PROVIDING SPLIT COMPUTING BASED ON DEVICE CAPABILITY

(71) Applicant: Samsung Electronics Co., Ltd., Gyeonggi-do (KR)

(72) Inventors: Sungryeul Rhyu, Gyeonggi-do (KR); Hyunkoo Yang, Gyeonggi-do (KR); Hakju Lee, Gyeonggi-do (KR); Eric Yip, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 689 days.

(21) Appl. No.: 18/074,874

(22) Filed: Dec. 5, 2022

(65) Prior Publication Data

US 2023/0176915 A1    Jun. 8, 2023

(30) Foreign Application Priority Data

Dec. 7, 2021    (KR) ......................... 10-2021-0174255

(51) Int. Cl.
*G06F 9/50* (2006.01)
*G06F 1/20* (2006.01)
*G06T 19/00* (2011.01)

(52) U.S. Cl.
CPC ............ *G06F 9/5044* (2013.01); *G06F 9/505* (2013.01); *G06T 19/006* (2013.01); *G06F 1/20* (2013.01)

(58) Field of Classification Search
CPC .......... G06F 9/5044; G06F 9/505; G06F 1/20; G06F 9/4893; G06F 2209/5019; G06F 2209/509; G06T 19/006; H04L 67/59; H04L 67/131; H04L 67/303; H04L 67/63; H04W 4/50; H04W 8/22
See application file for complete search history.

(56) References Cited

U.S. PATENT DOCUMENTS

| | | | |
|---|---|---|---|
| 11,370,391 | B1 * | 6/2022 | Gammelgard .. B60W 60/00256 |
| 12,154,094 | B2 * | 11/2024 | Spender ............. G06Q 20/4014 |
| 2015/0248341 | A1 | 9/2015 | Cabrera et al. |
| 2016/0358537 | A1 * | 12/2016 | Kang ....................... G09G 3/20 |
| 2017/0302972 | A1 * | 10/2017 | Zhang ................... H04L 65/762 |
| 2017/0311011 | A1 | 10/2017 | Jana et al. |
| 2019/0068299 | A1 | 2/2019 | Ikeda et al. |

(Continued)

OTHER PUBLICATIONS

3GPP TR 26.998 V1.1.0, 3rd Generation Partnership Project; Technical Specification Group SA; Support of 5G Glass-Type Augmented Reality / Mixed Reality (AR/MR) Devices: (Release 17), Nov. 2021, 118 pages.

(Continued)

*Primary Examiner* — Peng Ke

(74) *Attorney, Agent, or Firm* — The Farrell Law Firm, P.C.

(57) ABSTRACT

A method and device for capability-based split computing is disclosed. The method includes detecting an abnormal status of a user equipment (UE) based on an environment parameter for a device and a performance parameter of the device; transmitting, to a server, a message including UE capability information related to the environment parameter and the performance parameter; receiving, from the server, information related to adjusted content and an adjusted process according to the UE capability information, and executing the adjusted process to receive the adjusted content.

20 Claims, 45 Drawing Sheets

(56) References Cited

U.S. PATENT DOCUMENTS

| | | | | |
|---|---|---|---|---|
| 2020/0245029 | A1 | 7/2020 | Mitchell | |
| 2020/0409451 | A1* | 12/2020 | Mukherjea | G06T 19/006 |
| 2022/0066543 | A1 | 3/2022 | Rhyu et al. | |
| 2022/0230061 | A1* | 7/2022 | Singh | G06V 10/761 |
| 2023/0135220 | A1* | 5/2023 | Sodagar | H04L 65/80 |
| | | | | 345/633 |

OTHER PUBLICATIONS

International Search Report dated Mar. 7, 2023 issued in counterpart application No. PCT/KR2022/019228, 6 pages.

\* cited by examiner

CAS capability KPI 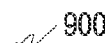 900

| Information element | Status | Cardinality |
|---|---|---|
| Availability | O | Percentage of time the application is allowed to be available for the CAS's use. |
| Compute | O | The compute resources available by the CAS. |
| Graphical Compute | O | The graphical compute resources available by the CAS. |
| Memory | O | The memory resources available by the CAS. |
| Storage | O | The storage resources available by the CAS. |
| Latency | O | The latency to complete process by the CAS. |

| Attribute name | Data type | Cardinality | Description |
|---|---|---|---|
| mediaConsumed | string | 1..1 | Identifies the media consumed. In the case of DASH, the value of the Representation@id attribute shall be quoted. |
| startTime | DateTime | 1..1 | The time when this consumption reporting unit started. |
| duration | DurationSec | 1..1 | The duration of this consumption reporting unit. |
| downloadToDisplayLatency | DurationSec | 0..1 | Device latency from download, decode, render to displayer (in second). |
| renderingLatency | DurationSec | 0..1 | Rendering time (in second). |
| frameDropped | Percentage | 0..1 | The percentage of frames that were not rendered and dropped compared to the target fps of the content in recent n seconds. |

| Information element | Status | Cardinality |
|---|---|---|
| List oF AC characteristics (NOTE 1) | O | Describes the ACs for which a matching EAS is needed. |
| > AC profile (NOTE 2) | M | AC profile containing parameters used to determine matching EAS. AC profiles are further described in Table8.2.2-1 |
| List of EAS characteristics (NOTE 1, NOTE 3) | O | Describes the characteristic of required EASs. |
| > EASID | O | Identifier of the required EAS. |
| > EAS provider identifier | O | Identifier of the required EAS provider. |
| > EAS type | O | The category or type of required EAS (E.G. V2X) |
| > EAS schedule | O | Required availability schedule of the EAS (e.g. time windows) |
| > EAS Geographical Service Area | O | Location(s) (e.g. geographical area, route) where the EAS service should be available. |
| > EAS Topological Service Area | O | Topological area (e.g. cell ID, TAI) for which the EAS service should be available. See possible formats in Table 8.2.7-1 |
| > Service continuity support | O | Indicates if the service continuity support is required or not. |
| > EAS status | O | Required status of the EAS (e.g. enabled, disabled, etc.) |
| > Service permission level | O | Required level of service permissions e.g. trial, gold-class |
| > Service feature(s) | O | Required service features e.g. single vs. multiplayer gaming service |
| NOTE 1 : Only one of the information elements shall be present<br>NOTE 2 : "Preferred ECSP list" IE shall not be present.<br>NOTE 3 : The "List of EAS characteristics" IE must includa at least one optional IE, if used as an EAS discovery filter. | | |

FIG. 34

AC Service KPI 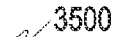 3500

| Information element | Status | Cardinality |
| --- | --- | --- |
| Connection bandwidth | O | The required connection bandwidth in Kbit/s for the application. |
| Request rate | O | The request rate to be generated by the AC. |
| Response time | O | Response time (NOTE) required for the server servicing the requests. |
| Availability | O | Percentage of time the server is required to be availability for the AC's use. |
| Compute | O | The compute resources required by the AC. |
| Graphical Compute | O | The graphical compute resources required by the AC. |
| Memory | O | The memory resources required by the AC. |
| Storage | O | The storage resources required by the AC. |
| NOTE : The response time includes the round-trip time of the request and response packet, the processing time at the server and the time required by the server to consume 3GPP core network capabilities, if any. | | |

FIG. 35

METHOD AND DEVICE FOR PROVIDING SPLIT COMPUTING BASED ON DEVICE CAPABILITY

CROSS-REFERENCE TO RELATED APPLICATION(S)

This application is based on and claims priority under 35 U.S.C. § 119 to Korean Patent Application No. 10-2021-0174255, which was filed in the Korean Intellectual Property Office on Dec. 7, 2021, the entire disclosure of which is incorporated herein by reference.

BACKGROUND

1. Field

The disclosure relates generally to a method and device for providing split computing based on device capability in a communication system.

2. Description of the Related Art

To meet the demand for wireless data traffic soaring since fourth generation (4G) communication system came to the market, there are ongoing efforts to develop enhanced fifth generation (5G) communication systems or pre-5G communication systems. For the reasons, the 5G communication system or pre-5G communication system is called the beyond 4G network communication system or post long term evolution (LTE) system.

For higher data transmit rates, 5G communication systems are considered to be implemented on ultra-high frequency bands (mmWave), such as, e.g., 60 GHz. To mitigate pathloss on the ultra-high frequency band and increase the reach of radio waves, the following techniques are taken into account for the 5G communication system, beamforming, massive multi-input multi-output (MIMO), full dimensional MIMO (FD-MIMO), array antenna, analog beamforming, and large scale antenna.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and reception interference cancellation.

Other various schemes are also under development for the 5G system including, e.g., hybrid frequency shift keying (FSK) and quadrature amplitude modulation (FOAM) and sliding window superposition coding (SWSC), which are advanced coding modulation (ACM) schemes, and filter bank multi-carrier (FBMC), non-orthogonal multiple access (NOMA) and sparse code multiple access (SCMA), which are advanced access schemes.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network, a machine-tomachine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

The components of a computing device may dynamically receive voltage to operate. A component may be constituted of, e.g., tens of billions of gates. The number of gates associated/used may vary depending on computation load or specific algorithms. The voltage applied to the component to drive the gates varies depending on the number of gates that are simultaneously used. Typically, the gate has the electrical characteristic that heat generation is proportional to the usage (voltage and current).

FIG. 1 illustrates a read/write performance according to an increase in heat generation. FIG. 1 illustrates changes over time in temperature $(T_c)$ measured by the thermal sensor of the computing device.

Referring to FIG. 1, as shown in the dashed circle lines in area (a), the performance of the component may deteriorate when heat is generated. After performance deterioration occurs due to heat, the processing performance may not be recovered for a while even at the normal temperature as shown in area (b).

FIG. 2 illustrates power leakage due to an increase in temperature.

Referring to FIG. 2, the power leakage due to die (failure) temperature is shown as a percent relative to the total power, and the die temperature is proportional to current leakage.

FIG. 3 illustrates voltage adjustment and clock adjustment according to increases in temperature.

Referring to FIG. 3, when a predetermined temperature of heat or higher is generated, heat generation adjustment, voltage adjustment, or adjustment of the clock speed of a central processing unit (CPU) may be performed. When a sharp temperature rise occurs in area (a), the voltage adjustment may be performed as in area (b), or the clock frequency adjustment may be performed as in area (c). The temperature of the CPU may be reduced by the voltage adjustment or the clock frequency adjustment.

The extended reality (XR) service may include virtual reality (VR), augmented reality (AR), or mixed reality (MR). AR glasses user equipment (UE) according to 3GPP TR 26.998 may have a stand-alone AR (STAR) architecture or edge-dependent AR (EDGAR) architecture and operate according to at least one of the above architectures.

In the STAR architecture, the UE itself may process content. In the EDGAR architecture, the UE requests content from a cloud/edge server (also referred to as an edge/cloud server), downloads and pre-processes content for offloading.

In the STAR architecture, the UE itself is capable of processing content and, if the UE capability is insufficient, the UE may operate in the EDGAR architecture.

In two or more computing devices, if the complexity of one or more process tasks applied to one device (e.g., UE) is higher than that the device can process under a given processing condition (e.g., frame per second (fps)), the device sends some of the process tasks to another device, receives the result from the other device, and completes the task. This procedure is called offloading.

The 5G AR glass study (TR 26.998) standard of 3GPP SA4, discusses composing and representing AR content with a scene, virtual object, and media for the virtual object to treat the reality/virtual object merging process for AR. As an example of offloading, in a UE architecture for EDGAR (5G edge-dependent AR) type glasses (e.g., glass-type device) supporting AR split rendering, the UE receives content and transmits the content to the AR scene manager of the 5G cloud/edge server, and the AR scene manager creates simple content (e.g., an image including a lightweight scene and rasterized two dimensional/three dimensional (2D/3D) rendering output), and the UE receives the created content and generates an AR effect. The UE may perform a process on the rendering output, which is rendered and encoded by the server after a required time and then received by the UE, for removing inconsistency between image and position due to a change in the UE's position after the required time (e.g., movement of the user's head or body on which the AR glasses are worn).

The standard includes a provisioning phase in which the UE transmits content to the 5G cloud/edge server and receives a server resource necessary to play the content.

A system is needed for providing an integrated process service, with the system including two or more devices and processes performed by the devices. Each process may be connected to the inputs or outputs of one or more other processes.

Since the integrated process provides the results of the processes performed by the two or more devices, if a temporal requirement is included in providing the result, the performance of all of the devices constituting the system should be recognized, and the complexity of the type of the process to be performed by each device should be considered in the integrated process configuring phase to for quality considerations. As an example, according to AR split rendering, which is considered in the conventional art (3GPP TR 26.998, TR 26.803, or TS 23.558), the UE's vision engine (or simultaneous localization and mapping (SLAM) or spatial computing) process gathers information about the user's pose (e.g., position and/or direction) and transfers the information to the AR scene manager (e.g., scene manager process) of the server, and the server's renderer (e.g., renderer process) generates the received pose into a 2D rasterized image or physically based rendering image. The encoder process of the server image-compresses (i.e., encodes) the physically based rendering image and transfers the compressed image to the UE. The decoder process of the UE decodes the encoded image received from the server, and a pose corrector process of the UE compares the pose received from the server with the user's final pose, warps/corrects the decoded image as much as a difference, and then outputs it through the display.

AR split rendering may provide augmented reality only when the image of the final result matches the user's gaze direction and head position. If the UE's performance information is not provided to the server, the image may be displayed on the UE later than the target time and thus fails to match the user's pose. If pose mismatch occurs, a position difference may occur between the real and virtual objects viewed by the user. Thus, augmented reality cannot be provided. Since the UE is in charge of a part of the integration process, the execution time of the process to be performed by the UE may be varied depending on the performance of the UE. However, problems with conventional systems include not providing UE's performance information to the server.

In conventional systems (3GPP TR 26.998, TR 26.803, or TS 23.558), the server may create an edge application server (EAS) instance that meets the key performance indicator (KPI) required by the UE in the provisioning phase and execute the processes.

For example, the AR conversational service considered in TR 26.998 supports a multi-party scenario in which several people attend an AR conference. However, as more and more users attend and AR object rendering increases, it is necessary to consider changes in complexity added to the scene manager process or render process of the server.

Further, if the UE's performance is reduced due to a change in the performance of the UE, the integrated process may need to be reconstructed. For example, if the UE fails to execute the vision engine process, the UE should transmit the output of the process to gather information through the camera and sensor, not to its vision engine process but to the server, and the server should additionally perform the vision engine process and pose correction process for the UE.

SUMMARY

The disclosure has been made to address at least the above-mentioned problems and/or disadvantages and to provide at least the advantages described below. According to an aspect, a method is provided for providing capability-based split computing that includes detecting an abnormal status of a UE based on at least one of an environment parameter for a device and a performance parameter of the device; transmitting, to a server, a message including UE capability information related to the at least one of the environment parameter and the performance parameter; receiving, from the server, information related to adjusted content and an adjusted process according to the UE capability information; and executing the adjusted process to receive the adjusted content.

According to another aspect, a UE is provided that is configured to provide capability-based split computing, the UE including a transceiver and a processor that is configured to detect an abnormal status of the UE based on at least one of an environment parameter for a device and a performance parameter of the device; transmit, to a server, a message including UE capability information related to the at least one of the environment parameter and the performance parameter; receive, from the server, information related to adjusted content and an adjusted process according to the UE capability information; and execute the adjusted process to receive the adjusted content.

BRIEF DESCRIPTION OF THE DRAWINGS

The above and other aspects, features, and advantages of certain embodiments will be more apparent from the following description taken in conjunction with the accompanying drawings, in which:

FIG. 9 illustrates a format of a CAS capability KPI reported to a UE according to an embodiment;

FIG. 10 illustrates a format of a consumption report provided by a UE according to an embodiment;

FIG. 34 illustrates information elements of an EAS discovery filter according to an embodiment;

FIG. 35 illustrates an AC service KPI for transferring device capability according to an embodiment.

DETAILED DESCRIPTION

Figure 1:
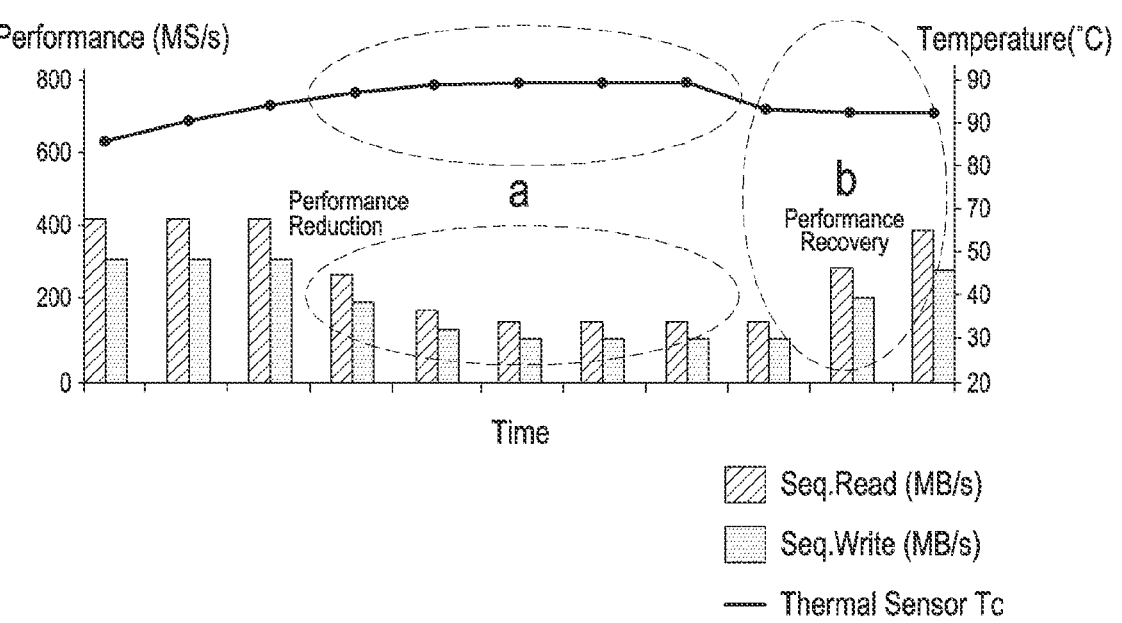
FIG. 1 illustrates a read/write performance according to an increase in heat generation.
Figure 2:
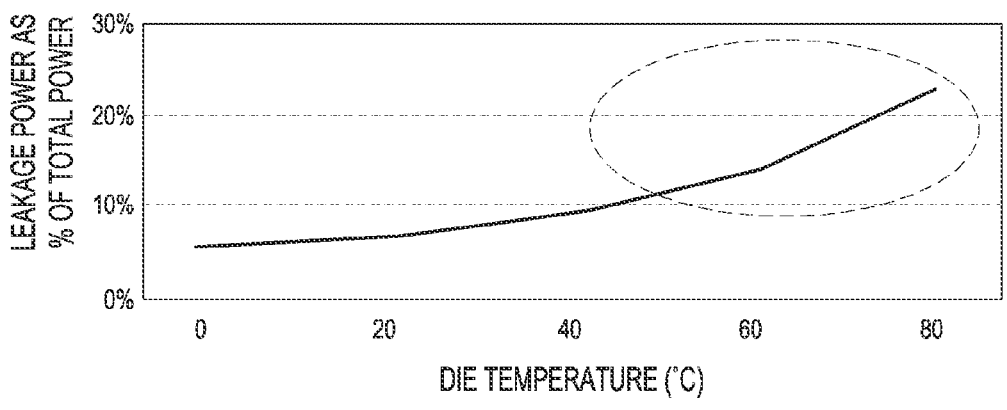
FIG. 2 illustrates power leakage due to an increase in temperature.
Figure 3:
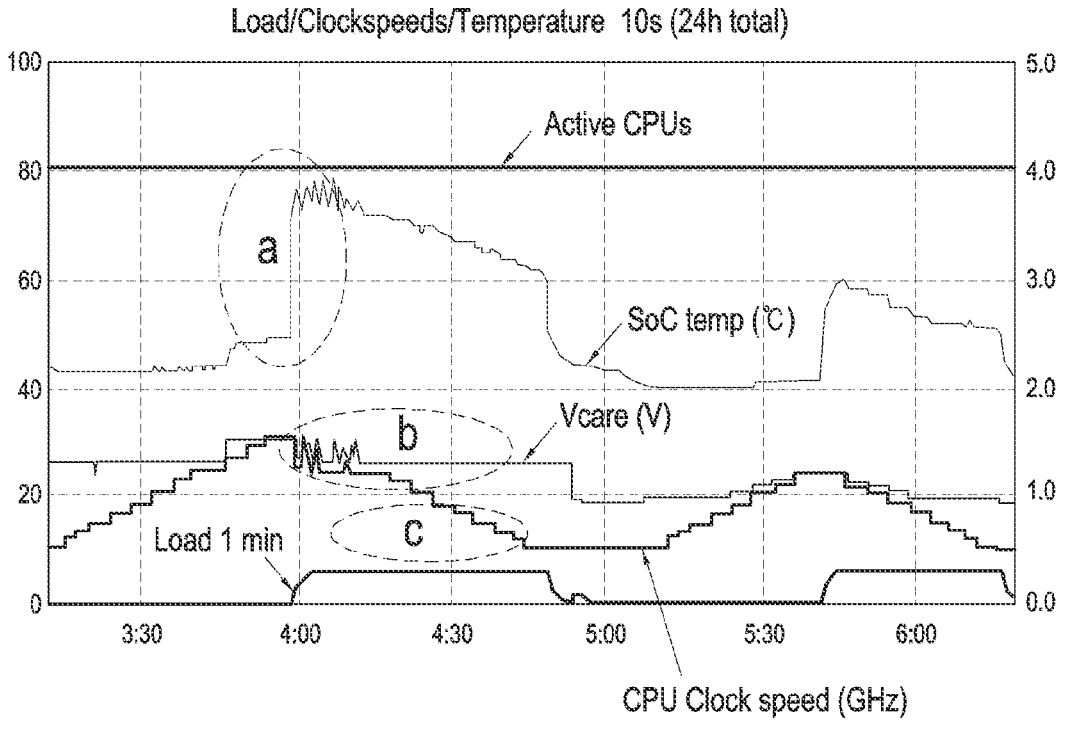
FIG. 3 illustrates voltage adjustment and clock adjustment according to increases in temperature.

Hereinafter, embodiments are described in detail with reference to the accompanying drawings.

In describing the embodiments, the description of technologies known in the art and not directly related to the disclosure is omitted. This is for further clarifying the gist of the disclosure without making it unclear.

For the same reasons, some elements may be exaggerated or schematically shown. The size of each element does not necessarily reflect the actual size of the element. The same reference numeral is used to refer to the same or similar elements throughout the drawings. Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term unit means a software element or a hardware element. The unit plays a certain role. However, the term unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more central processing units (CPUs) in a device or a security multimedia card. According to embodiments, a unit may include one or more processors.

The terminal may include a UE, a mobile station (MS), a cellular phone, a smartphone, a computer, or a multimedia system capable of performing communication functions. The embodiments may also apply to other communication systems with similar technical background or channel form. Further, embodiments may be modified in such a range as not to significantly depart from the scope under the determination by one of ordinary skill in the art and such modifications may be applicable to other communication systems.

As used herein, terms for identifying access nodes, terms denoting access nodes/network entities or network functions (NFs), terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

In the disclosure, a communication system may use various wired or wireless communication systems, e.g., the new RAN, which is the radio access network, and the packet core (5G system, or 5G core network, or next generation core (NG core)), which is the core network, according to the 5G communication standard of the 3GPP which is a radio communication standardization organization. Embodiments of the disclosure may also be applicable to communication systems with a similar technical background with minor changes without significantly departing from the scope of the disclosure.

Further, as used herein, the terms indicating network entities, messages, and information transmitted/received between network entities are provided as an example for convenience of description. Thus, the disclosure is not limited by the terms, and such terms may be replaced with other terms denoting objects with equivalent technical concept.

The technical background of various embodiments is related to a device, the issue with performance changes in the device, processing of a high-performance process applied to the device, and offloading capable of processing the high-performance process using an external device, and embodiments are described primarily focusing on the 3GPP 5G AR glass standards for the case study.

System Configuration

The following embodiments describe is an integrated process system including a power model and device capability determining unit (capability & performance evaluator) for a device (e.g., UE or UE device) and an integrated management process for a server (e.g., cloud/edge server).

The integrated process system relates to a device, performance changes in the device, processing of a high-performance process applied to the device, and offloading capable of processing the high-performance process using an external device.

The device may be assigned a certain process for execution thereof. The execution capability and processing capability within a unit time of the device may be varied each moment due to internal/external factors.

The device may independently process the assigned process or may process the assigned process with an external device. The device may be implemented as a mobile terminal for the user, such as a mobile phone or tablet, a laptop computer, a desktop computer, a server, a cloud, an edge computing device, a virtual machine, or a server.

Figure 4:
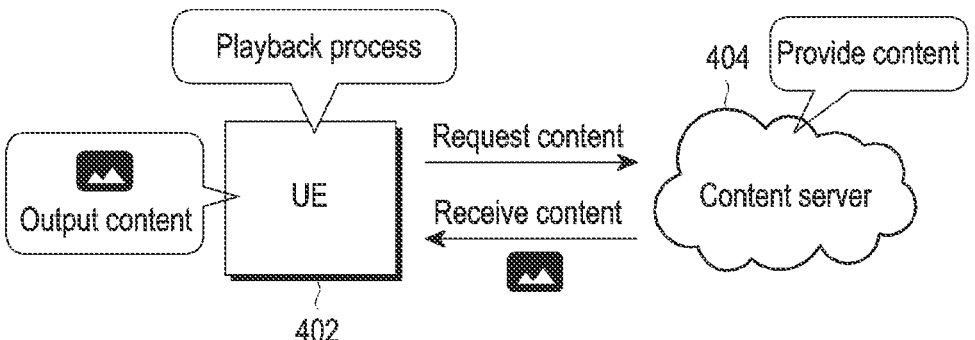
FIG. 4 illustrates a single device processing a process according to an embodiment.

FIG. 4 illustrates a single device processing a process according to an embodiment.

Referring to FIG. 4, a device 402 (e.g., UE) and a content server 404 are shown. The content server 404 may store content (e.g., media content) and transmit the stored content to the UE 402 according to a content request from the UE 402. The UE 402 may play the received content through a playback process. The UE 402 may have the capability for performance sufficient to play the received content without the aid of another device or, in may request content from the content server 404, for content having a complexity level at which the UE may play without the aid of another device (e.g., cloud/edge server). For example, the UE 402 having a 2.5K (2560×1440) display may request 2K (1920×1080) content, but not 4K (3840×2160) content.

Figure 5:
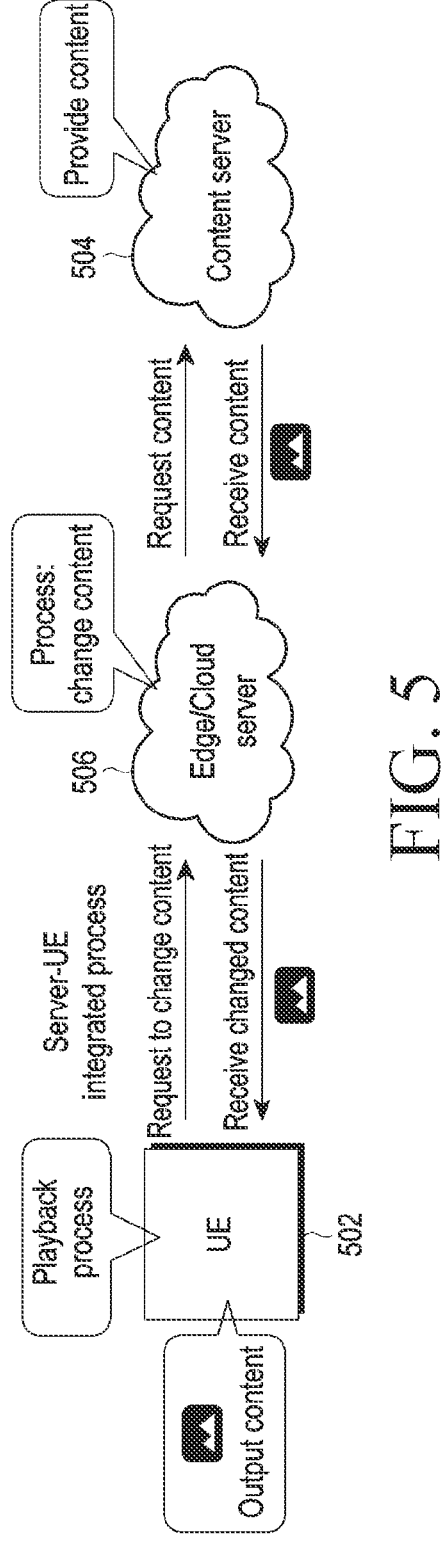
FIG. 5 illustrates offloading in which a device processes a process assigned thereto, with an external device according to an embodiment.

FIG. 5 illustrates offloading in which a device processes a process assigned thereto, with an external device according to an embodiment.

Referring to FIG. 5, a device 502 (e.g., UE), a cloud/edge server 506, and a content server 504 (or content provider) are shown. Upon determining that the content to be requested has a complexity level at which the UE 502 independently may process the content, the UE 502 may use the processing capability of the cloud/edge server 506. The UE 502 may request the cloud/edge server 506 to receive content from the content server 504, downscale to fit the resolution of the UE 502 (e.g., 4K to 2.5K resolution), and encode the downscaled image. The cloud/edge server 506 may receive content according to the request, convert the image of the received content, and transmit it to the UE 502. The UE 502 may play the converted content based on its own processing capability.

As another example requiring offloading, AR split rendering may be considered. AR is technology of adding virtual objects to the real world to look real. Since the UE device (e.g., an AR UE device), such as AR glasses, is put on the user's face, the computing performance of the UE device is typically limited as compared with other UEs, such as mobile phones or laptop computers. According to AR split rendering, the vision engine (or SLAM/spatial computing) process of the UE (e.g., the AR UE device) may gather the user's pose (e.g., position and/or direction) and transfer the information to the AR scene manager of the server, and the renderer process of the server may render the received pose to generate a 2D rasterized image or physically based rendering image, and the encoder process of the server may image-compress (i.e., encode) the rendering image and transfer it to the UE. The decoder process of the UE may decode the encoded image received from the server, and the pose corrector process of the UE may compare the pose received from the server with the user's final pose, warp/ correct the decoded image to correct any position difference, and then output it through the display.

That is, a difference may occur between the time when the UE transfers the pose to request the result and a time after processing by the server is completed and the UE's post processing is also completed. The difference may be, e.g., tens to hundreds of ms. The user may freely move during the period corresponding to the difference, and the position of the UE may change if the user is not fixed or otherwise intends to remain motionless. Thus, rather than performing rendering according to the requested pose, the server may estimate and perform rendering a future pose that is to be taken by the user at a future time to be displayed on the UE. The UE may perform a pose corrector process to offset the differences between the estimated pose and estimated time, and the final (future) pose and final time.

In AR split rendering, the UE performs processes, such as decoding and pose correction, on the received content. The time required to execute/handle the process may vary depending on changes in the UE capability. Thus, the virtual object image which is the content received from the server by the UE may not properly match the real world where UE belongs, so that an AR effect may not occur.

Figure 6:
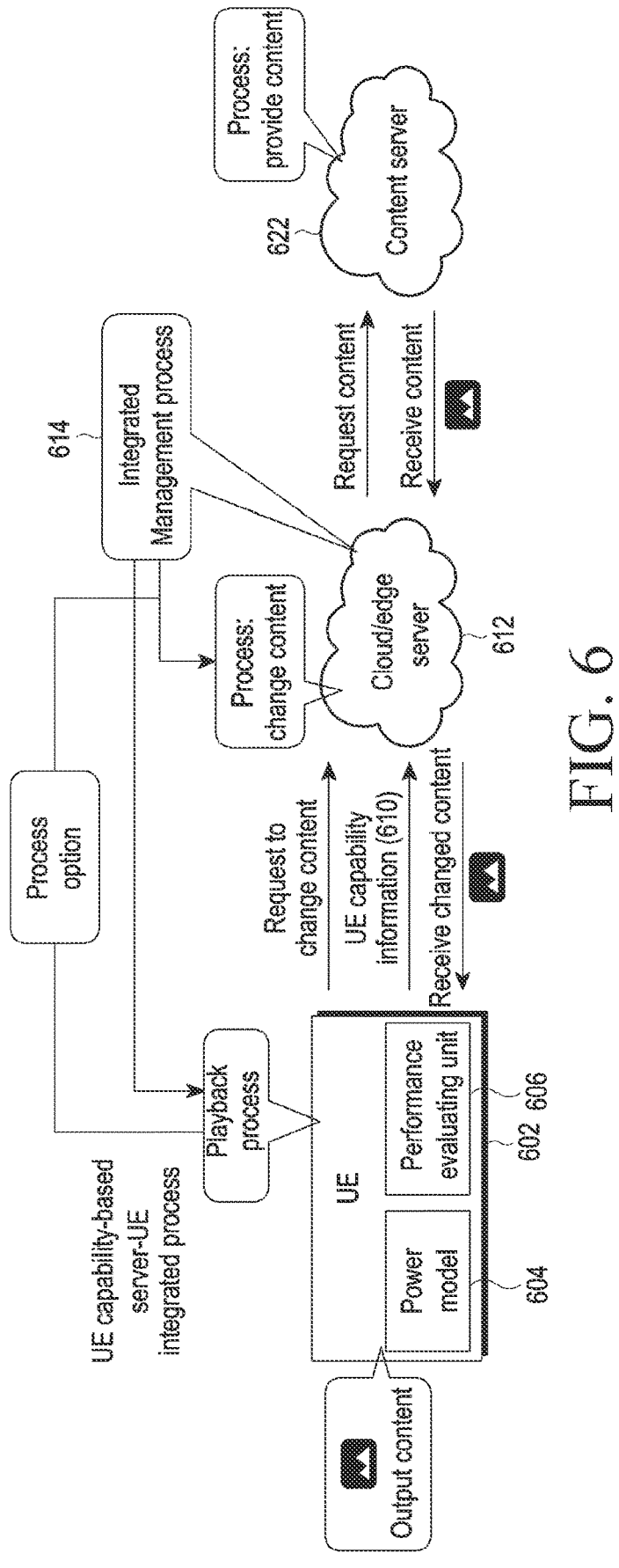
FIG. 6 illustrates a configuration of an integrated process system according to an embodiment.

FIG. 6 illustrates a configuration of an integrated process system according to an embodiment.

Referring to FIG. 6, an integrated process system may include at least one device 602 (e.g., a UE, a UE device, or an AR UE device), a cloud/edge server 612 (alternatively referred to as an edge/cloud server), and a content server 622 (or content provider). The device 602 may include one or more processes executed on the device 602. The cloud/edge server 612 may include an integrated management process 614. The device 602 may include an internally executed process (e.g., a playback process), and the device 602 or each process executed by the device 602 may have, internally or externally, its own power model 604 and a performance evaluating unit 606 capable of determining performance.

The device 602 may be assigned one or more processes by the integrated management process 614 and the device 602 is configured to perform the assigned one or more processes.

The processes of device 602 may be connected to respective inputs and/or outputs of other processes of other devices.

The power model 604 may include a relation formula or value table that uses environment parameters (or a parameter set), which may be obtained from the device 602 or each process, as its input, and the performance parameters (or parameter set), which may be performed by the device 602 or each process, as its output.

The power model 604 may be created and updated by a manufacturer of the device 602, a third party, or the components of the device 602.

For example, the power model 604 may include temperature and/or transmission bandwidth of the modem included in the device 602. For example, the power model 604 may be configured to detect the temperature and/or be configured to read performance of a memory included in the device 602. For example, the power model 604 may detect the temperature of a graphic processing unit (GPU) included in the device 602 and/or the image compression frame rate of the encoding process.

The power model for the device 602 may detect conditions at which each component optimally performs. As a certain condition (e.g., environmental parameter) is changed (e.g., temperature rise), the performance parameter (e.g., read speed) of the component may change or may change sharply after a predetermined threshold. Among ranges of condition values, a range in which no or a relatively small performance change occurs is referred to as a normal range, and a range in which an abrupt change in performance occurs is referred to as an abnormal range.

Figure 7:
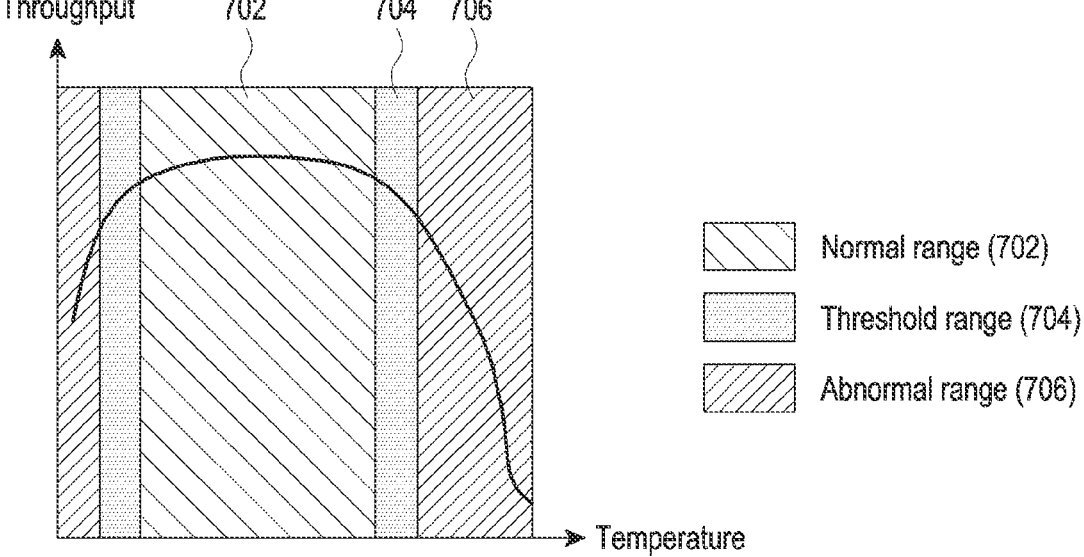
FIG. 7 illustrates a normal range and an abnormal range according to a power model.

FIG. 7 illustrates a normal range and an abnormal range according to a power model.

Referring to FIG. 7, for the value of the environment parameter, a threshold range 704 is present between the normal range 702 and the abnormal range 706.

Although the environment parameter returns to the normal range 702 after entering the abnormal range 706 according to the component, recovery of performance of the component may temporarily be reduced by a down time. (e.g., refer to area b of FIG. 1.)

It is preferable that the process executed by the device 602 or component observe the power model 604, and determine a process load within the normal range. Despite remaining within the normal range, it is preferable to minimize a chance of down time by preemptively reducing the process load before entering the threshold range 704 or the abnormal range 706.

The performance evaluating unit 606 (FIG. 6) of the process or the device 602 may report UE capability information 610 indicating the performance and change in performance of the device 602 or the process to the integrated management process 614. The device 602 or the process may change the complexity of the process within a range that is allowed by the integrated management process 614. Thus, the integrated management process 614 may analyze a performance change or process complexity change occurring in one or more devices (e.g., the device 602) or one or more processes based on the UE capability information 610, change the process to be executed by the device 602 or another device, and then assign the changed process to the device 602, thereby providing a capability-based integrated process service.

Figure 8A:
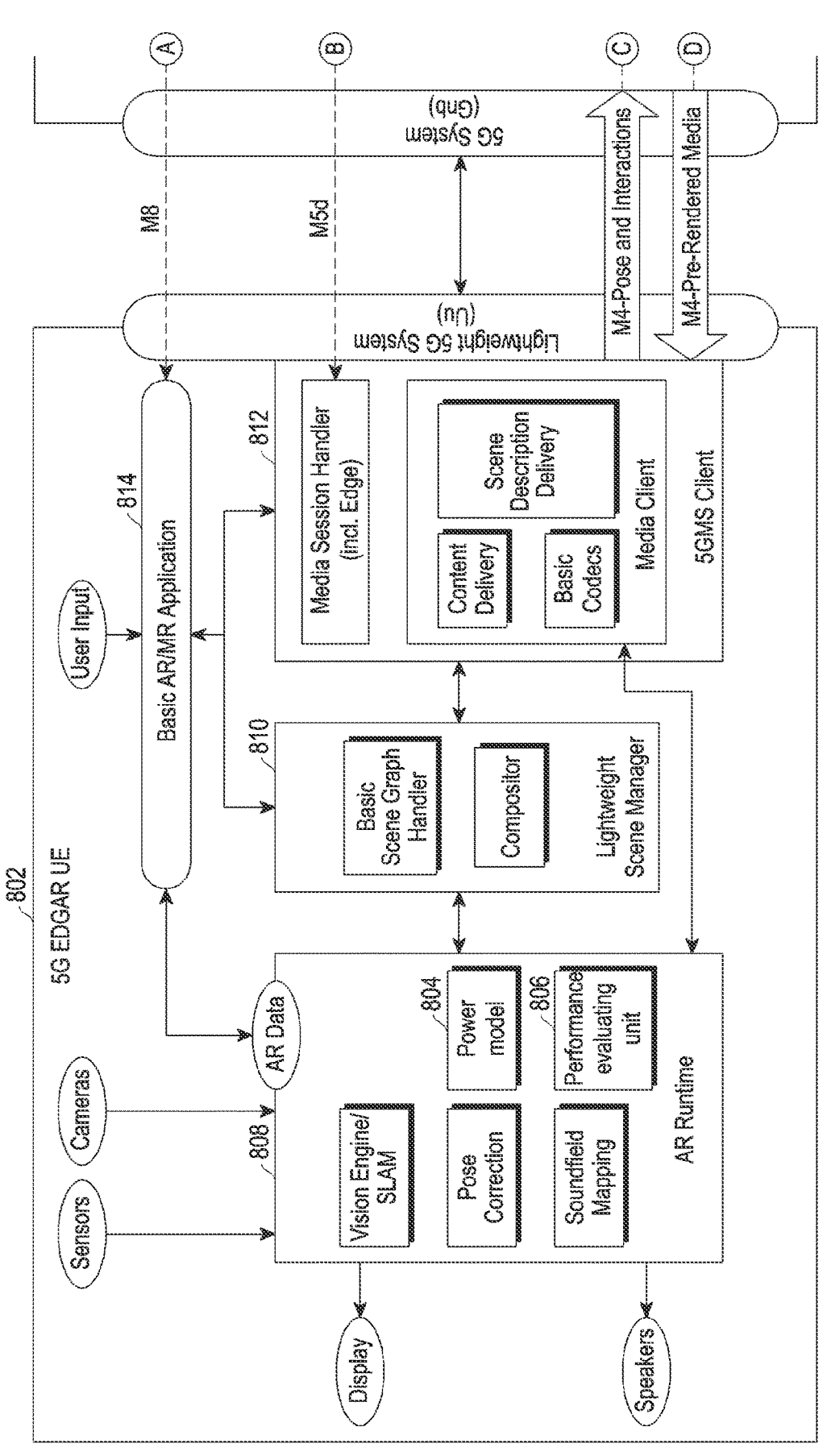
FIGS. 8A and 8B) illustrate a configuration of a UE according to an embodiment.
Figure 8B:
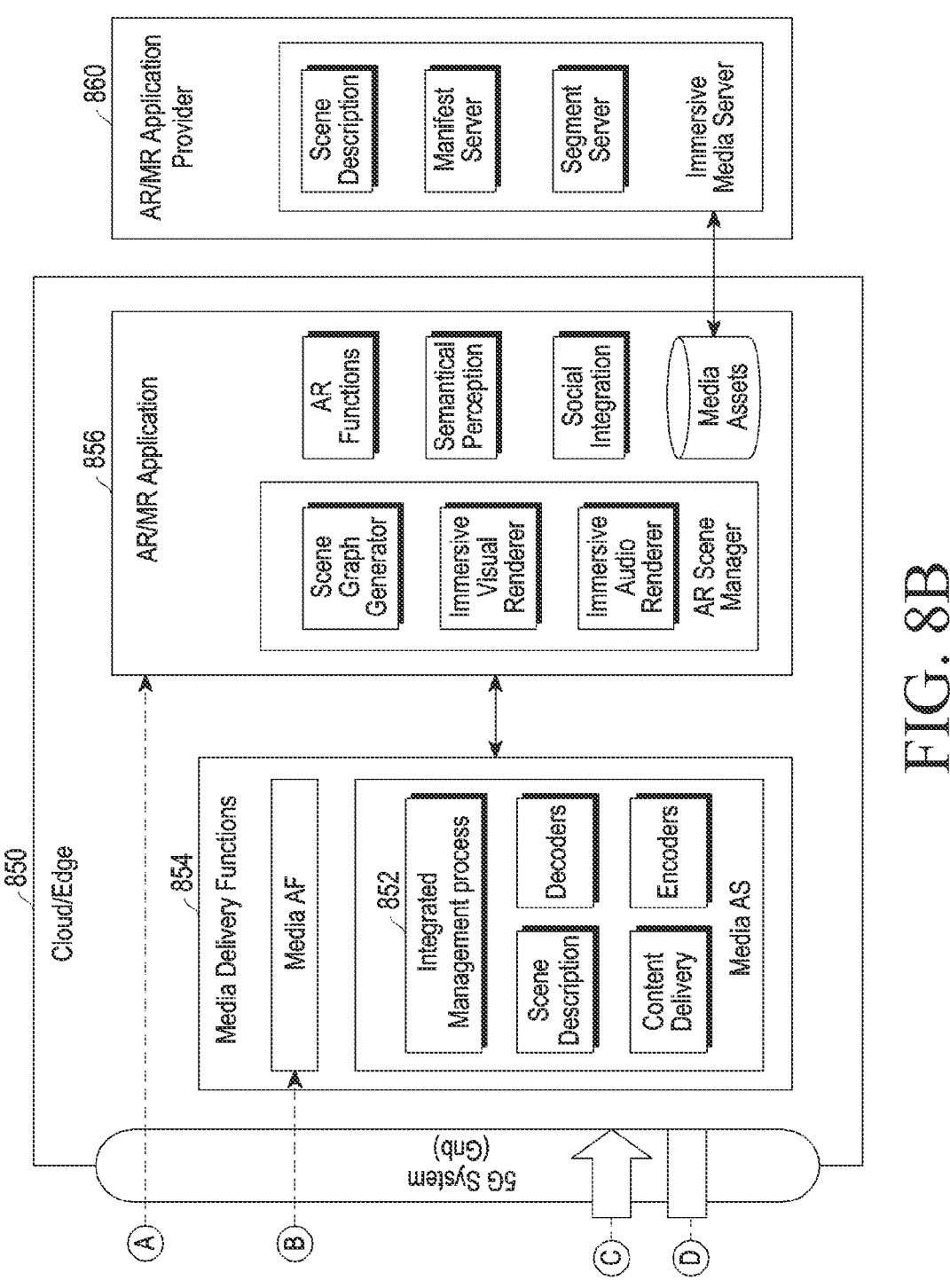

FIGS. 8A and 8B) illustrate a configuration of a UE according to an embodiment. The UE device 802 may be, e.g., a 3GPP TR 26.998 based 5G glass type AR/MR UE device.

Referring to FIG. 8, a UE device 802 (e.g., device 602 of FIG. 6) (e.g., 5G EDGAR UE) may include external input/ output components (or peripherals), e.g., at least one of sensors, displays, cameras, speakers, or user inputs.

The UE device 802 may include basic components, such as a CPU, a GPU, a random access memory (RAM), or storage, as understood by one of skill in the art.

The UE device 802 may include at least one of the following function blocks:

5G media streaming (5GMS) client 812 (or media access function or interactive immersive client) for communicating with 5G system, i.e., a set of functions that enable access to media and other AR-related data necessary to provide an AR experience;

AR runtime function block 808 for AR service, i.e., a set of functions for interfacing with a platform;

AR scene manager 810 (or lightweight scene manager or basic scene manager) for AR service, i.e., a set of functions that support an application for arranging a logical spatial representation of a multisensorial scene based on support by the AR runtime function block 808;

AR application 814 (or basic AR/MR application), i.e., a software application that integrates audio-video content into the user's real environment.

The 5GMS client 812 may include at least one of the following functions (or processes):

Scene description/content delivery; or codecs.

The AR scene manager 810 may include at least one of the following functions (or processes):

Scene graph handler; or

Composer.

The AR runtime function block 808 may include at least one of the following functions (or processes):

Vision engine (or SLAM, or spatial computing, or XR spatial compute), i.e., AR functions that process sensor data to generate information about the 3D space surrounding AR users;

Pose correction: a function that helps the user to stabilize AR media,

Soundfield mapping;

Power model 804 (e.g., the power model 604); or

Performance evaluating unit (capability & performance evaluator) 806 (e.g., the performance evaluating unit 606)

According to an embodiment, as shown in FIG. 8B, the cloud/edge server 850 (e.g., the cloud/edge server 612 (e.g., a 3GPP TR 26.998-based 5G glass-type AR/MR server) may include the following function blocks:

Media delivery functions 854;

AR/MR application 856, i.e., an application function (AF) for determining various policies related to service reception of the UE (e.g., the UE 802); and UE capability-based integrated management process 852.

The integrated management process 852 may be executed in the media application function (media AF), the EAS in the media application server (media AS), or the application service provider (e.g., the application provider 860) according to the service provider's service configuration.

The AR/MR application provider 860 (e.g., the content server 622) may include network-based AR functions and AR content components (scene description, manifest server, and/or segment server) for providing AR content to the UE (e.g., the UE 802) by rendering.

Performance Determination

The performance determination may be made based on the following:

Environment parameters (or parameter set); and/or

Performance parameters (or parameter set).

The performance evaluating unit (e.g., the performance evaluating unit 606 or 806) may determine whether the performance level of the device or process is abnormal based on environment parameters which may be obtained from the device (e.g., the UE device 602 or 802) or the process, performance parameters which may be performed by the device or process, and power model (e.g., the power model 604 or 804) and may determine whether to report to the integrated management process (e.g., the integrated management process 614 or 852) and perform appropriate processing.

The environment parameters of the device and/or process may include, but are not limited to, at least one of temperature, voltage, or operation frequency.

The temperature (or heat generation state) may include at least one of the current temperature of the device (e.g., the UE device 602), duration of the current temperature, or temperature rise rate within a predetermined recent time period. The device or the components of the device may identify a (temperature) value measured by an embedded sensor and report the temperature value (status) to the performance evaluating unit 606 or 806. The heat for the entire device may be determined by using a separate shared sensor or by comprehensively considering the values measured by the respective sensors for the components, and/or mutual positions of the components that are heat sources or considering weights assigned to each of the heat source components.

The performance parameters of the device and process may include processing capability. The processing capability may include the input/output transmission rate of the UE itself and/or hardware (HW) or software (SW) components of the UE. The HW components of the UE may include at least one of a memory, a GPU, a display camera, a network, or a CPU. The SW components of the UE may include at least one process of a plurality of processes, i.e., the AR runtime, AR scene manager, media access function, rendering, location tracking (vision engine/spatial computing), or entry point processing.

For example, the processing capability of the memory read process may be expressed as the bytes read per second. The processing capability of the encoding process may be expressed as the number of frames encoded per second. The performance of the vision engine may be expressed as six degrees of freedom (6DoF) or number of coordinates recognized per second.

The device and process may have the performance parameter varied depending on a change in the environment parameter. The performance evaluating unit 606 or 806 may infer the value of the performance parameter by inputting the current environment parameter value or measure the actual performance parameter value and determine whether the performance parameter value is within the normal range 702, the abnormal range 706, or the threshold range 704 according to the power model 604.

If the environment value or performance value of the device and process is within the threshold range, the performance evaluating unit 606 or 806 may notify the integrated management process 614 or 852 of the abnormal status of the device and process for the optimal performance of the device and process. Thereafter, the performance evaluating unit 606 or 806 may be given a new process instruction from the integrated management process 614 or 852, or determine to select another option on the process manifest (or processing manifest) (e.g., process manifest file) received to perform the current process. If even the lowest option on the received process manifest may not be met, a request for a wider range of process manifest may be sent to the integrated management process 614 or 852.

UE Capability Information

The UE capability information 610 (also referred to as performance information or performance report information) which may be transferred to the server (e.g., the cloud/edge server 612 or 850) by the UE (e.g., the UE device 602 or 802) may include at least one of the following information:

Temperature;

Throughput;

Latency; and/or

Capability/KPI.

The UE may report information about user preference to the server.

The performance evaluating unit (e.g., the performance evaluating unit 606 or 806) may report the environment parameter or performance parameter of the device (e.g., the UE 602 or 802) and the process to the integrated management process (e.g., the integrated management process 614 or 852) in the server (e.g., the cloud/edge server 612 or 850).

The environment parameters that may be measured by a component (e.g., the CPU, memory, storage, camera, or sensor) of the device, the device, or the processor may include at least one of temperature, voltage, or operation frequency.

The performance parameters that may be measured by a component (e.g., the CPU, memory, storage, camera, or sensor) of the device, the device, or the process may include at least one of input/output speed or processing speed.

The performance evaluating unit 606 or 806 may use the processing target which is varied depending on the device and process and the indicator and indicator value that may represent the result of performing according to the processing target, as the performance parameter.

For example, a device that performs late-stage projection on the received image and outputs it on the display may use the downloadToDisplayLatency, which is the time taken from the reception to the output, as the indicator and the performance parameter. For example, a process or device component that performs only rendering may use the rendering command and renderingLatency, which is the time taken from the reception of the target content to rendering, as the indicator and the performance parameter. For example, a device that outputs the input image may use frameDropped, which is the number of frames dropped due to failure to process within the processing time in the output of the received image, as the indicator and the performance parameter.

The capability of handling the process by the device or the capability of the resource allocated to the process may be used as the performance parameter of the device and process. For example, at least one of availability, compute, graphical compute, memory, storage, or latency may be included in the capability of the resource allocated to perform the process of the entire capability of the device. The description and definition of each resource may follow 3GPP TS 23.558.

In the cloud/edge architecture being considered in 3GPP, such as in 3GPP TR 26.803 and TS 23.558, process execution in the UE is considered, or the processing unit (e.g., the EAS in edge) to execute/handle the process to be executed in the UE is not considered.

To support UE capability-based server-UE integrated process service, the UE (e.g., the UE device 602 or 802) may execute the process indicated by the service provider (e.g., the content server 622), and the performance of the processing unit in the UE capable of executing the process may be reported to the process (e.g., the integrated management process 614 or 852) managing the integrated process service or the service provider (e.g., the content server 622). In the embodiments described below, before introducing the processing unit, performance indicator information about the UE, the component of the UE, or the process executed in the UE is transferred to the server (e.g., the cloud/edge server 612 or 850) and, in the disclosure, the processing unit executing the process in the UE is defined as a cloud application server (CAS), and embodiments in which the UE reports the performance of the CAS are described herein.

For example, the AC service KPI disclosed in Table 8.2.3.1 of TS 23.558 may include performance requirements required by the UE's application client (AC). In certain embodiments, the CAS capability KPI may represent the performance that the UE's CAS may provide.

The CAS may execute/handle the process received by the UE directly from the application provider (or application service provider) (e.g., the content server 622 or the application provider 860) or received by the UE through the 5GMS-aware application and application client. As an example, the media stream handler or the AC disclosed in FIG. 8 of 3GPP TR 26.803 may be the CAS. When the AC or the media stream handler is executed in the UE, the UE capability information may be included in the CAS capability KPI and reported to the server (e.g., the cloud/edge server 612 or 850).

FIG. 9 illustrates a format of a CAS capability KPI reported to a UE according to an embodiment.

Referring to FIG. 9, the CAS capability KPI 900 may include at least one information element among availability, compute, graphical compute, memory, storage, or latency. 3GPP TS 23.558 is to be referenced for definition of the information fields.

The device or process may include the environment parameter and per-indicator performance parameters in, e.g., the CAS capability KPI 900 and report them to the integrated management process.

In an embodiment, in case of AR split rendering, the result rendered by the server (rendered output) may be displayed on the UE. The UE may provide information about the time taken from the reception of the rendered result to the display to the server, and the server may predict the time to be taken until the next frame is to be displayed based on the time information and may predict better the future user position at a future time accordingly.

FIG. 10 illustrates a format of a consumption report provided by a UE according to an embodiment.

The consumption reporting unit 1000 may include at least one attribute field, e.g., mediaConsumed, startTime, duration, downloadToDisplayLatency, renderingLatency, or frameDropped, as illustrated in FIG. 10. The attribute fields are discussed herein, with details provided by reference to 3GPP TS 26.512. At least one of downloadToDisplayLatency, renderingLatency, or frameDropped may be used to indicate the UE's status.

Communication methods for transmitting the status from the UE to the server may include other reporting messages and dynamic adaptive streaming over HTTP (DASH) quality of experience (QoE)-related schemes, as well as the consumption reporting unit 1000, and the information to be transferred in embodiments may be added to various reporting messages and DASH QoE-related schemes, and are not limited to the consumption reporting unit 1000.

downloadToDisplayLatency indicates the time taken by the UE from reception of the rendered result to display (latency from download, decode, (rendering) to display) and may be reflected in whether motion to photon (MTP) is achieved, and correction of future position/time of contiguous future frame.

renderingLatency indicates the time taken to render one frame in greater detail than downloadToDisplayLatency and is the time taken for the UE to decode one or more media and position the decoded one or more media on 3D and composite them. If renderingLatency is long (e.g., larger than a threshold), the server may decrease the complexity of single media and/or correct the complexity related to the number of media.

frameDropped (or fpsRendered) indicates the number of frames that are not finally rendered relative to the target fps of content (for the latest n seconds) but dropped.

In the AR split rendering system using the 3GPP TS26.501 5GMS architecture, the above information may be added, as one attribute of the report sent to the application function (AF) by the media session handler (MSH) through the M5 interface.

Figure 23A:
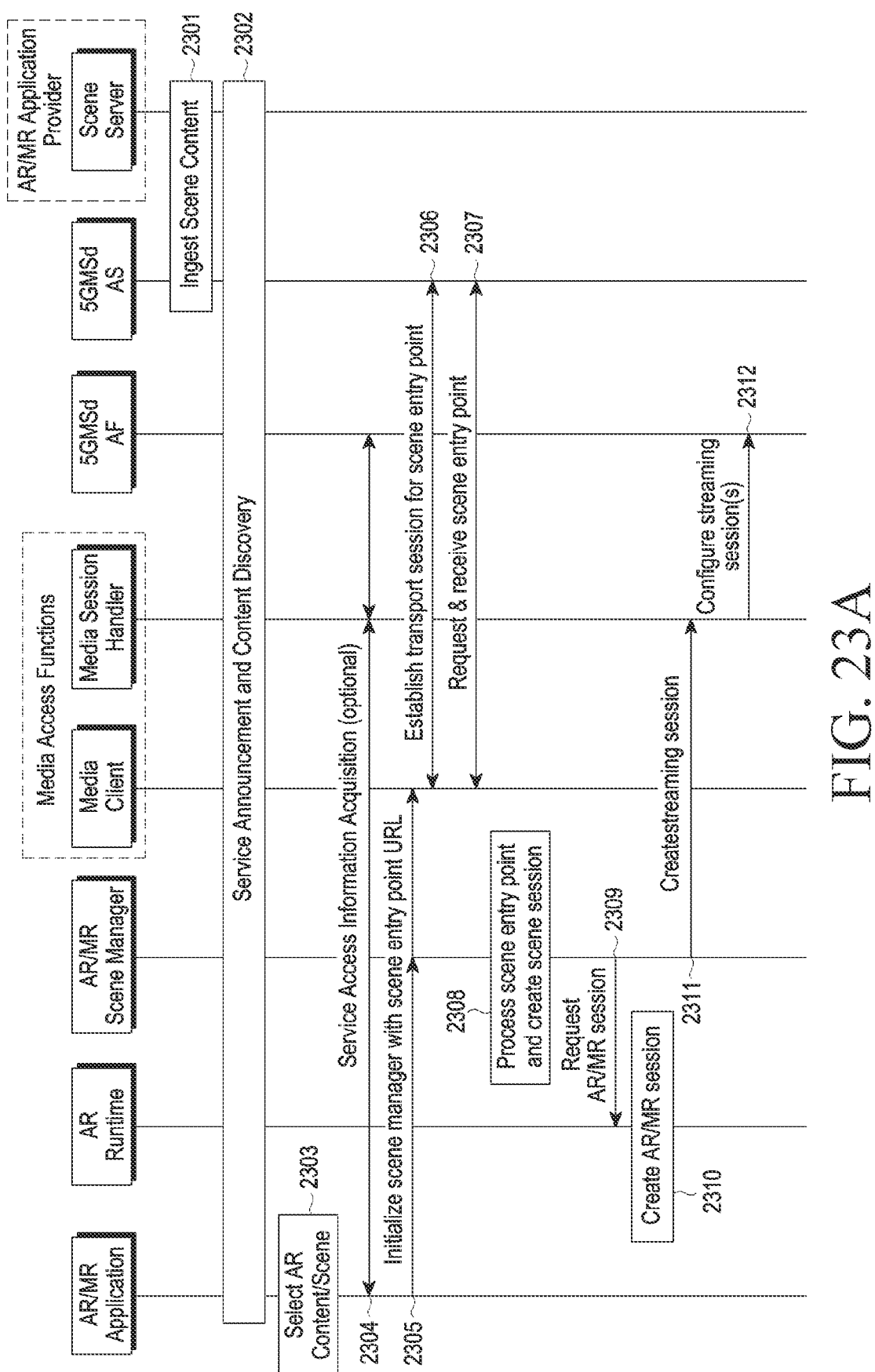
FIGS. 23A and 23B illustrate a STAR-based call according to an embodiment.
Figure 23B:
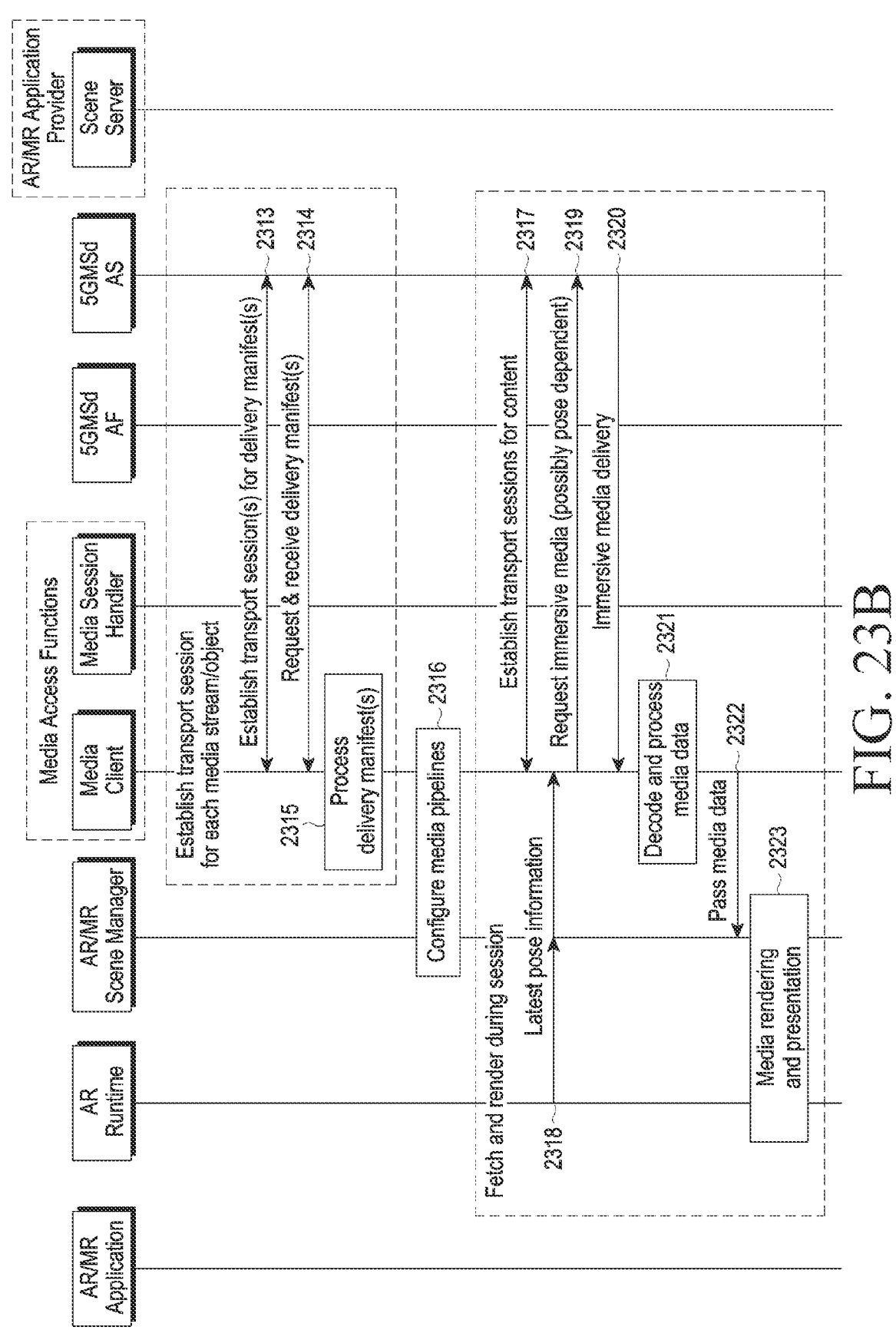

Information about the user preference reported by the UE may be transmitted in the middle of, e.g., a procedure for downlink streaming (e.g., shown in FIGS. 23A and 23B). For example, as in the procedure described below in connection with FIG. 24, the UE may identify the user's preferred specifications, and the preferred specifications, along with UE capability information, may be provided to the server (e.g., the AR/MR scene manager). The UE may indicate the user preference, along with the UE capability information, based on a user preferred specification expression scheme, and the server may specify the influenced user preference, as additional information, in the process's option and provide it to the UE.

For example, when providing the process manifest to the UE, the server may specify whether the user preference is influenced for each process option and the degree in the process manifest. When selecting a process option, the UE may select an item of an option that does not harm the user preference based on the user preference which are influenced, included in the process manifest.

Performance Reporting

The UE capability information may be provided in the provisioning phase.

In the provisioning phase for initiating a service of the 3GPP TR 26.998 STAR architecture STAR streaming flowchart (e.g., STAR-based procedure for 5G downlink streaming of FIG. 6.2.4.1-1 of 3GPP TR 26.998), at least one of the M8 interface (e.g., as described herein regarding FIG. 11) between the UE's AR/MR application (e.g., the AR/MR application 814) and the AR/MR application provider (e.g., the AR/MR application provider 860) (e.g., the content server), the M5 interface (e.g., as described herein regarding FIG. 12) between the UE's media session handler and the media AF (application function), or the M4 interface (as described herein regarding FIG. 13) which is a content downlink/uplink path between the UE's media client and the server's media application server (AS) may be used to transfer UE capability information.

In the provisioning phase for initiating a service in the 3GPP TR 26.803 streaming architecture extension for edge processing (EMSA) architecture, the EDGE-5 and EDGE-1 interface (e.g., as described herein regarding FIG. 14) of the client call flow or the M6 and M5 interface (e.g., as described herein regarding FIG. 15) of the split rendering call flow may be used.

The UE capability information may be provided in the streaming progress phase.

At least one of the STAR-based streaming phase (e.g., as described herein regarding FIG. 16), EDGAR-based streaming phase (e.g., as described herein regarding FIG. 17), STAR interactive scene session-based streaming phase (e.g., as described herein regarding FIG. 18), or STAR interactive media session-based streaming phase (e.g., as described herein regarding FIG. 19) may be used.

As described above, the operation in which the UE (e.g., the device or UE device) independently identifies UE capability information and reports the UE capability information may be performed in the provisioning phase in which the UE, together with the server, prepares for a service and secures resources to initiate a service, and/or in the streaming phase in which provisioning is completed, and the secured resources are used to perform the service.

In the STAR architecture, the UE may provide UE capability information to the server in the content and provisioning request phase for initiating a service (e.g., call flow of FIG. 6.2.3.1-1 of 3GPP TR 26.998). The server may determine the level of the content to be provided to the UE based on the received UE capability information and provide information on receiving of content according thereto to the UE.

Figure 11:
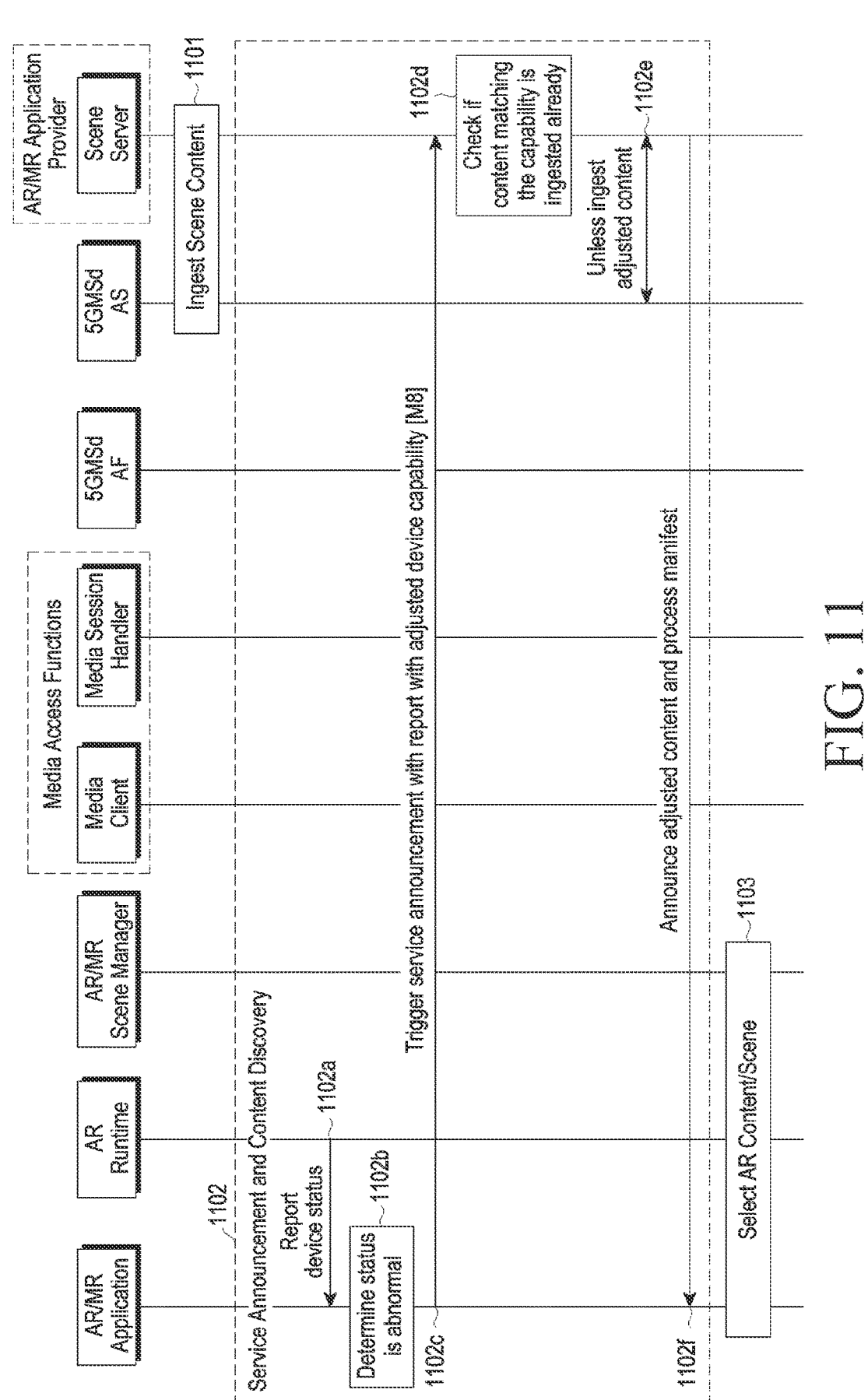
FIG. 11 illustrates an operation of providing UE capability information through an M8 interface in a STAR-based call flow procedure for downlink streaming according to an embodiment.

FIG. 11 illustrates an operation of providing UE capability information through an M8 interface in a STAR-based call flow procedure for downlink streaming according to an embodiment. The UE's AR/MR application and the content server (e.g., the AR/MR application provider) may communicate through the M8 interface of 3GPP 5GMS. The STAR architecture of FIG. 22, as discussed herein, may be referenced for the UE and the content server.

Referring to FIG. 11, in operation 1101, the server (e.g., the cloud/edge server 612 or 850) may ingest scene content of the AS (e.g., media AS). Operation 1102 is a service announcement and content discovery triggered by the UE's AR/MR application and may include operations 1102*a* to 1102*f*. In operation 1102*a*, the UE's AR/MR application may receive the device status from the AR runtime. As shown in FIG. 8A, the AR runtime 808 may identify the statuses of major functions and the hardware components such as a sensor by the power model 804 and the performance evaluating unit 806. In operation 1102*b*, the AR/MR application may identify whether the UE's status is normal or abnormal (e.g., performance degradation) based on the device status. For example, when the UE's status is abnormal, operation 1102*c* may proceed.

In operation 1102*c*, the UE's AR/MR application may trigger the service announcement including a report (e.g., UE capability information) for the adjusted device capability (e.g., adjusted device capability value) through the M8 interface to request to change the UE capability recognized by the server. The adjusted device capability may indicate UE requirements for the content server. In operation 1102*d*, the scene server of the content server may identify whether an available content option (e.g., content meeting the performance of the UE requirement) for the received adjusted UE capability value is present in the AS of the cloud/edge server and, when available content is not present, the content server, in operation 1102*e*, may provide the adjusted content (e.g., content meeting the performance of the UE requirement) to the AS of the cloud/edge server. In operation 1102*f*, the server's AS may provide the adjusted content and process manifest to the UE's AR/MR application through an announcement procedure.

In operation 1103, the UE's AR/MR application may select desired media content. Thereafter, the UE may perform subsequent operations (e.g., operations 2304 to 2323 of FIG. 23A and FIG. 23B) to receive the selected media content from the AS of the cloud/edge server.

Figure 12:
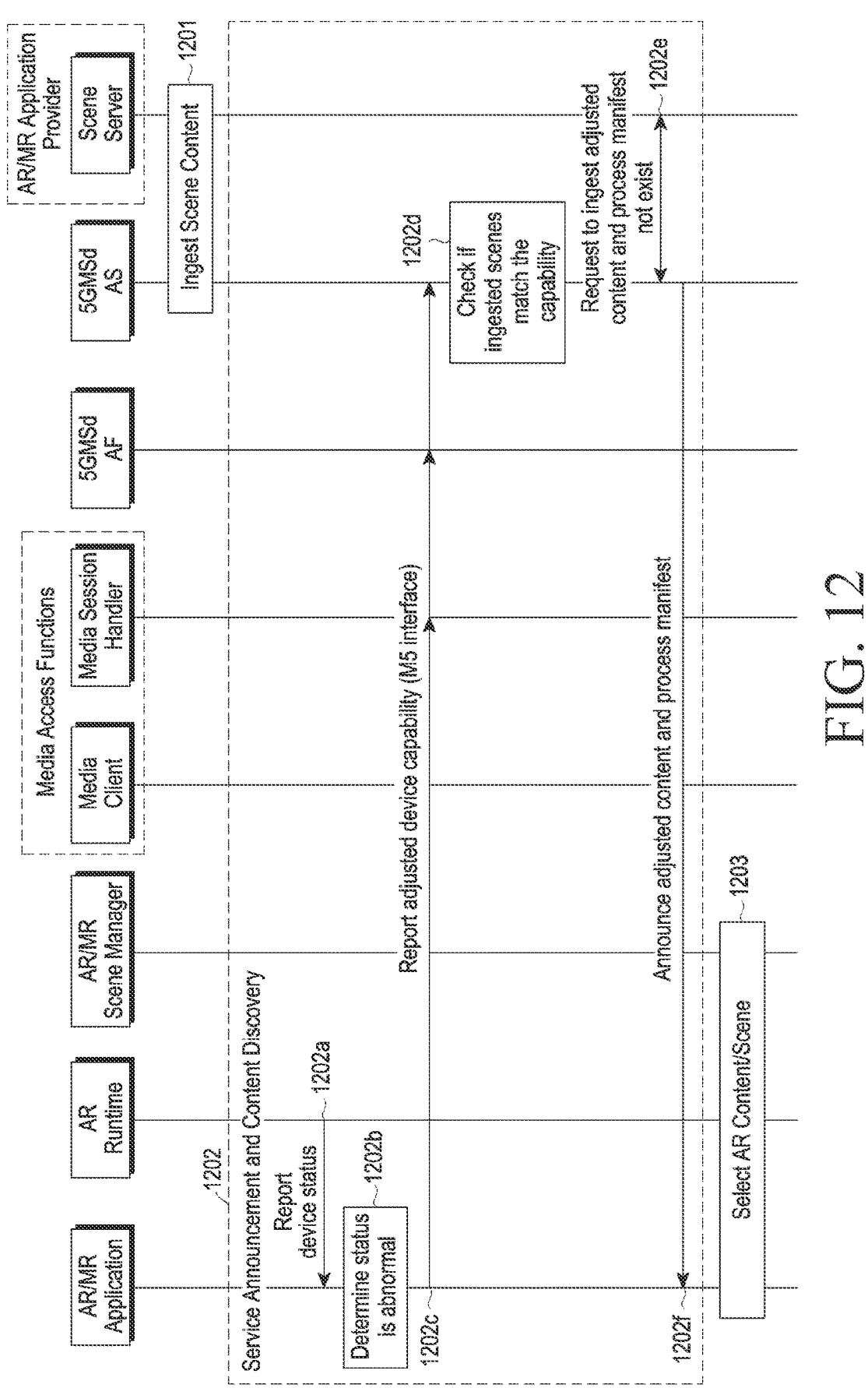
FIG. 12 illustrates an operation of providing UE capability information through an M5 interface in a STAR-based call flow procedure for downlink streaming according to an embodiment.

FIG. 12 illustrates an operation of providing UE capability information through an M5 interface in a STAR-based call flow procedure for downlink streaming according to an embodiment. For the UE and the content server, the STAR architecture of FIG. 22A and FIG. 22B may be referenced.

Referring to FIG. 12, in operation 1201, the server (e.g., the cloud/edge server 612 or 850) may ingest scene content of the AS (e.g., media AS). Operation 1202 is a service announcement and content discovery triggered by the UE's AR/MR application and may include operations 1202a to 1202f.

In operation 1202a, the UE's AR/MR application may receive the device status from the AR runtime. In an embodiment, as shown in FIG. 8A and FIG. 8B, the AR runtime 808 may include HW components, such as a sensor, and functions, and identify the statuses of the HW components and functions by the power model 804 and the performance evaluating unit 806.

In operation 1202b, the AR/MR application may identify whether the UE's status is normal or abnormal (e.g., performance degradation) based on the device status. For example, when the UE's status is abnormal, operation 1202c may proceed.

In operation 1202c, the AR/MR application may report the UE status (e.g., as UE capability information) including the adjusted device capability through communication (e.g., M5 interface) between the 5GMSd AF (e.g., media AF) of the cloud/edge server 850 and the media session handler in the UE's media access function (e.g., the media access function 812), and the UE status may be transferred through communication between 5GMSd AF and 5GMSd AS.

In operation 1202d, the media AS of the server may identify whether content meeting the device capability is present in the UE status, that is, whether the content is ingested from the AR/MR application provider (e.g., the AR/MR application provider 622).

In operation 1202e, when content meeting the device capability is not received, the media AS may request the AR/MR application provider to ingest adjusted content meeting the device capability, and the adjusted content may be ingested by the media AS.

In operation 1202f, the adjusted content may be announced from the media AS to the UE's AR/MR application.

In operation 1203, the UE's AR/MR application may select desired media content (e.g., the adjusted content). Thereafter, the UE may perform subsequent operations (e.g., operations 2304 to 2323 of FIG. 23A and FIG. 23B) to receive the selected media content from the AS of the cloud/edge server.

Figure 13:
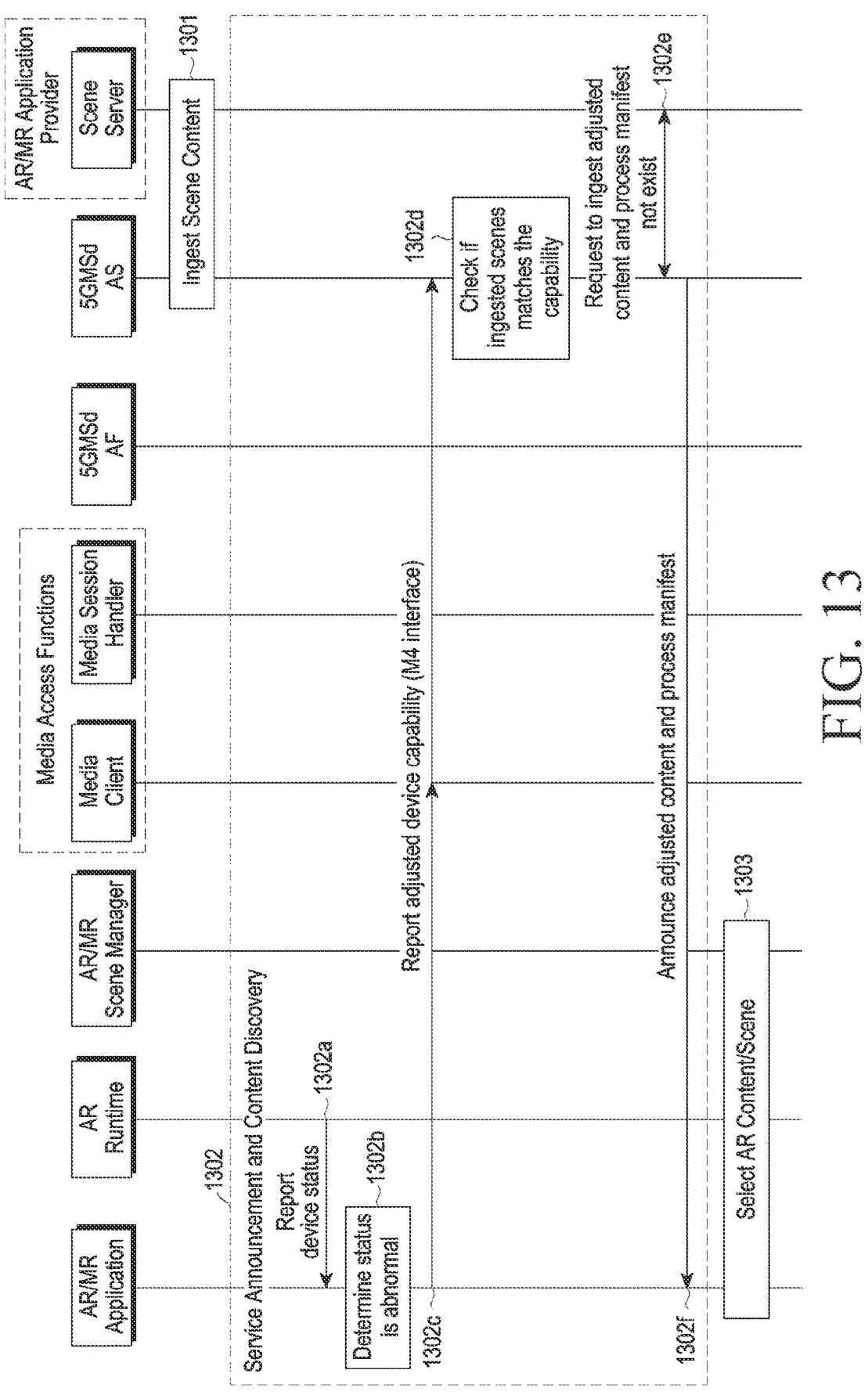
FIG. 13 illustrates an operation of providing UE capability information through an M4 interface in a STAR-based call flow procedure for downlink streaming according to an embodiment.

FIG. 13 illustrates an operation of providing UE capability information through the M4 interface in a STAR-based call flow procedure for downlink streaming according to an embodiment. In an embodiment, for the UE and the content server, the STAR architecture of FIG. 22A and FIG. 22B may be referenced.

Referring to FIG. 13, in operation 1301, the server (e.g., the cloud/edge server 612 or 850) may ingest scene content of the AS (e.g., media AS). Operation 1302 is service announcement and content discovery triggered by the UE's AR/MR application and may include operations 1302a to 1302f.

In operation 1302a, the UE's AR/MR application may receive the device status from the AR runtime. In an embodiment, as shown in FIG. 8, the AR runtime 808 may include HW components, such as a sensor, and functions, and identify the statuses of the HW components and functions by the power model 804 and the performance evaluating unit 806.

In operation 1302b, the AR/MR application may identify whether the UE's status is normal or abnormal (e.g., performance degradation) based on the device status. For example, when the UE's status is abnormal, operation 1302c may proceed.

In operation 1302c, the AR/MR application may report the UE status (e.g., as UE capability information) including the adjusted device capability through communication (e.g., the M4 interface) between the 5GMSd AS (e.g., media AS) of the cloud/edge server 850 and the media client in the UE's media access function (e.g., the media access function 812).

In operation 1302d, the media AS of the server may identify whether content meeting the device capability is present in the UE status, that is, whether the content is ingested from the AR/MR application provider (e.g., the AR/MR application provider 622).

In operation 1302e, when content meeting the device capability is not received, the media AS may request the AR/MR application provider to ingest adjusted content meeting the device capability, and the adjusted content may be ingested by the media AS.

In operation 1302f, the adjusted content may be announced from the media AS to the UE's AR/MR application.

In operation 1203, the UE's AR/MR application may select desired media content (e.g., the adjusted content). Thereafter, the UE may perform subsequent operations (e.g., operations 2304 to 2323 of FIG. 23A and FIG. 23B) to receive the selected media content from the AS of the cloud/edge server.

Figure 14:
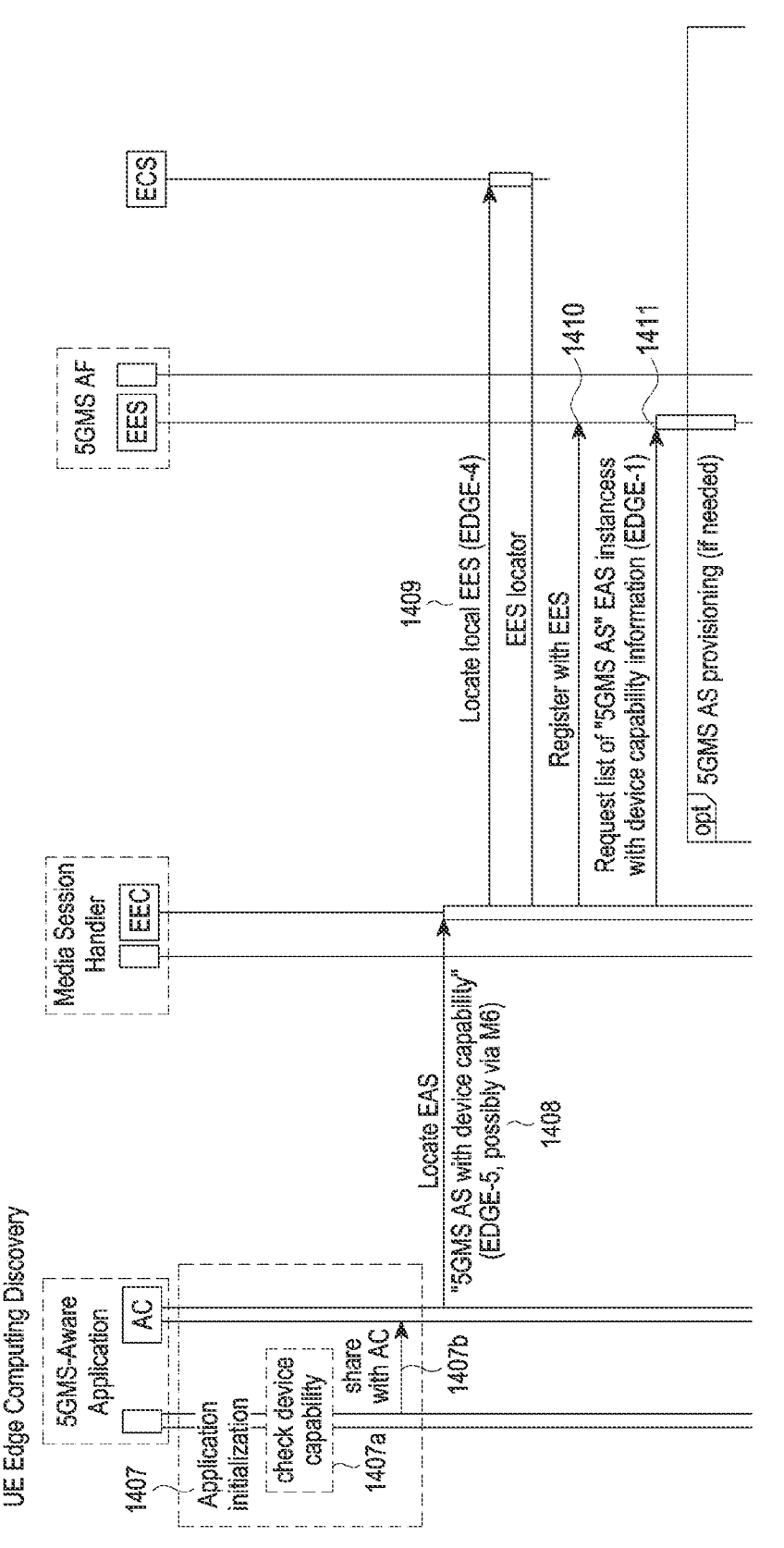
FIG. 14 illustrates an operation of providing UE capability information in a UE driving call flow according to an embodiment.

FIG. 14 illustrates an operation of providing UE capability information in a UE driving call flow according to an embodiment. The illustrated procedure may refer to, e.g., client-driven session establishment of FIG. 9 of 3GPP TS 26.803.

Referring to FIG. 14, in the provisioning phase for service initiation, operation 1407 for application initialization may include operations 1407a and 1407b. In operation 1407a, the UE's application (e.g., 5GMS-aware application) may identify device capability for the application provider to be able to distribute processes through the UE and the server considering UE capability. In operation 1407b, the 5GMS-aware application may share the identified device capability with the AC in the 5GMS-aware application. In operation 1408, the AC may transfer the device capability to the edge enabler client (EEC) in the media session handler.

In operation 1409, the EEC may inquire the edge configuration server (ECS) to find a suitable edge enabler server (EES). In operation 1410, the EEC may register with the selected EES.

In operation 1411, the EEC may contact the EES to include information (as UE capability information) indicating the device capability related to the UE status in the message for inquiring about the list of EAS instances capable of providing 5GMS AS capability. The EEC may use EAS discovery filters to contact the EES. The EES may determine a necessary KPI of the EAS considering an additional process according to the UE's device capability in allocating an EAS supporting split rendering. The EEC may request the EAS providing a split rendering service along with the UE's current device capability, from the EES. The EES may determine a necessary KPI for the EAS, considering the UE's device capability and an additional process according thereto, in allocating an EAS supporting split rendering.

Figure 15:
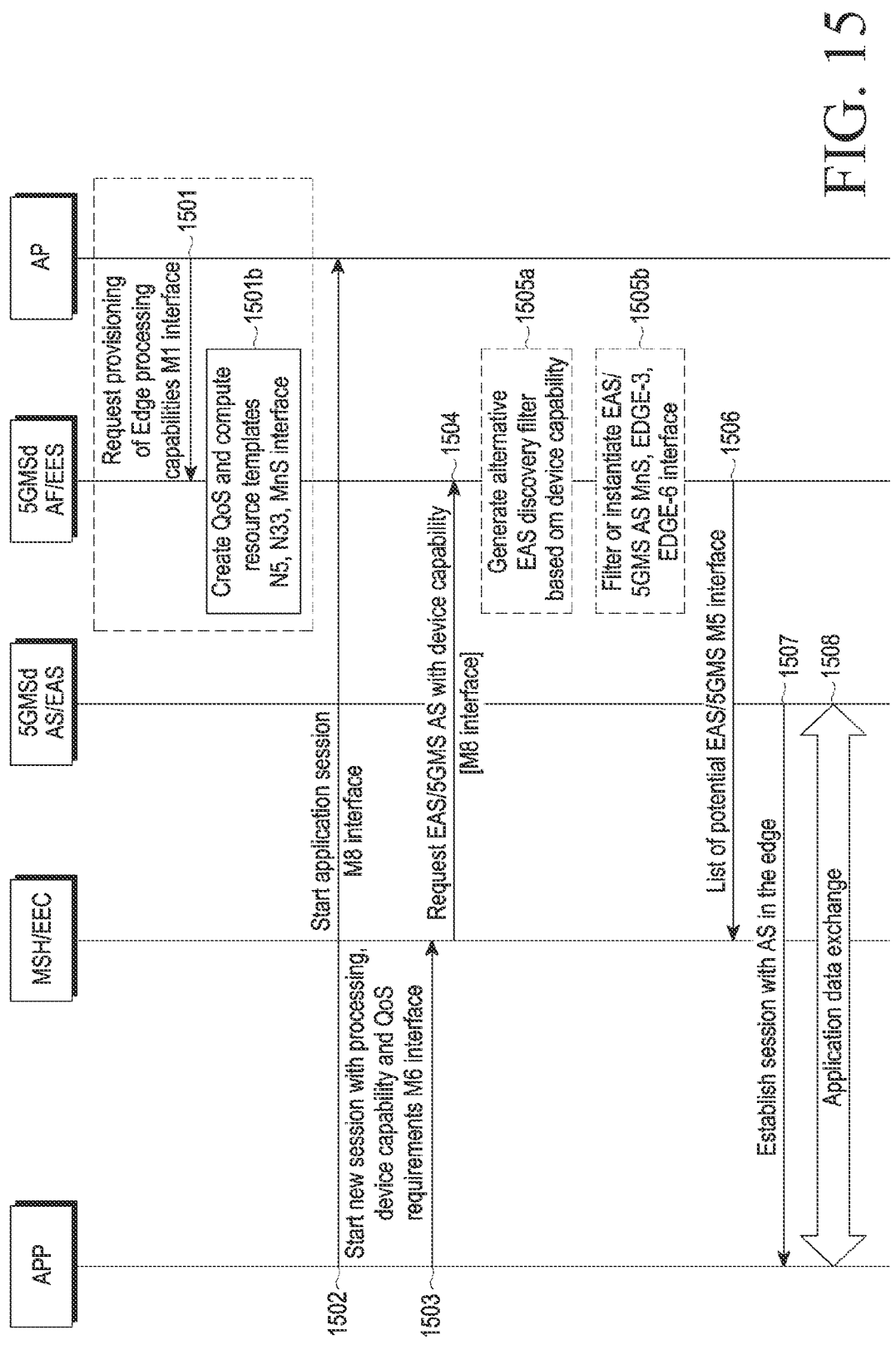
FIG. 15 illustrates an operation of providing UE capability information in a split rendering call flow according to an embodiment.

FIG. 15 illustrates an operation of providing UE capability information in a split rendering call flow according to an embodiment. The procedure of FIG. 15 may refer to, e.g., call flow for split rendering of FIG. 15 of 3GPP TR 26.803.

Referring to FIG. 15, in operation 1501, the application provider sets up resources required for application sessions. Operation 1501 may include operations 1501a and 1501b. In operation 1501*a*, the application provider may request the 5GMS AF (e.g., media AF) to create a new provisioning session. In operation 1501*b*, the media AF may create a quality of service (QoS) and calculate resource templates.

In operation 1502, the UE's application (APP) (e.g., AR/MR application or 5GMS-aware application) may be initiated by the UE and access the application provider to create a new application session.

In operation 1503, the AR/MR application may transfer an EAS server resource allocation requirement including information (e.g., UE capability information) indicating the UE's device capability to the EEC (e.g., media session handler) through the EEC. The AR/MR application may transfer the device capability to the EEC to request start of a session for split rendering.

In operation 1504, the EEC may transfer information about the device capability to the EES (e.g., media AF). In operation 1505*a*, the EES may create an EAS discovery filter to find a necessary EAS based on the information about the device capability instead of a general EAS discovery filter necessary for the split rendering service. If the device capability is ingested, the EES may determine processes that should be performed by the UE and/or the server according to the device capability and, if an additional resource (e.g., EAS) is required over those requested by the EEC, create an EAS discovery filter including an additional KPI and use it to search for/secure an EAS.

In operation 1505*b*, the EES may search for an EAS meeting the condition of the created EAS discovery filter and, if no EAS meets the condition, create a new one.

In operation 1506, the EES may transfer a potential EAS/5GMS AS list to identify the resource validity to the EEC.

In operation 1507, the EEC may provide a list of suitable EAS/5GMS AS instances to the UE's application. The application may select one EAS/5GMS AS instance and establish a connection.

In operation 1508, if the UE's application is connected with the discovered EAS AS, the application may exchange the rendered viewport and pose information with the EAS AS.

The embodiments of FIGS. 16, 17, 18, and 19 herein describe communicating with a server to adjust a process. If the process to be executed by the UE is received from the server (e.g., the cloud/edge server 612 or 850) but the received process does not meet a target time/performance, the UE (e.g., the UE 602 or 802) may communicate with the server to change the performance (e.g., complexity) of the process. Examples include when the server does not provide the processing manifest or when the provided process manifest lacks an option that may be processed with the UE capability.

The UE may determine the device status, report the device status to the server, and receive the process manifest or/together with the changed entry point from the server.

Figure 16:
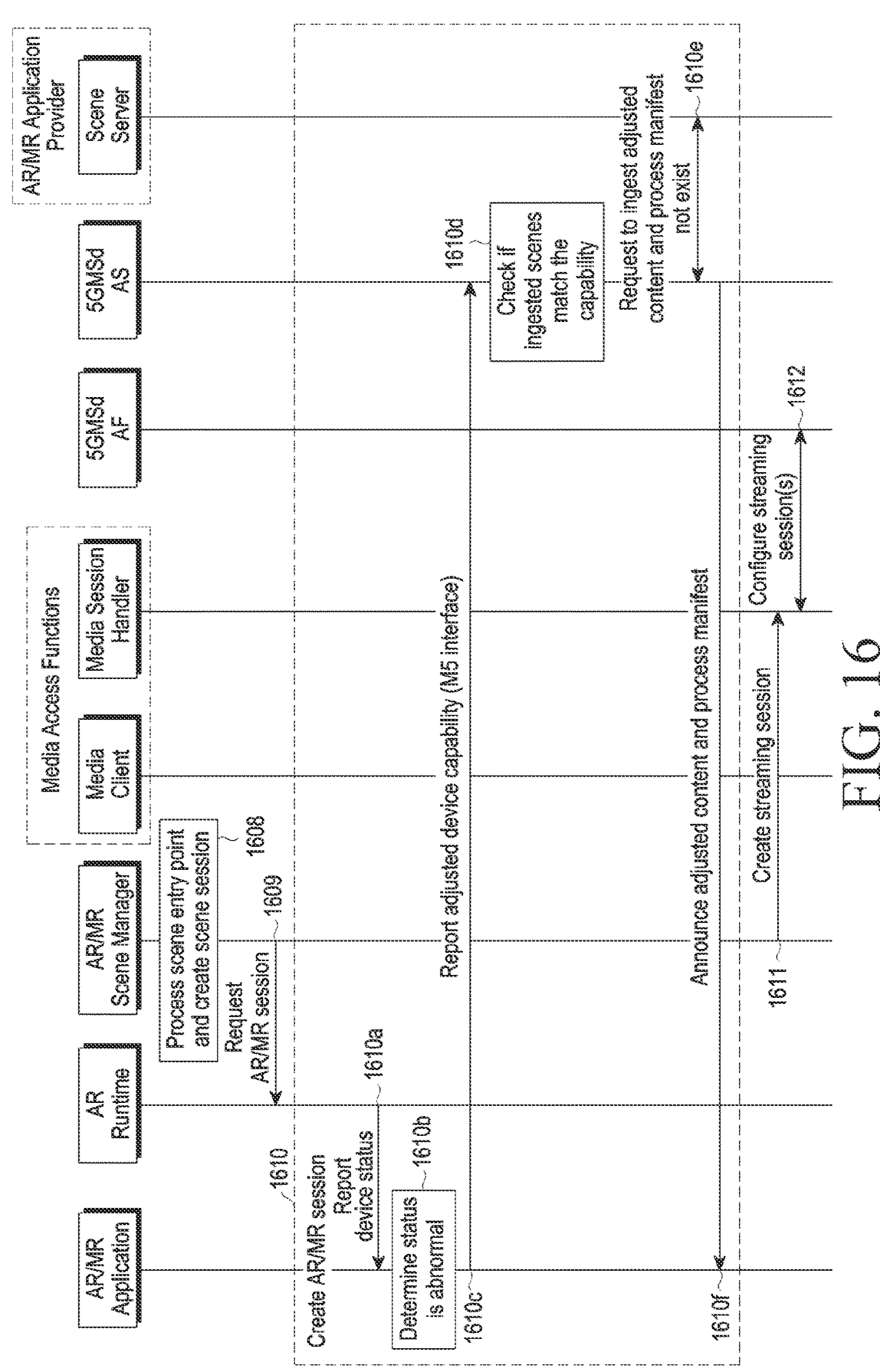
FIG. 16 illustrates an operation of providing UE capability information in a STAR-based streaming step according to an embodiment.

FIG. 16 illustrates an operation of providing UE capability information in a STAR-based streaming step according to an embodiment. In the illustrated example, the UE may detect a performance change during playback of the determined content as well as service/content discovery and report the performance change to the server. For the illustrated procedure, the STAR-based procedure for 5G downlink streaming of FIG. 6.2.4.1-1 of 3GPP TR 26.998 may be referenced.

Referring to FIG. 16, before operation 1608, provisioning operations for STAR-based streaming may be performed.

In operation 1608, the AR/MR scene manager (e.g., the scene manager 810) of the server (e.g., the cloud/edge server 802) may process the entry point including the scene description and create a scene session. In operation 1609, the AR/MR scene manager may request the AR runtime (e.g., the AR runtime 808) to create a new AR/MR session.

In operation 1610, as a procedure for the AR/MR application to create a new AR/MR session, operations 1610*a* to 1610*f* may be included.

In operation 1610*a*, the AR runtime may report the device status to the AR/MR application. In operation 1610*b*, the AR/MR application may identify whether the UE's status is normal or abnormal (e.g., performance degradation) based on the device status. When the UE's status is identified as being abnormal, operation 1610*c* may proceed.

In operation 1610*c*, the AR/MR application may transmit a report (e.g., UE capability information) including the adjusted device capability to the AS (e.g., the media AS) of the server to request to change the UE capability recognized by the server. In operation 1610*d*, the AS may identify whether content meeting the device capability is present in the server and, if absent, ingest adjusted content (e.g., content meeting the adjusted device capability) from the AR/MR application provider (e.g., the AR/MR application provider 622 or 860) in operation 1610*e*.

In operation 1610*f*, the AS may provide the adjusted content and the process manifest to the UE's AR/MR application through an announcement procedure.

In operation 1611, the AR/MR scene manager may instruct the media session handler of the media client to create a streaming session while providing necessary QoS information.

In operation 1612, the media session handler may share the QoS information with the media AF of the server while configuring a streaming session.

Thereafter, the remaining operations for STAR-based streaming may be performed.

Figure 17:
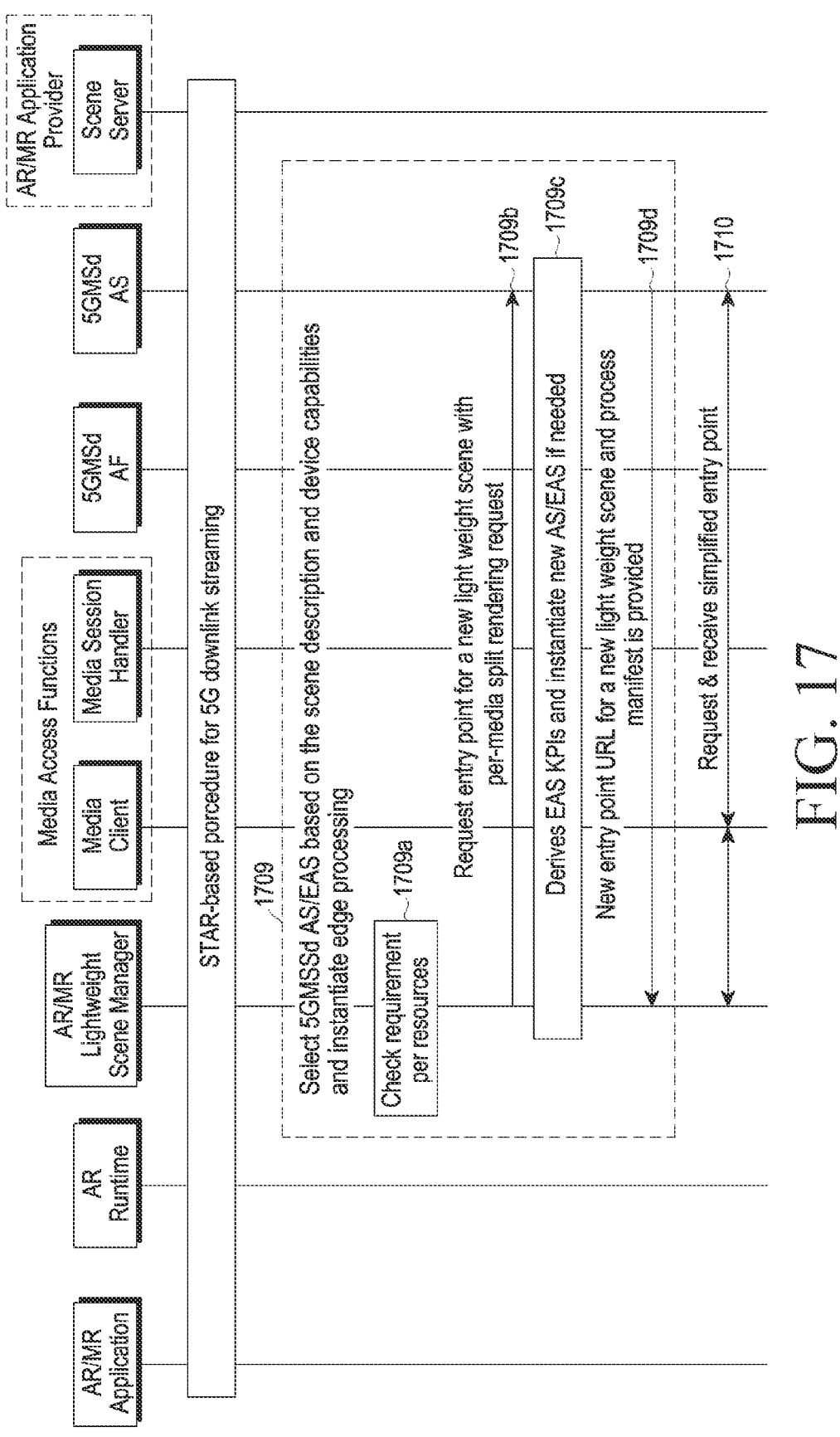
FIG. 17 illustrates an operation of providing UE capability information in an EDGAR-based streaming step according to an embodiment.

FIG. 17 illustrates an operation of providing UE capability information in an EDGAR-based streaming step according to an embodiment. For the illustrated procedure, the EDGAR-based procedure for 5G downlink streaming of FIG. 6.2.4.121 of 3GPP TR 26.998 may be referenced.

Referring to FIG. 17, provisioning operations for STAR-based streaming (e.g., operations 2301 to 2308 of FIG. 23A and FIG. 23B) may be performed before operation 1709. Operation 1709 may include operations 1709*a* to 1709*d* to select AS/EAS and instantiate edge processing based on the scene description and device capability.

In operation 1709*a*, the scene manager of the UE may identify requirements for each resource. In operation 1709*b*, the scene manager may request an entry point for a new scene from the media AS of the server. In operation 1709*c*, the UE's media session handler may derive EAS KPIs with the media AS, if necessary, and instantiate a new AS/EAS capable of providing 5GMS AS performance. In operation 1709*d*, the media AS may provide the process manifest and an entry point address (e.g., URL) for a new scene description to the scene manager of the UE.

In operation 1710, the scene manager of the UE may request and receive the media ASfh simplified entry point through the media client.

Thereafter, operations (e.g., operations 2611 to 2628 of FIG. 26A and FIG. 26B) related to processing of media data may be performed between the media AS and the AR runtime of the UE using the entry point.

Figure 18:
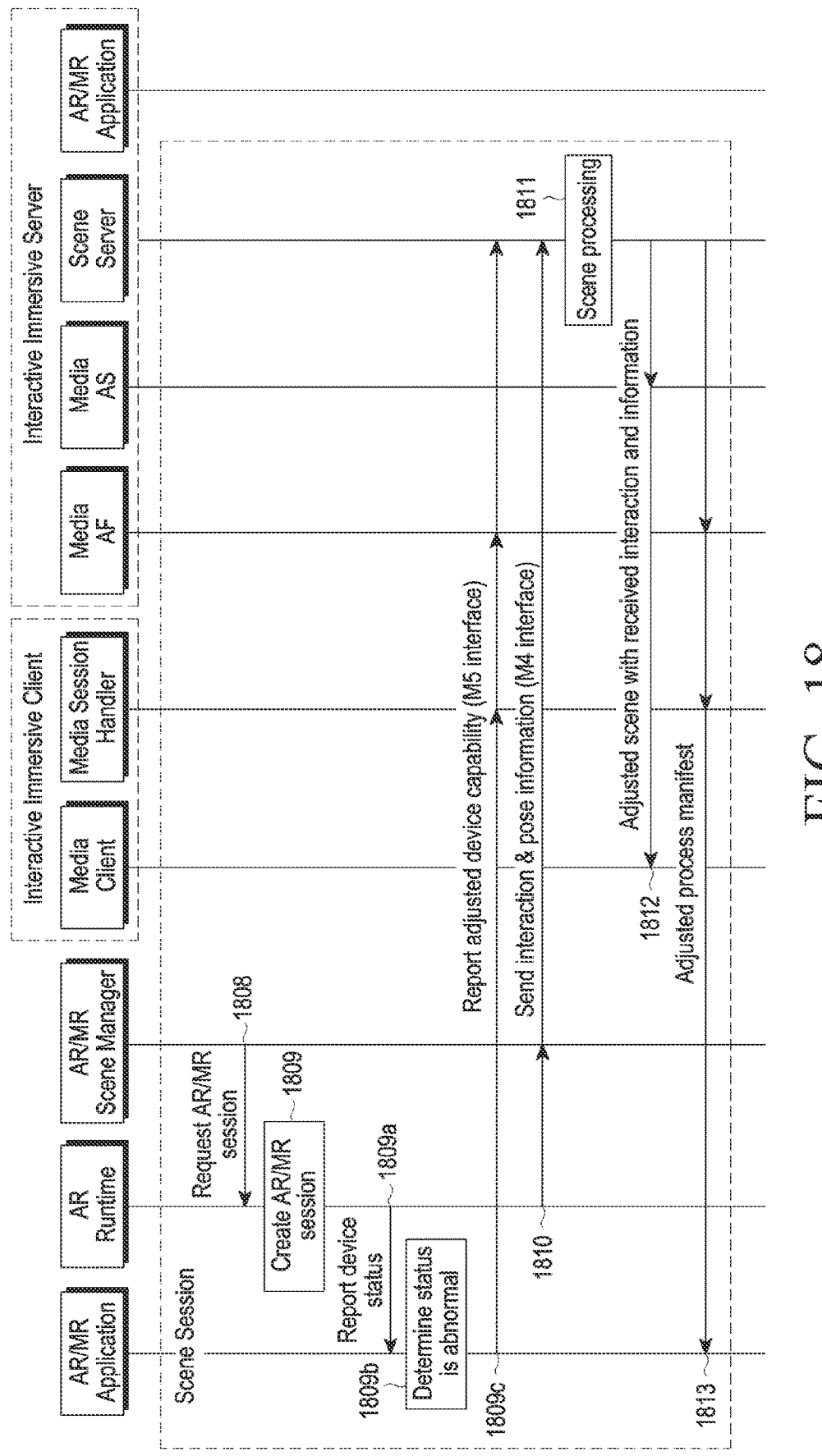
FIG. 18 illustrates an operation of providing UE capability information through a scene session according to an embodiment.

FIG. 18 illustrates an operation of providing UE capability information through a scene session according to an embodiment.

Referring to FIG. 18, in operation 1808, the AR/MR scene manager of the UE may request an AR/MR session from the AR runtime. In operation 1809, the AR runtime may create an AR/MR session and may report the device status to the AR/MR application in operation 1809*a*. In operation 1809*b*, the AR/MR application may identify whether the UE's status is normal or abnormal (e.g., performance degradation) based on the device status. For example, when the UE's status is identified as being abnormal, operation 1809*c* may proceed.

In operation 1809*c*, the AR/MR application may send a report including the adjusted device capability to the scene server of the server. In operation 1810, the AR runtime may transmit interaction and pose information to the scene server through the AR/MR scene manager.

In operation 1811, the scene server may perform scene processing and, in operation 1812, transfer the scene adjusted according to the received interaction and pose information to the media client of the UE. In operation 1813, the scene server may transmit the adjusted process manifest to the AR/MR application of the UE.

Figure 19:
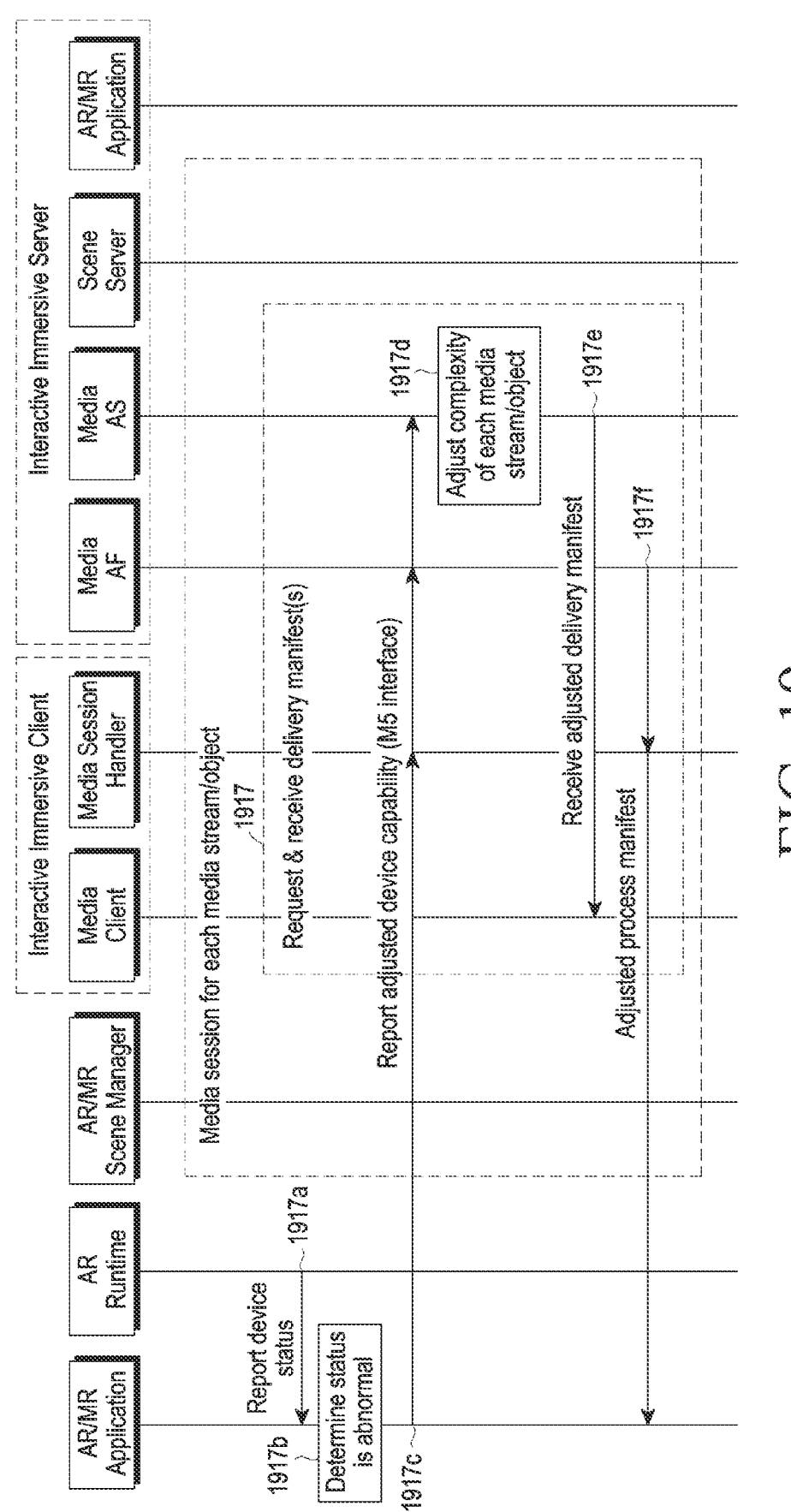
FIG. 19 illustrates an operation of providing UE capability information through a media session according to an embodiment.

FIG. 19 illustrates an operation of providing UE capability information through a media session according to an embodiment.

Referring to FIG. 19, operation 1917 for requesting and receiving a delivery manifest during a media session for each media stream/object may be performed. Operation 1917 may include operations 1917*a* to 1917*f*, which are described below.

In operation 1917*a*, during the media session, the AR runtime of the UE may report the device status to the AR/MR application. In operation 1917*b*, the AR/MR application may identify whether the UE's status is normal or abnormal (e.g., performance degradation) based on the device status. For example, when the UE's status is identified as being abnormal, operation 1917*c* may proceed.

In operation 1917*c*, the AR/MR application may send a report including the adjusted device capability to the media AS of the server. In operation 1917*d*, the media AS may adjust the complexity for each media stream/object.

In operation 1917*e*, the media AS may transfer the delivery manifest adjusted according to the adjusted complexity to the media client of the UE. In operation 1917*f*, the media AF of the server may transmit the adjusted process manifest to the AR/MR application through the media session handler of the UE.

Configuration of Integrated Process

A process manifest may provide procedures including processes to be executed on multiple devices and may provide information providing multiple options having different complexities for each process. Each option may include a target performance.

For example, the complexity for the encoding process (or encoders process) may include resolution information. The resolution information may include at least one of video graphics array (VGA), high density (HD), or 4K. The processing manifest may provide three or more options with different resolutions for the encoding process. Each option may include a target performance. For example, the target performance may include throughput per second (e.g., 90 fps). If there is a need to reduce the complexity of the process, the UE (e.g., the UE 602 or 802) may review the options of the processing manifest and determine the target for process change according to the option that may meet the target performance while having lower complexity.

For example, the UE may execute the process of encoding with the 4K resolution and, when entering the threshold range due to a temperature rise and accordingly expecting that the performance is insufficient so that an instruction to determine to change the process is received from the server (e.g., the cloud/edge server 612 or 850), the UE may review the complexity options for the encoding process based on the processing manifest received from the server and identify that the target performance for the complexity option having the 2K resolution is 90 fps. The UE may determine to decrease the resolution of the encoding process to 2K according to the complexity option that may meet the target performance of 90 fps.

Examples of processes that may be provided in the process manifest may include at least one of decoding, encoding, rendering, encrypting, decrypting, compositing, displaying, pose sensing, pose correcting, feature extracting, feature matching, anchor mapping, object tracking, hand tracking, or eye tracking, but are not limited thereto.

The process manifest may be transferred through a document having a separate URL, a separate message, or separate metadata. The process manifest may be included in or attached to the entry point or be included in the information element indicated by the entry point and be transferred.

The process manifest may be created according to at least one of a scheme for specifying the process, a scheme for specifying the complexity/profile of the process, a scheme for specifying the target performance for each option according to the complexity of each process, or a scheme for specifying user preference.

Processing according to the performance degradation of the UE may include at least one of adjusting the process complexity or deleting (or replacing) the process.

The complexity adjustment may include at least one of adjusting the resolution of the media created/processed by the process, adjusting the fps, or adjusting the compression quality.

The process deletion may include at least one of executing the process, which is executed on the UE, on the server or, if there is no significant influence on the content quality (e.g., image quality enhancement on the UE), deleting the process.

An example of executing the process on the server is described below. The UE may receive two or more different media and perform a composition process of merging the media into a single image. The performing of the composition process may be deleted from the UE execution list due to the performance degradation of the UE, and the server may perform composition on the media and transmit the merged image to the UE. Since the UE receives two or more media and executes one composited media instead of performing composition, the process load may be reduced. The UE may perform adjustment of the pre/post process to correct the artifacts (e.g., time difference) occurring while composition is executed on the server.

Process Change (UE, Server)

A process change may be performed by the UE determining a result of a process change, transferring the result of the process change to the server by the UE, requesting the server to change the process by the UE, or determining to change the process by the server.

Upon performing an integrated process (e.g., the processes executed on cooperate with the processes executed on the server), the order of execution of process and the input/output of each process are closely connected between the processes. Thus, negotiation with the server and permission/consent/acknowledge by the server according thereto should precede process change/deletion by the UE.

The UE may determine a process change based on process adjustment range information in the process manifest already received from the server.

When the UE determines a process change, the process manifest including a selection range of the process change (e.g., complexity adjustment/deletion) which may be determined by the UE may be provided from the server to the UE, and the UE may determine a process change without a permission procedure by the server within the given selection range.

When the result of handling the process, which the UE intended to create when the result of the process executed by the UE is transmitted to the server, is varied due to the process change according to the performance issue, the process executed with the process handling result of the UE as an input, among the processes of the server, may be influenced. Thus, the UE may notify the server of the details of the process change. The device (e.g., the UE) which has changed the process and the process may notify the connected process, which uses the result of the changed process as an input, and the device (e.g., the server) executing the process, of the process change.

For example, when vision engine/spatial computing for identifying the UE's position on the space is executed by the server, the UE may determine (e.g., determine a process change) to transmit ambient image or sensor information (e.g., 2D red, green, blue (RGB) video capture) to the server. If gray-scale video is transmitted, instead of 2D RGB video, due to the UE capability issue, the process (e.g., vision engine/spatial computing process) to determine 3D using RGB information in the server should be changed into a gray scale-based process.

When the UE has changed the process without the permission of the server according to the process manifest, and the output generated in the changed process influences the next process of the server, the UE may notify the server of the process change. The notification of the process change may be included in display of the media profile in the metadata of the media file, report, or separate message, display of the process/selection identifier in the processing manifest, or display in session description protocol (SDP)-based request/response, but is not limited thereto.

The UE may determine a process based on the process manifest received from the server. Upon determining that the minimum performance requirement allowed in the process manifest does not meet the UE capability, the UE may request a new process manifest with a lower range from the server, transmit UE capability information indicating lower UE capability not supported by the process manifest to the server, and again receive a process manifest with a wider range from the server.

The integrated management process (e.g., the integrated management process 614 or 852) of the server may determine whether the load of the process additionally executed in the server increases due to the request of the UE so that an additional resource is required.

Figure 20A:
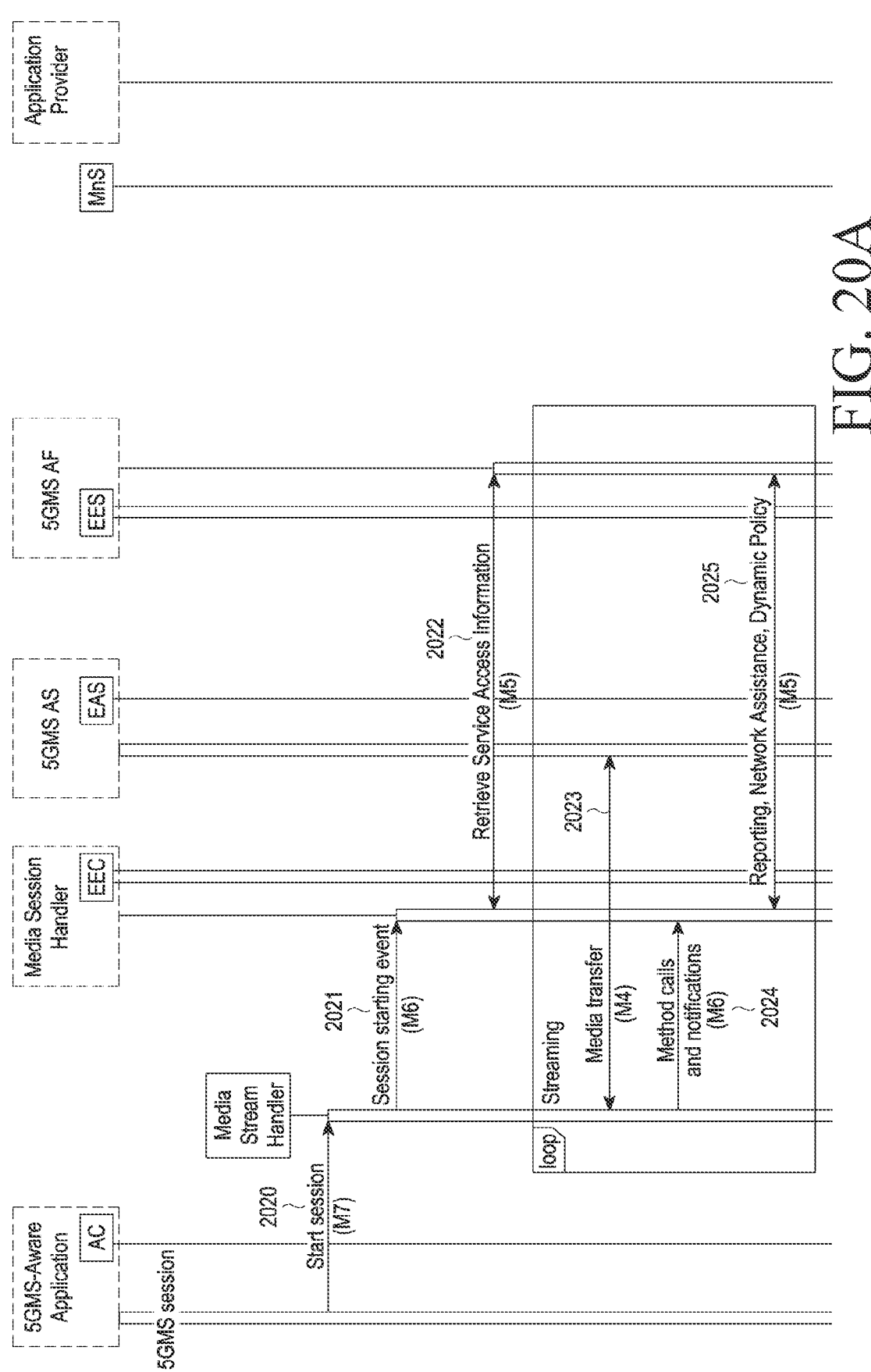
FIGS. 20A and 20B illustrate an operation of additionally securing a server resource in a provisioning phase according to an embodiment.
Figure 20B:
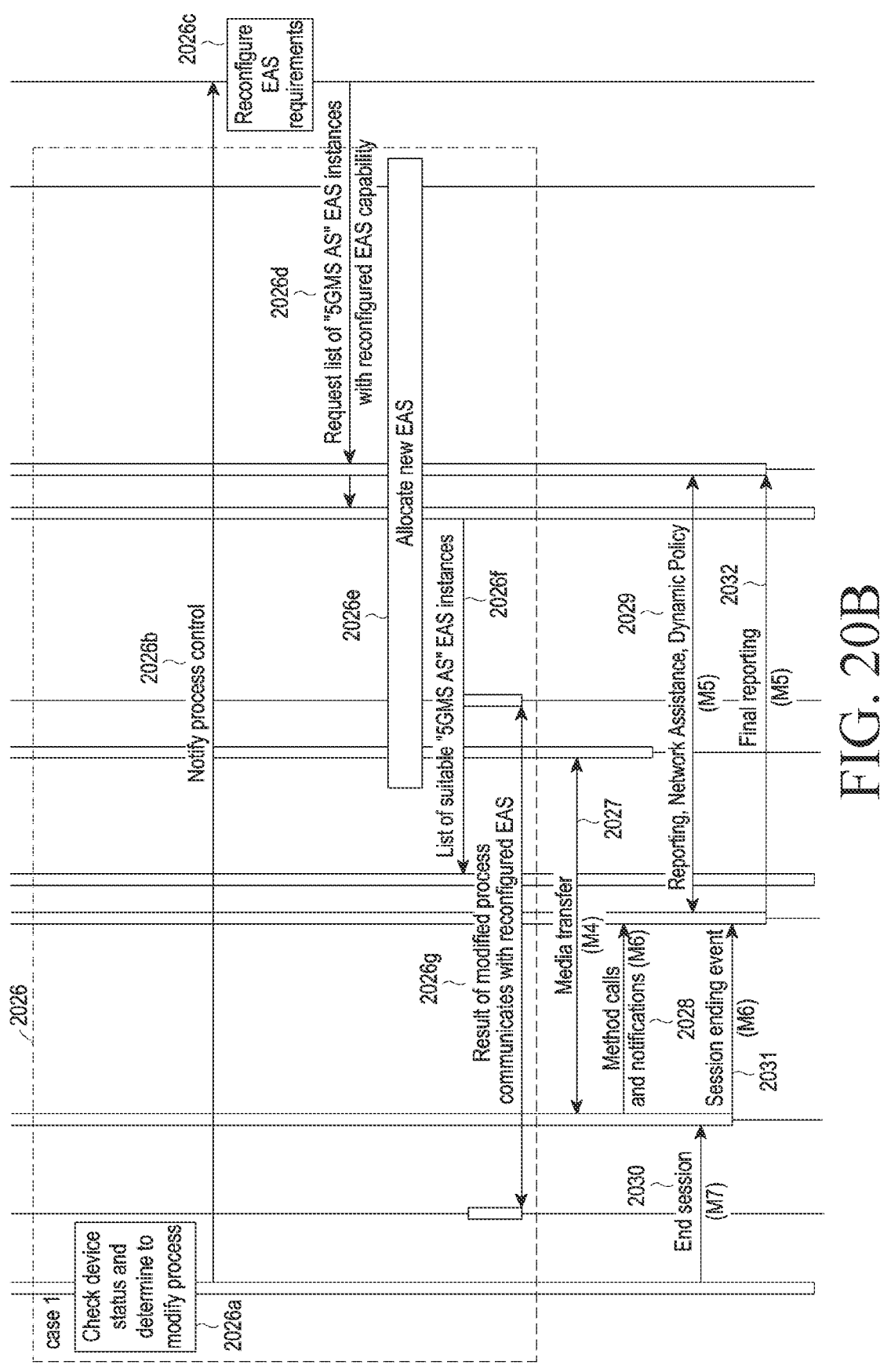

FIGS. 20A and 20B illustrate an operation of additionally securing a server resource in a provisioning phase according to an embodiment. The provisioning phase of the client-driven session establishment procedure of FIG. 9 based on the EMSA architecture of 3GPP TR 26.803 relates to FIGS. 20A and 20B, in which the UE may use communication between application and application service provider (ASP) (e.g., the application provider).

Referring to FIG. 20A, in operation 2020, the application of the UE (e.g., the AR/MR application or 5GMS-aware application) may transfer a suitable streaming access parameter to the UE's media stream handler to initiate a session. In operation 2021, the media stream handler may transmit a session start event to the UE's media session handler, indicating that a new session starts. In operation 2022, the UE's media session handler may obtain suitable service access information in the session from the server's AF (e.g., the 5GMS AF).

In operation 2023, the media stream handler may access the server's AF including the selected EAS. By the access, streaming for transferring media may be started. In operation 2024, support information about the session may be transferred from the media stream handler to the media session handler. In operation 2025, the media session handler may exchange session-related support information (e.g., report, network support, or dynamic policy) with the server's AF.

FIG. 20B illustrates operation 2026 to operation 2032. Operation 2026 is for additionally securing a server resource (e.g., new EAS) and may include operations 2026*a* to 2026*g*.

In operation 2026*a*, the UE's application (e.g., AR application) may identify the UE status and determine to change the process. In operation 2026*b*, the application may notify of the UE's process change through the communication interface between the AR application and the ASP (e.g., the 5GMS application provider). In operation 2026*c*, the ASP may reconfigure an EAS KPI considering the additional process load according to the process change.

In operation 2026*d*, the ASP may transfer a service discovery filter including the newly configured EAS KPI to the EES through the AF. In operation 2026*e*, the EES may communicate with the management service (MnS) entity to allocate a new EAS and, in operation 2026*f*, transfer information about the new EAS (e.g., list of suitable "5GMS AS" EAS instances") to the EEC. In operation 2026*g*, the UE's AC may execute the changed process according to the determination in operation 2026*a* and transfer the result generated by the changed process to the new EAS.

In operation 2027, the media stream handler may access the server's AF including the selected EAS. By such access, streaming for transferring media may be started. In operation 2028, support information about the session may be transferred from the media stream handler to the media session handler. In operation 2029, the media session handler may exchange session-related support information (e.g., report, network support, or dynamic policy) with the server's AF.

In operation 2030, the UE's application may notify the media stream handler of termination of the session. In operation 2031, the media stream handler may notify the media session handler of termination of the session. In operation 2032, the media session handler may perform final reporting to the AF.

Figure 21A:
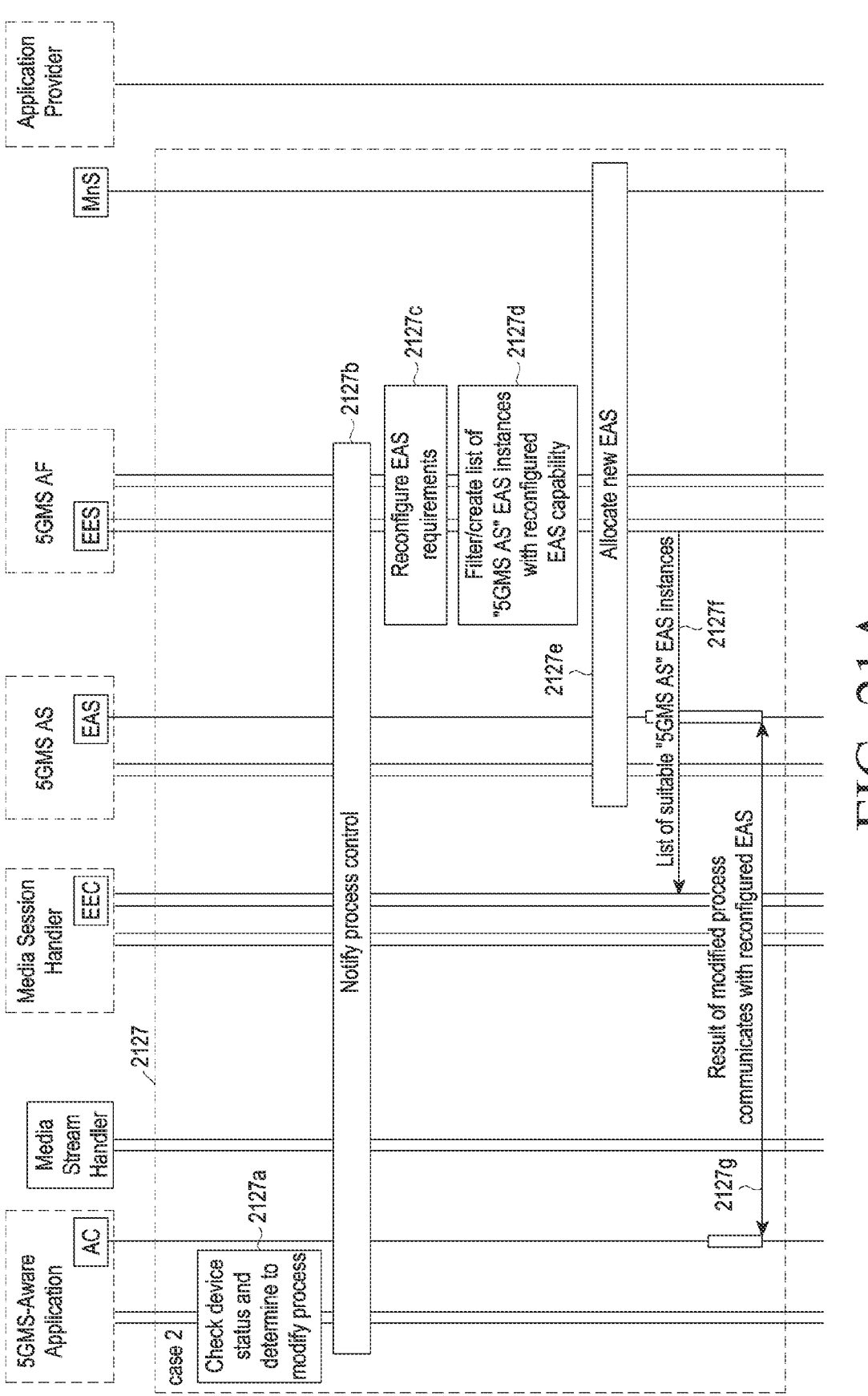
FIGS. 21A and 21B illustrate an operation of additionally securing a server resource in a provisioning phase according to an embodiment.
Figure 21B:
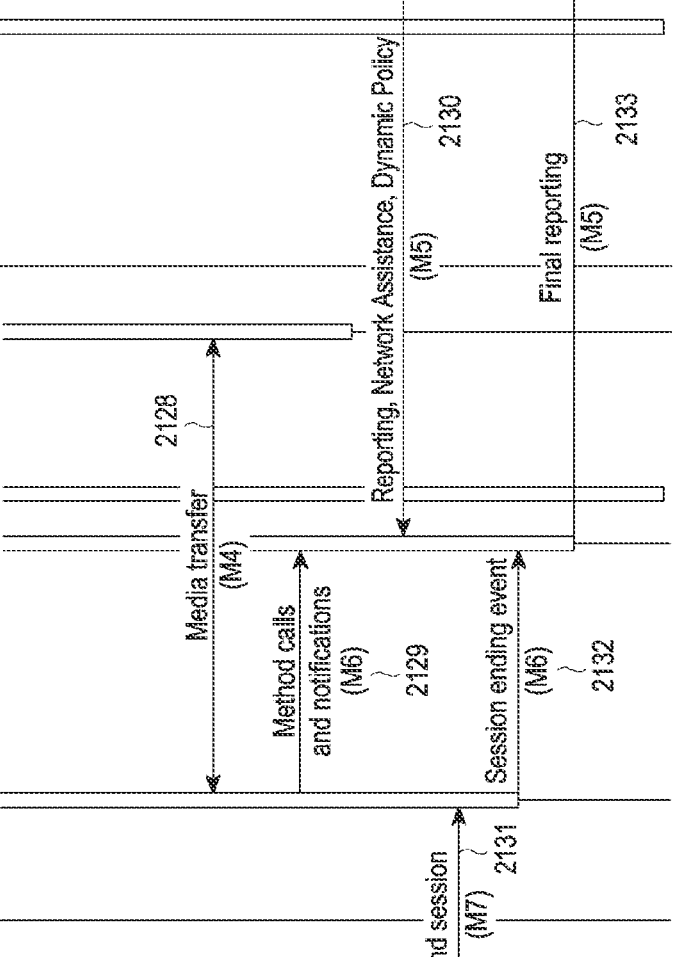

FIG. 21 (including FIGS. 20A and 20B) illustrates an operation of additionally securing a server resource in a provisioning phase according to an embodiment. The provisioning phase of the client-driven session establishment procedure of FIG. 9 based on the EMSA architecture of 3GPP TR 26.803 relates to FIGS. 20A and 20B, in which communication between the media session handler and the AF may be used.

Referring to FIG. 21A, operation 2127 is for additionally securing a server resource (e.g., new EAS) and may include operations 2127*a* to 2127*g* described below.

In operation 2127*a*, the UE's application (e.g., AR application) may identify the UE status and determine to change the process. In operation 2127*b*, the AR application may communicate with the AF through the media session handler, notifying of the UE's process change. In operation 2127*c*, an EAS KPI considering the additional process load due to the process change may be reconfigured by the EES of the AF. In operation 2127*d*, the EES may generate a new EAS service discovery filter and create an EAS list. In operation 2127*e*, the EES may be assigned a new EAS by communicating with the MnS entity. In operation 2127*f*, information about the new EAS (e.g., EAS list) may be transferred from the EES to the EEC. In operation 2127*g*, the AC may execute the changed process according to the determination in operation 2127*a* and transfer the result generated by the changed process to the new EAS.

Operations 2128 to 2133 may be the same as that of operations 2027 to 2032, respectively, and their description is not repeated here, for conciseness.

A method in which the server determines a process change based on the performance reported by the UE without a request of the UE and secures performance including a new EAS according to the determination is described below.

The AR application may identify the UE status and then report the UE status. The AR application may report the UE status to the ASP or through the media session handler to the server's AF. When the UE capability is deteriorated as compared with when the first EAS allocation request is made (e.g., the service start time), the ASP or the AF may determine an influence of the entire service process flow including the UE and adjust the process handling capability in the UE and the server. When an additional EAS performance is needed, an EAS KPI considering the additional process load according to the additional EAS may be redefined.

The AF may communicate with the MnS through the EES to be assigned a new EAS and transfer it to the EEC. The AC may execute the changed process and transfer the result generated by the changed process to the new EAS. As described above, when adjustment of the UE process is needed, the UE's application may communicate with the AF through the media session handler or communicate with the ASP to adjust the UE process.

Figure 22A:
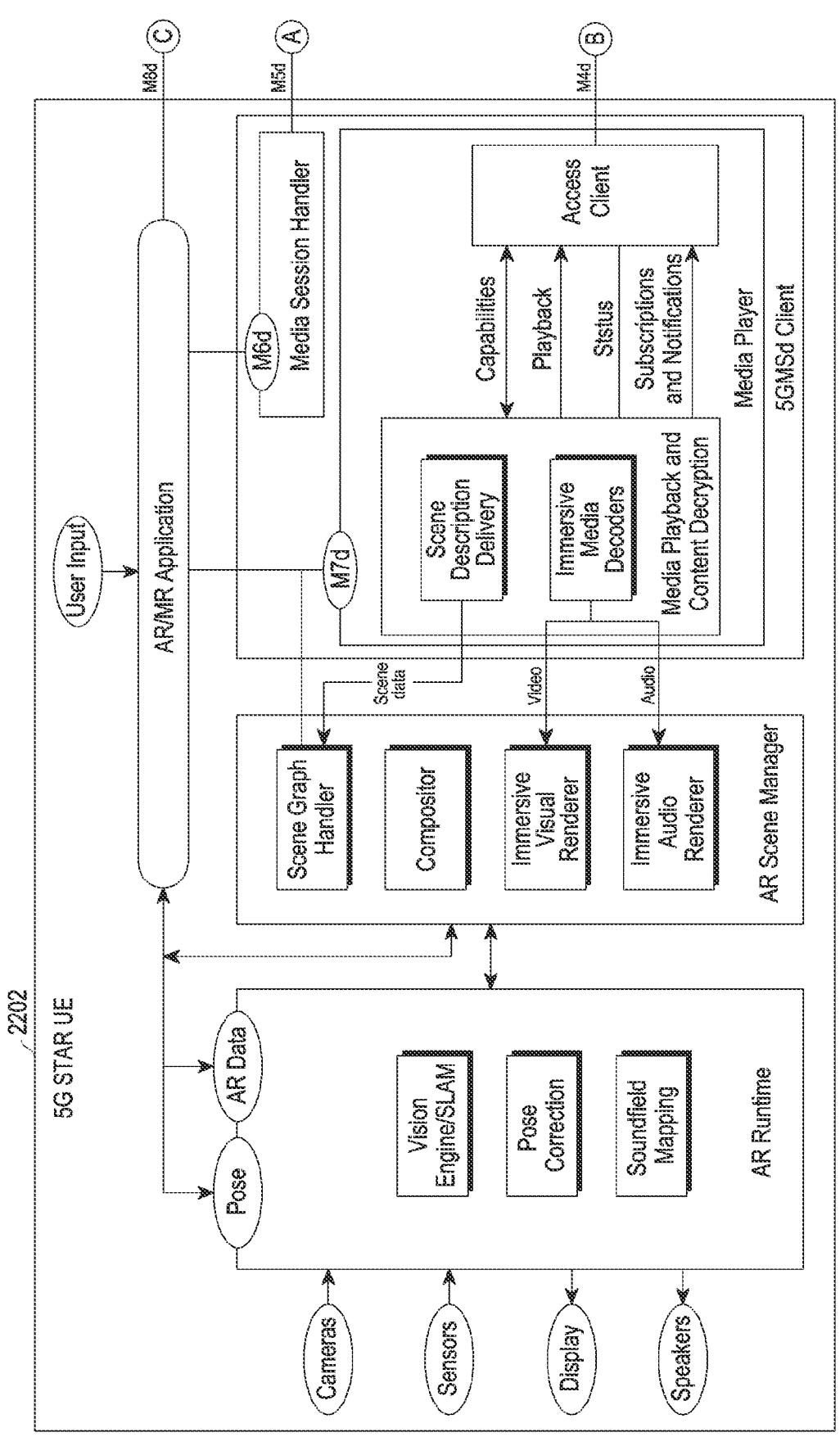
FIGS. 22A and 22B illustrate a system structure for a STAR-based streaming service according to an embodiment.
Figure 22B:
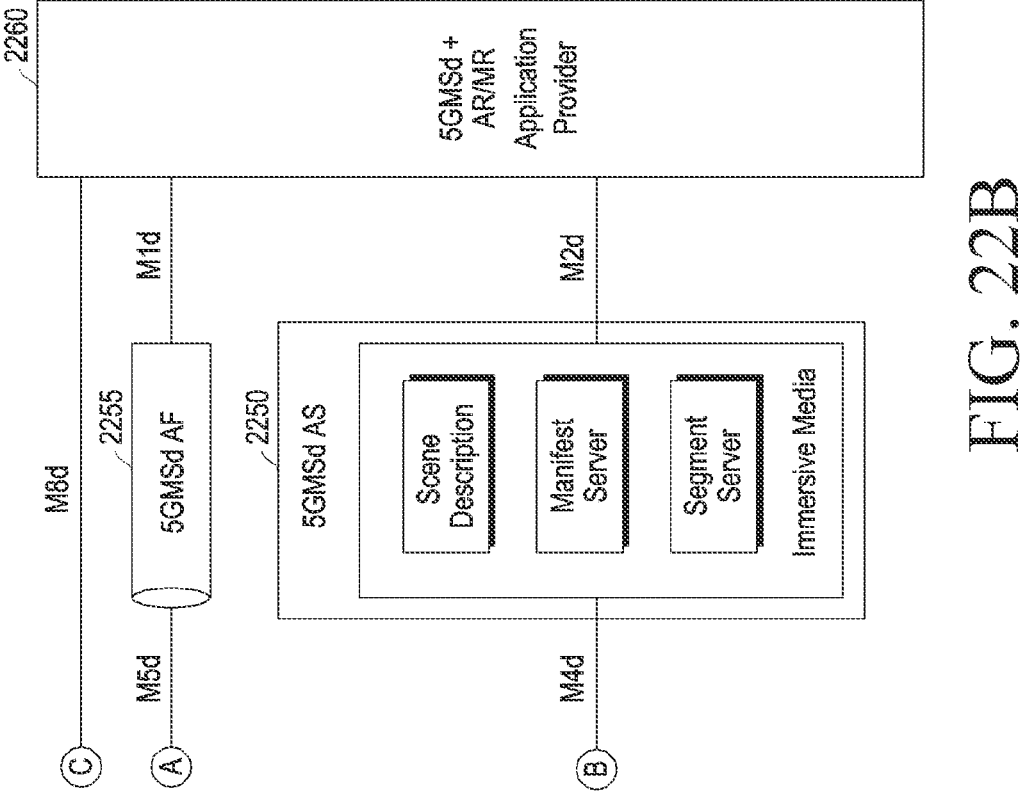

FIGS. 22A and 22B illustrate a system structure for a STAR-based streaming service according to an embodiment. For the illustrated structure, the STAR-based 5GMS downlink structure of FIG. 6.2.3.1-1 of 3GPP TR 26.998 may be referenced.

Referring to FIG. 22A, a UE 2202 (e.g., a 5G STAR UE) may receive content directly from the service provider 2260 (FIG. 22B) or receive content from the 5GMSd AF 2255 or 5GMSd AS 2250 (FIG. 22B). The AS 2250 may previously render media based on the pose and interaction information received from the UE 2202.

Embodiments of transferring UE capability information in the service initiation phase are described in FIGS. 11, 12, and 13.

A method for designating user preference that may be first considered by the user when changing, e.g., content quality or providing range according to the UE capability degradation before, upon, or after initiating a service is described with reference to FIG. 24. Reporting UE capability while executing a service after initiating the service and content change based thereon are as shown in FIG. 14.

FIGS. 23A and 23B illustrate a STAR-based call according to an embodiment. As the procedure illustrated in FIGS. 23A and 23B, FIG. 6.2.4.1-1 of 3GPP TR 26.998 may be referenced.

Referring to FIG. 23A, in operation 2301, scene content may be ingested by the 5GMSd AS. In operation 2302, a service announcement may be triggered by the UE's AR/MR application. Service access information including the media client entry or reference to the service access information may be provided through the M8 interface.

When the M8 interface is used to transfer UE capability information, the procedure of FIG. 11 may be applied, instead of operation 2302.

When the M5 interface is used to transfer UE capability information, the procedure of FIG. 12 may be applied, instead of operation 2302.

When the M4 interface is used to transfer UE capability information, the procedure of FIG. 13 may be applied, instead of operation 2302.

In operation 2303, desired media content may be selected. In an embodiment, operation 2303 may be replaced with the procedure (e.g., operation 2403) of FIG. 24.

Figure 24:
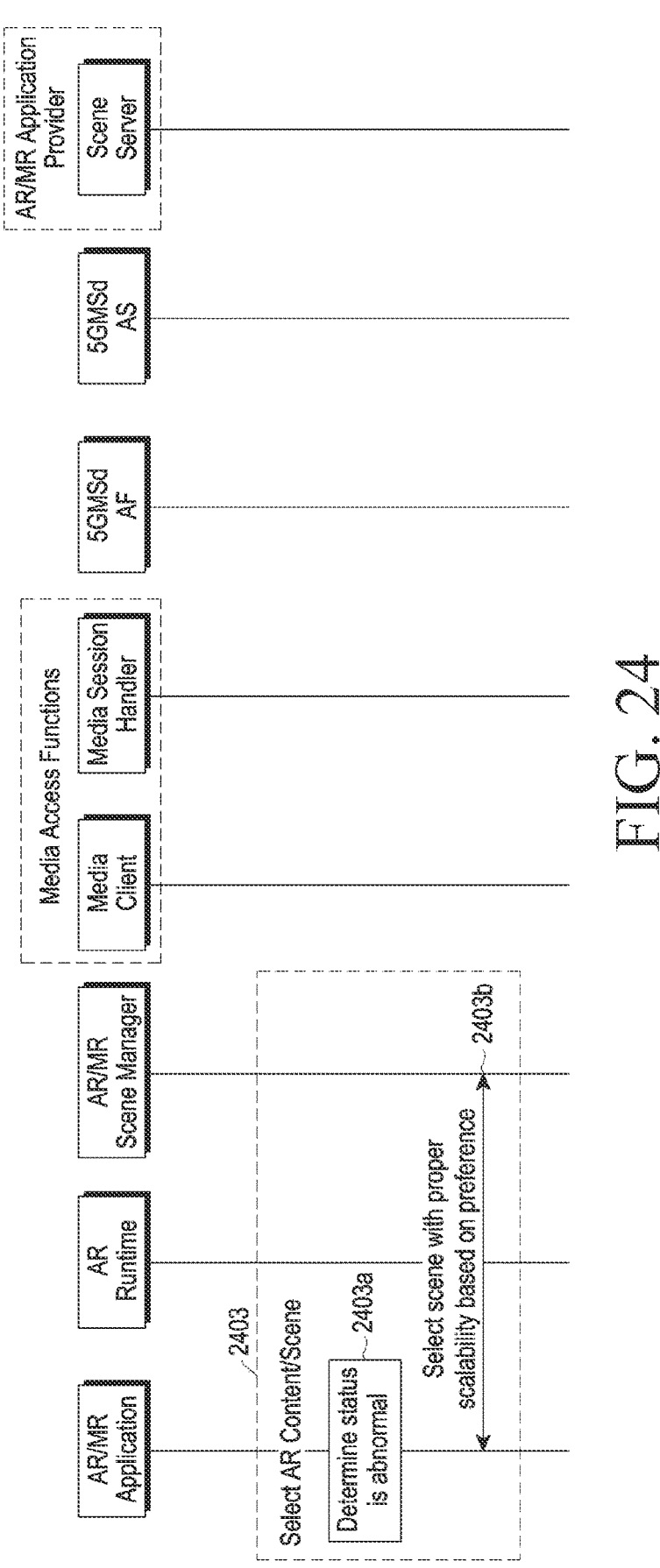
FIG. 24 illustrates an operation of selecting media content considering a user preference according to an embodiment.

FIG. 24 illustrates an operation of selecting media content considering a user preference according to an embodiment.

Referring to FIG. 24, operation 2403 of selecting an AR content/scene may include operations 2403*a* and 2403*b*.

In operation 2403*a*, the AR/MR application may identify the user preference in advance or at a necessary time. The identified user preference may be included in the UE capability information and be transferred to the AR/MR scene manager (e.g., operation 1102*c*). The server may transmit the content entry point or process manifest to the UE in the announcement phase for the changed content (e.g., operation 1102*f*). In operation 2403*b*, the UE's AR/MR application or AR/MR scene manager may consider the user preference when selecting a process based on the process manifest.

In operation 2304, as illustrated in FIG. 23A, service access information may be optionally obtained or updated. In operation 2305, the AR/MR application may initialize the scene manager with the entry point URL (e.g., entire scene description). In operation 2306, the media client may establish a transport session to receive the entry point (e.g., the scene description). In operation 2307, the media client may request and receive the entire scene description from the 5GMSd AS through the transport session.

In operation 2308, the entry point (e.g., the scene description) may be processed by the AR/MR scene manager. In operation 2309, the AR/MR scene manager may request the AR runtime to create a new AR/MR session. In operation 2310, the AR runtime may create a new AR/MR session.

The UE may detect a performance change while playback of the determined content, as well as during the service/content discovery phase, and report the performance change through, e.g., the procedure of FIG. 16.

Referring to FIG. 16, in operation 1610*a*, the UE may repeatedly identify the device capability and/or processing capability and, in operation 1610*b*, determine abnormality according to the performance change. In operation 1610*c*, the UE may transfer the performance change to the server (e.g., the 5GMSd AS). In operations 1610*d* and 1610*e*, as necessary, the 5GMSd AS may communicate with the scene server of the application provider to ingest the adjusted scene. The adjusted scene may be transferred to the UE as in the subsequent operations (e.g., operation 1610*f*) of FIG. 16. Transfer through the M5 interface is described with reference to FIG. 16. When the M8 interface or the M4 interface is used, the procedure of FIG. 11 or 13 may be used.

In operation 2311, the media client and/or the AR/MR scene manager may notify of the QoS information required by the media session handler. In operation 2312, the media session handler may share the QoS information with the 5GMSd AF. In the existing provisioning by the AR/MR application provider, the 5GMSd AF may request to change QoS for the PDU sessions. There may be a media delivery session for each media stream/object. For the static AR object, a simple URL may be provided through entry point information on downloading of the AR object media data.

In operation 2313, as illustrated in FIG. 23B, the media client for the required media content may establish a transport session for obtaining at least one delivery manifest information. In operation 2314, the media client may request and receive the delivery manifest from the 5GMSd AS. In operation 2315, the media client may process the delivery manifest and determine the number of transport sessions necessary to obtain, e.g., media. The media client may use the information of the manifests to initialize the media pipelines for each media stream. In operation 2316, the AR/MR scene manager and the media client may configure rendering and delivery media pipelines.

In operation 2317, the media client may establish a transport session(s) for obtaining the media content. In operation 2318, the AR/MR scene manager may obtain the latest pose information and share the latest pose information with the media client. In operation 2319, the media client may request immersive media data according to the processed delivery manifest considering the pose information (e.g., streaming for each viewport). In operation 2320, the media client may receive the immersive media data and accordingly trigger the media rendering pipeline including registering the AR content in the real world.

In operation 2321, the media client may decode and process the media data. For encrypted media data, the media client may additionally perform decoding. In operation 2322, the media client may transfer the media data to the AR/MR scene manager. In operation 2323, the AR/MR scene manager may render the media data and transfer the rendered media data to the AR runtime. The AR runtime may perform additional processing, such as registering the AR content in the real world and performing pose correction.

Figure 25A:
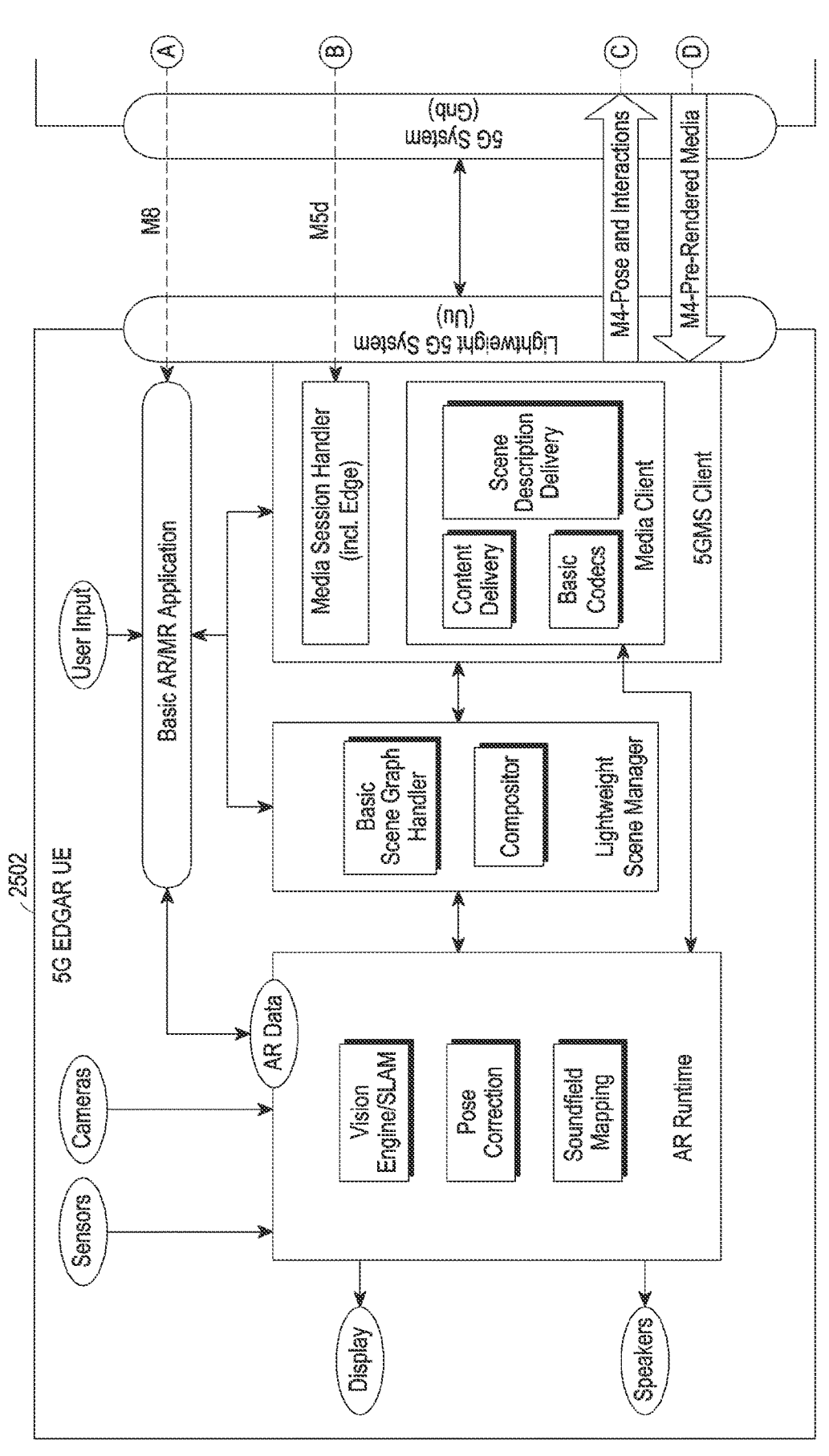
FIGS. 25A and 25B illustrate a system structure for EDGAR-based downlink streaming according to an embodiment.
Figure 25B:
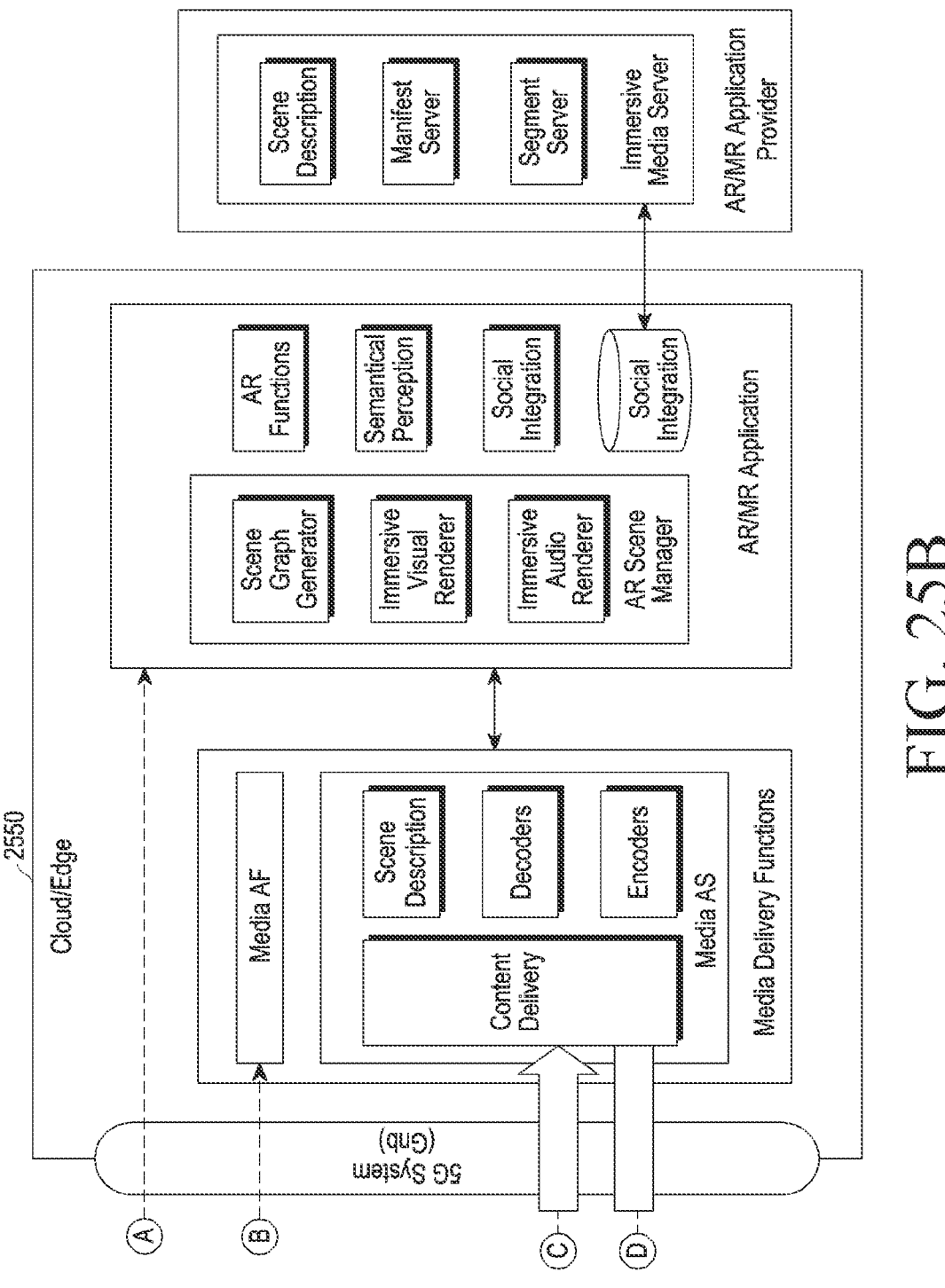

FIGS. 25A and 25B illustrate a system structure for EDGAR-based downlink streaming according to an embodiment. For the illustrated structure, e.g., the EDGAR-based 5GMS downlink structure of FIG. 6.2.3.2-1 of 3GPP TR 26.998 may be referenced.

Referring to FIG. 25A, a UE 2502 (e.g., a 5G EDGAR UE) may receive content from the AR/MR application provider through the cloud/edge server 2550 (FIG. 25B). The cloud/edge server 2550 may previously render media based on the pose and interaction information received from the UE 2502.

Figure 26A:
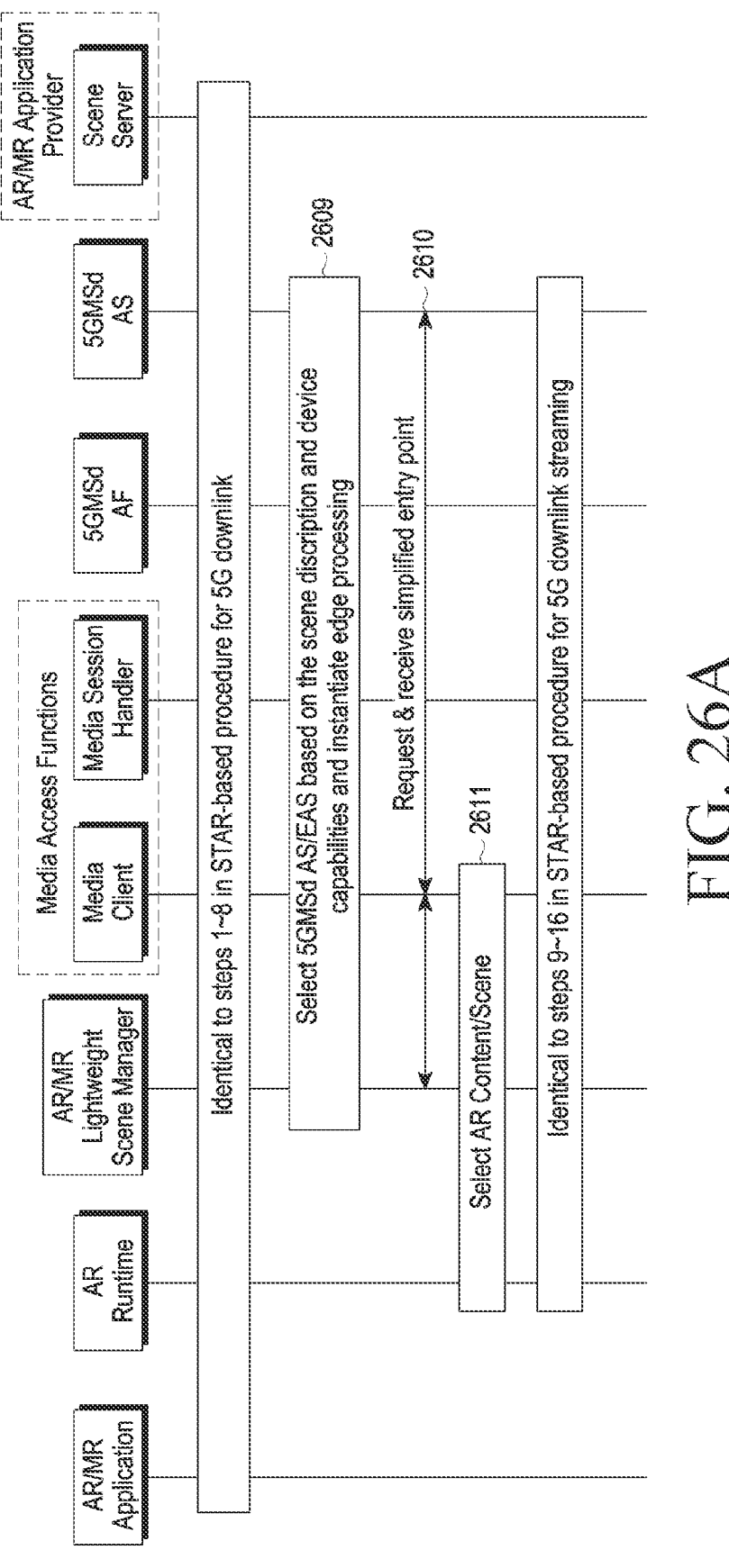
FIGS. 26A and 26B illustrate an EDGAR-based call according to an embodiment.
Figure 26B:
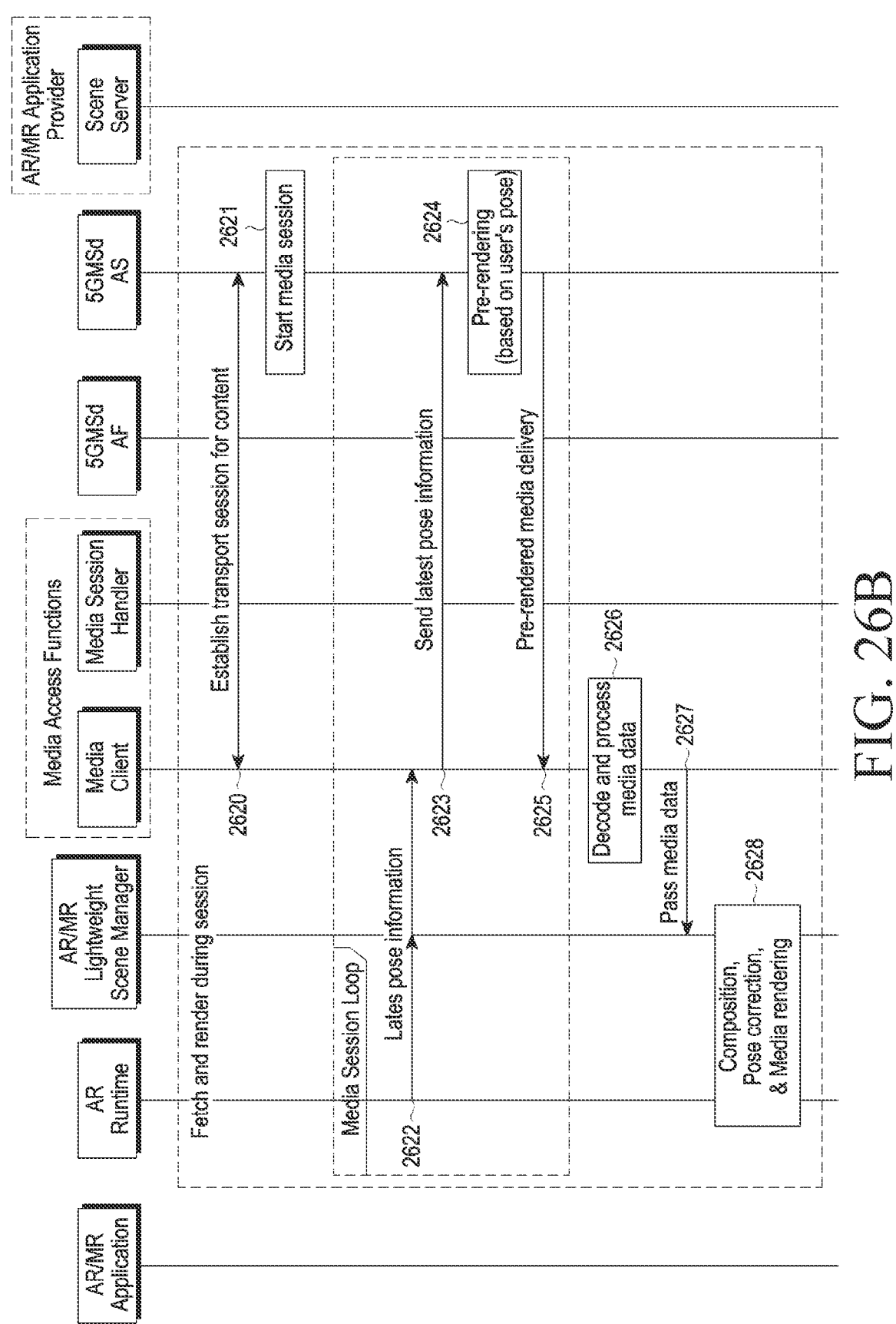

FIGS. 26A and 26B illustrate an EDGAR-based call according to an embodiment. As an example, for the illustrated procedure, FIG. 6.2.4.2-1 of 3GPP TR 26.998 may be referenced.

Referring to FIG. 26A, operations 2301 to 2308 of FIG. 23 precede operation 2609, description of which is not repeated here, for conciseness. In these operations, the UE may request a service announcement based on the capability (e.g., device capability) and receive a created/transmitted scene (e.g., scene description) from the server.

In operation 2609, the EAS of the 5GMSd AS may be selected, and the edge process may be instantiated based on the processed scene description and the device capability.

In operation 2609, the scene manager may transmit the scene and device capability to the media AS, which may analyze the scene to create a necessary EAS discovery filter and request an available EAS from the EES (e.g., media AF)

with the EAS discovery filter. The media AS may receive a list of available EASs, select one EAS from the list, request the selected EAS to create a lightweight scene, and transfer an entry point including the lightweight scene to the scene manager. The AC's scene manager may analyze the scene, create a necessary EAS discovery filter, and request the EES to perform EAS discovery through the ECS. The scene manager may receive a list of available EASs from the EES according to the request, select one EAS from the list, request the selected EAS to create a lightweight scene, and receive an entry point including the lightweight scene.

The EDGAR-based scene manager may determine that the UE's device capability may be insufficient for the UE alone to play the content received from the cloud/edge server and determine to use split rendering on all or some media resources of the content.

The UE may transmit the content and UE capability information to the server which has transmitted the entry point of the content. The UE may specify, in the UE capability information, whether the UE may execute per media resource or requests the server to do rendering and/or the performance level (e.g., 2D or 2D+3D) of rendering available to the UE.

The UE may modify the content entry point (e.g., scene description), indicate whether split rendering is needed in the lower element/property of the conventional node in the content entry point, or indicate the capability level of the UE for each node/media resource requiring rendering in a separate node.

The 5GMS AS may create an EAS KPI based on the UE's rendering request and request a new AS/EAS through the AF. The new AS/EAS creates a lightweight scene and creates necessary media resources (2D, 2D+3D rendering). The edge process may transmit the entry point of the lightweight scene.

The AR/MR scene manager may transmit the scene description and the device capability to the 5GMS AS. The 5GMS AS may derive EAS KPIs and, if necessary, select a new AS/EAS (through the AF) based on the new KPI. If the edge process starts, the new entry point URL may be provided to the AR/MR scene manager.

The AR/MR scene manager may request the scene description to derive EAS KPIs from the device capability and the AF to provide a suitable EAS list. Then, the AR/MR scene manager may select an AS/EAS and request to start an edge process in the ASA. If the edge process starts, the new entry point URL may be provided to the AR/MR scene manager.

In operation 2610, the AR/MR scene manager may request a simplified scene description. The edge process may derive the simplified scene description from the entire scene description and provide the simplified scene description to the AR/MR scene manager. In operation 2611, the simplified entry point including the simplified scene description may be processed. The operations between operation 2611 and operation 2620 (FIG. 26B) are the same as operations 2309 to 2316 of FIG. 23 and, for conciseness, are not repeated here.

In operation 2620, the media client may establish transport session(s) for obtaining the media content. In operation 2621, the 5GMSd AS may initiate and start a media session. The media session may form a status store session loop for each UE, including operations 2622 to 2625.

In operation 2622, the latest pose information may be obtained by the AR/MR scene manager and may be shared with the media client. In operation 2623, the media client may transmit the latest pose information to the 5GMSd AS.

In operation 2624, the 5GMSd AS may perform pre-rendering on the media based on the latest pose information. The pre-rendering may include decoding and rendering of immersive media and encoding of the rendered (2D) media. In operation 2625, the pre-rendered media may be transmitted the media client by the 5GMSd AS.

In operation 2626, the media client may decode and process the transferred media (e.g., media data) and additionally perform decoding on encrypted media data. In operation 2627, the media client may transfer the processed media data to the AR/MR scene manager. In operation 2628, the AR/MR scene manager may render the media and transfer the rendered media to the AR runtime. The AR runtime may perform additional processing, such as registering the AR content in the real world and performing pose correction.

Figure 27A:
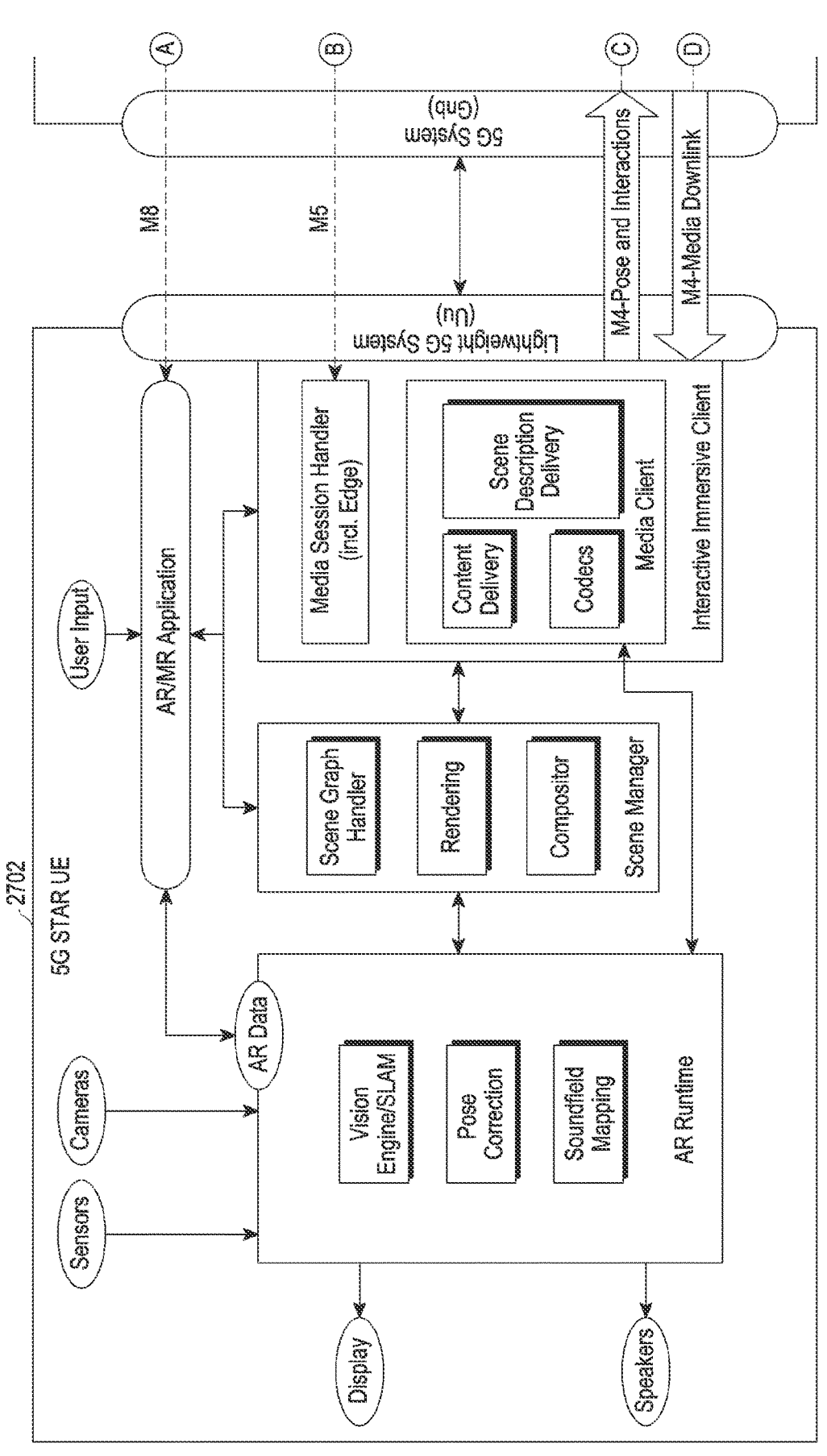
FIGS. 27A and 27B illustrate a system structure for a STAR-based interactive immersive service according to an embodiment.
Figure 27B:
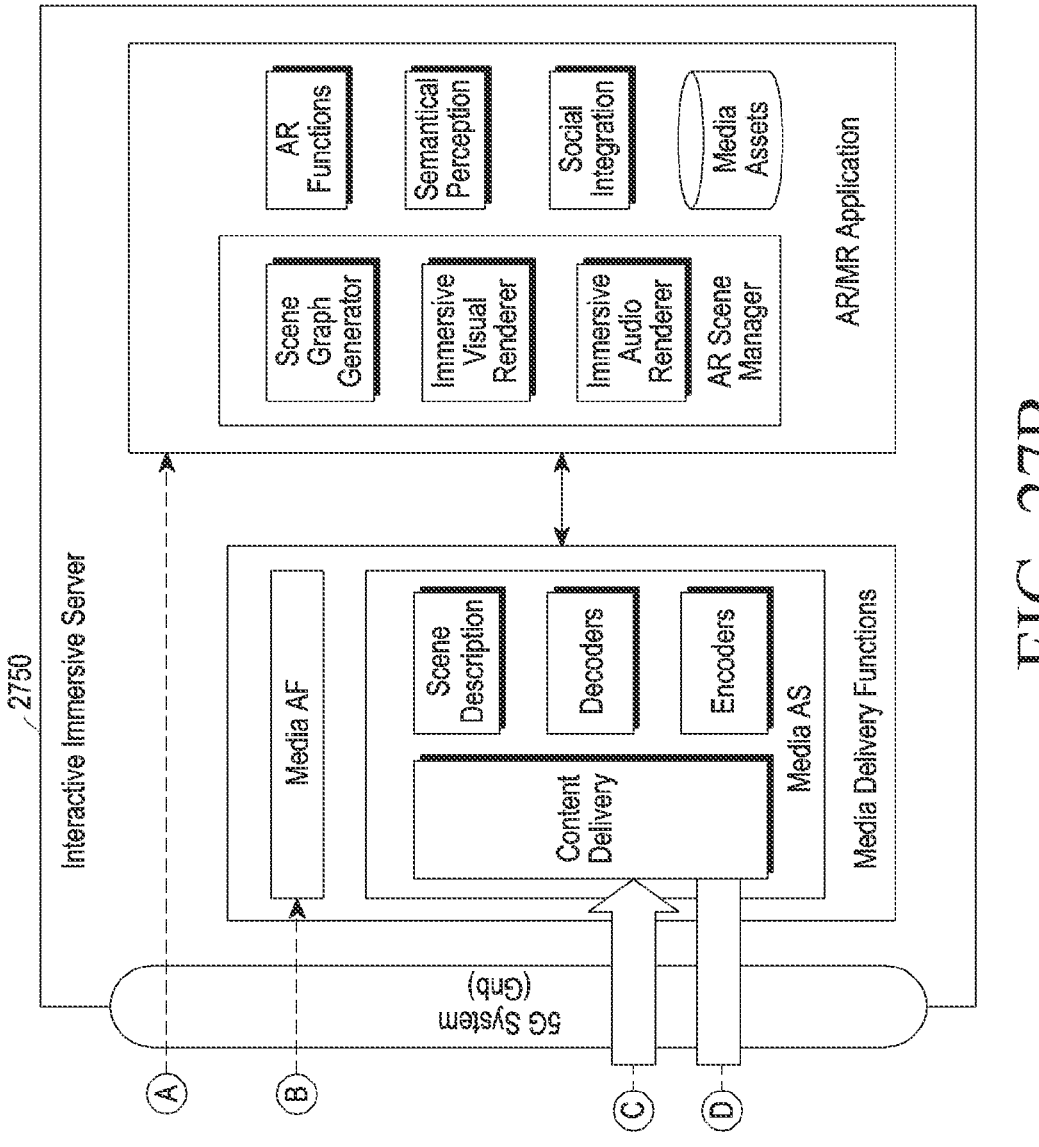

FIGS. 27A and 27B illustrate a system structure for a STAR-based interactive immersive service according to an embodiment. For the illustrated structure, e.g., the STAR-based structure of FIG. 6.3.3.1-1 of 3GPP TR 26.998 may be referenced.

Referring to FIG. 27A, a UE 2702 (e.g., a 5G STAR UE) may receive media content from a server 2750 (e.g., an interactive immersive server, illustrated in FIG. 27B). The server 2750 may support immersive interactive media distribution for the UE 2702.

Figure 28A:
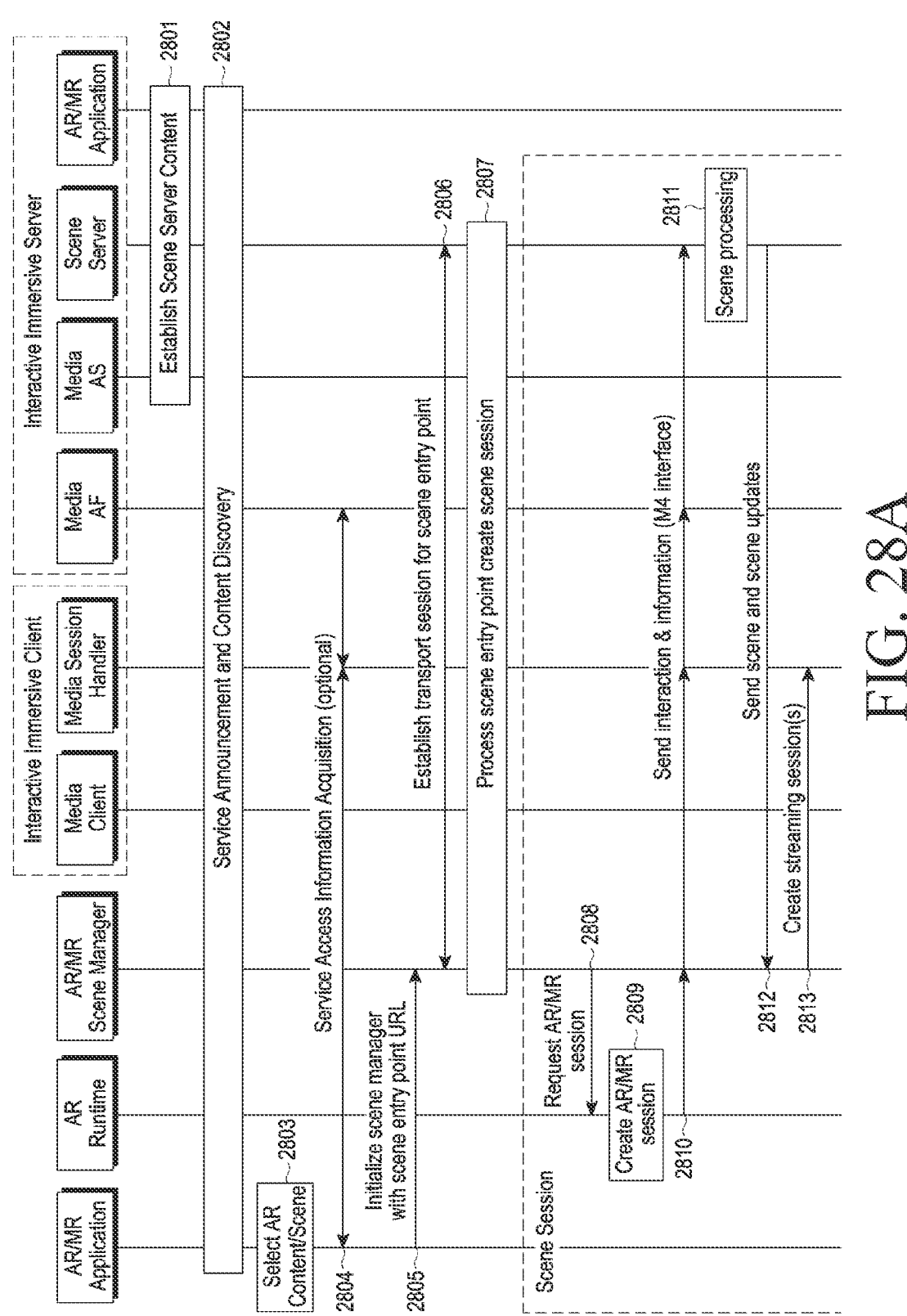
FIGS. 28A and 28B illustrate a STAR-based procedure for an interactive immersive service according to an embodiment.
Figure 28B:
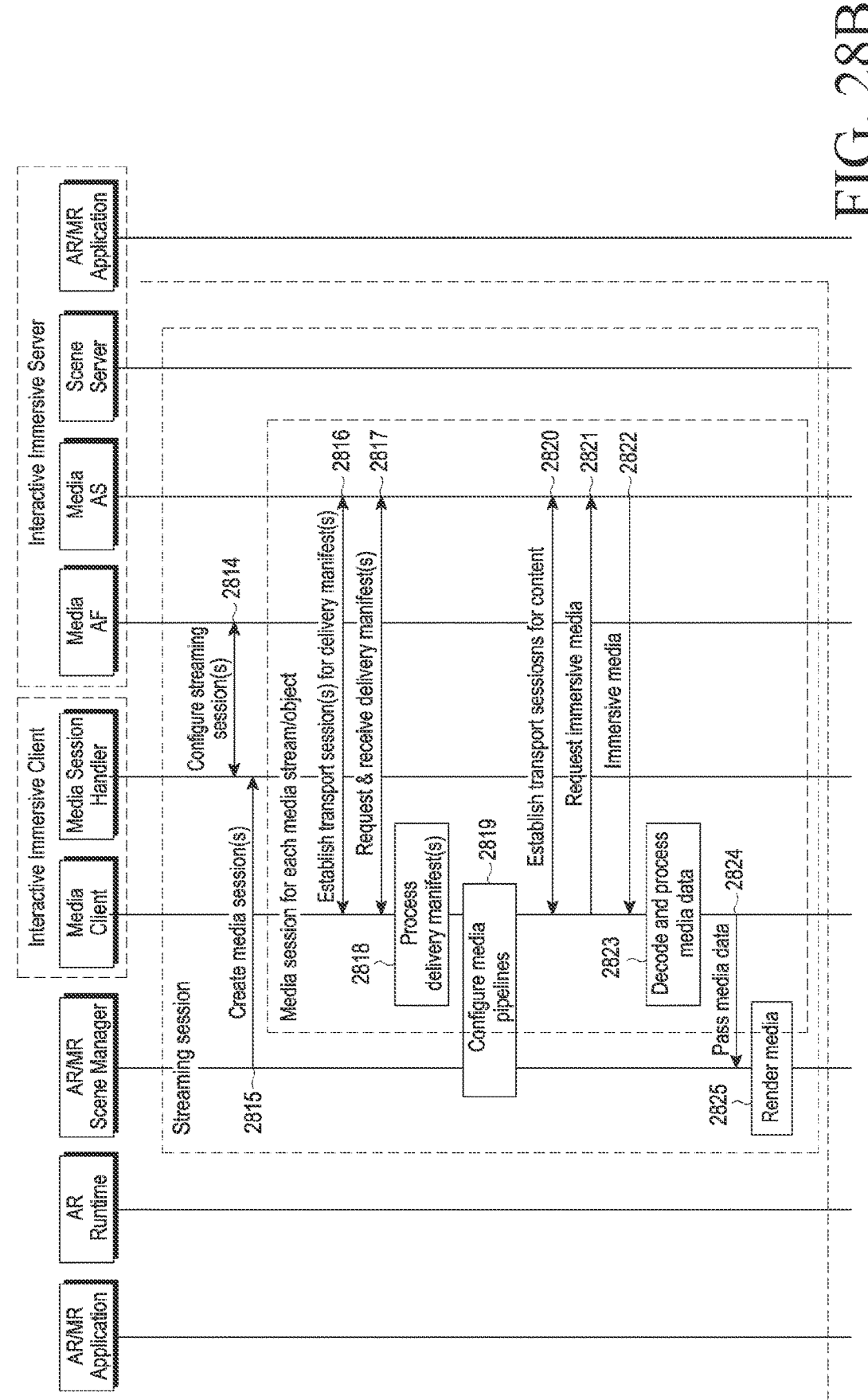

FIGS. 28A and 28B illustrate a STAR-based procedure for an interactive immersive service according to an embodiment. As an example, for the illustrated procedure, FIG. 6.3.4.1-1 of 3GPP TR 26.998 may be referenced.

Referring to FIG. 28A, the user interaction may be transmitted from the UE (e.g., the UE 2702) to the server (e.g., the server 2750), and the server may process a user request for the immersive media scene (e.g., context change, such as rotation scaling, translation) according to the user interaction. The processed scene may be re-transferred to the UE in a similar manner to immersive media streaming.

Referring to FIG. 28A, in operation 2801, a scene server context may be established between the AR/MR application and the media AS in the server (e.g., the server 2750). In operation 2802, service announcement and content discovery may be performed by, e.g., FIG. 29A and FIG. 29B.

Figure 29A:
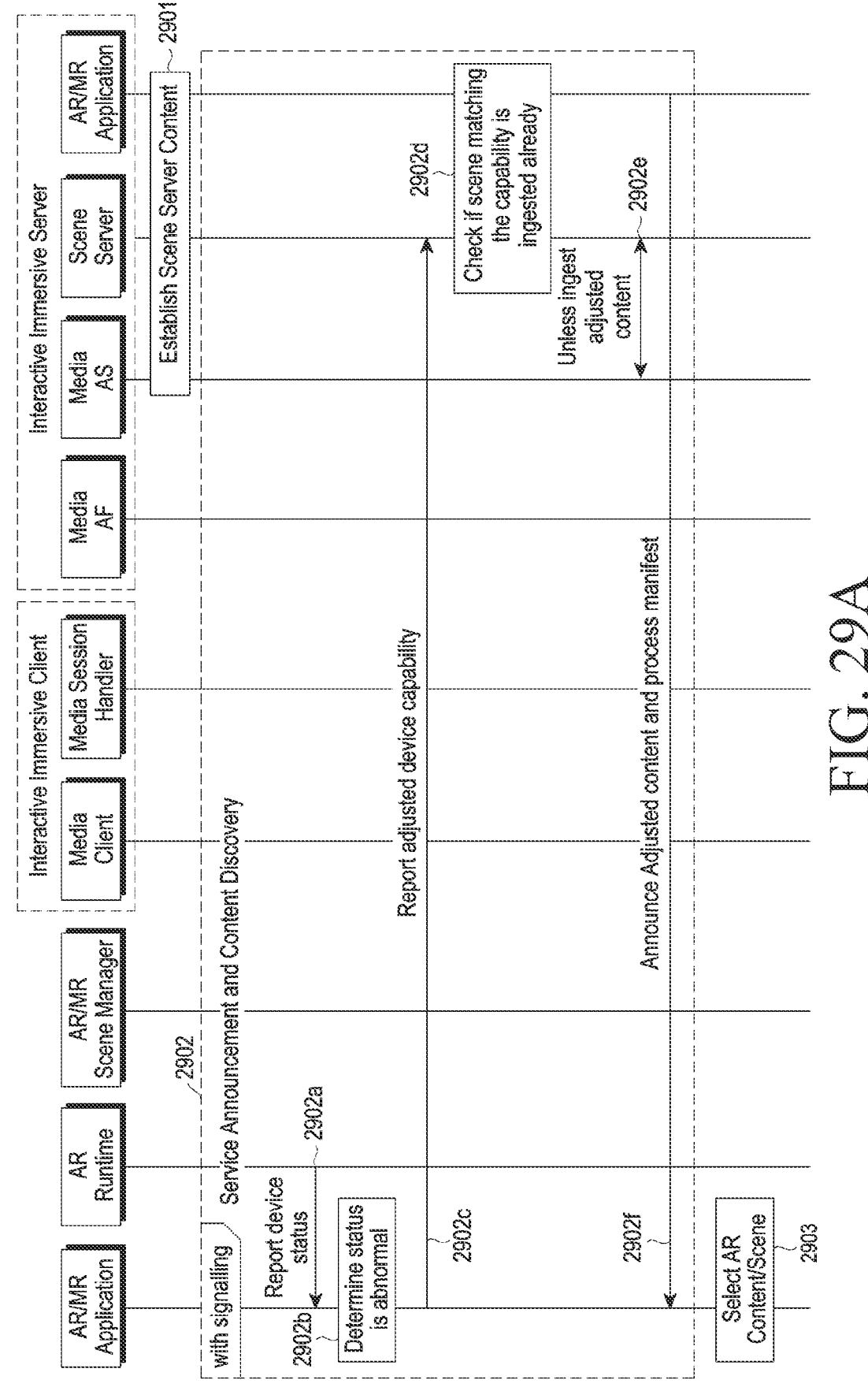
FIGS. 29A and 29B illustrate a service announcement and content discovery procedure according to an embodiment.
Figure 29B:
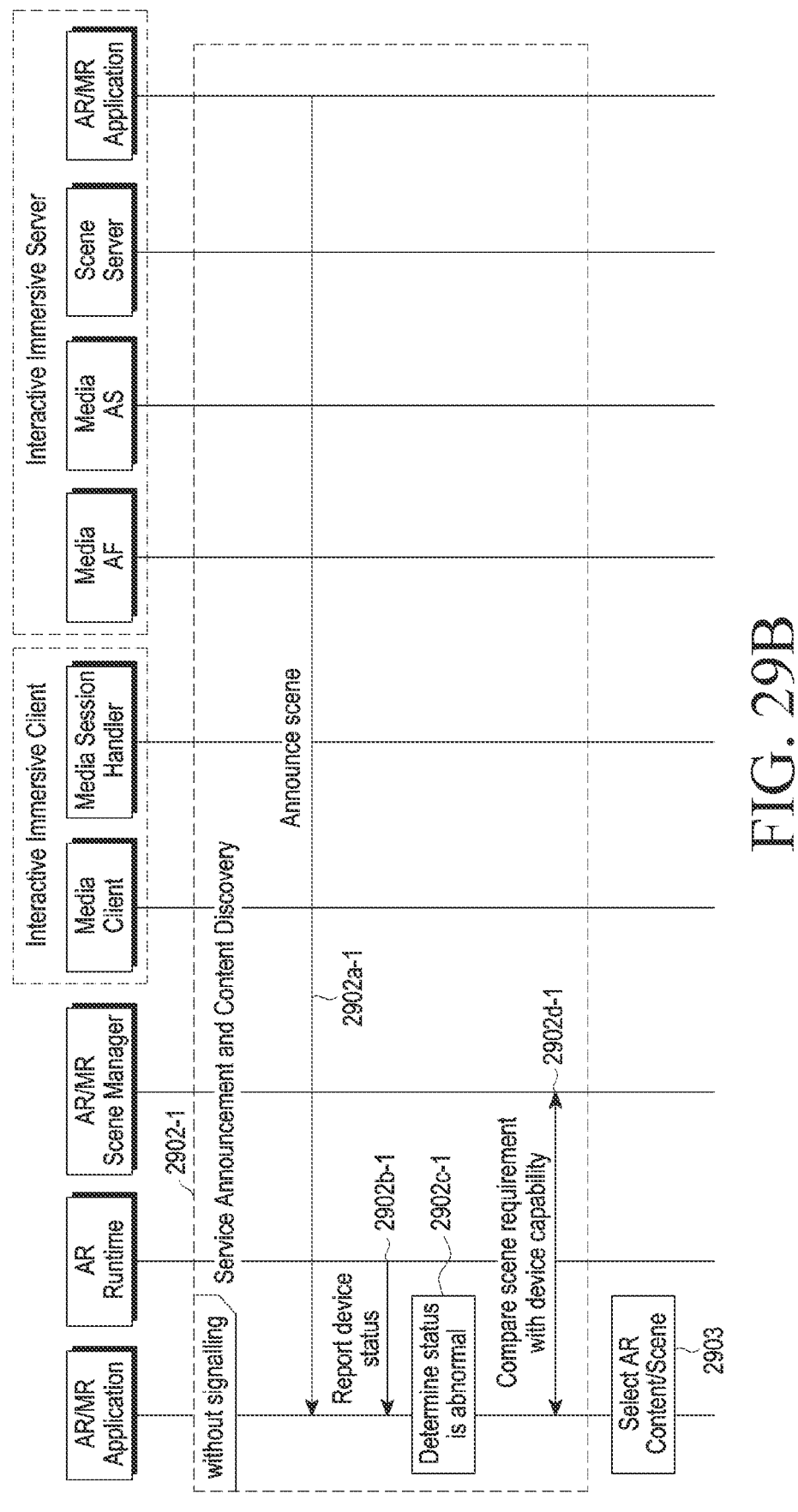

FIGS. 29A and 29B illustrate a service announcement and content discovery procedure according to an embodiment.

Referring to FIG. 29A, service announcement and content discovery may be performed in operation 2902 including signaling. Alternatively, operation 2902-1 may not include signaling.

Operation 2902 may be performed by a request based on the UE status, as an example, and may include operations 2902a to 2902f In operation 2902a, the AR runtime may transfer the device status to the AR/MR application. In operation 2902b, the AR/MR application may determine that the UE's status is abnormal based on the device status. In operation 2902c, the AR/MR application may transfer UE capability information including the adjusted device capability to the server's scene server. In operation 2902d, the scene server may determine whether a scene matching the device capability has already been ingested. If not present, in operation 2902e, the scene server may ingest adjusted content including the adjusted scene matching the device capability from the media AS. In operation 2902f, the server's AR/MR application may transfer the adjusted content and process manifest to the UE's AR/MR application through an announcement procedure. In operation 2903, the AR/MR application may select the adjusted content (e.g., adjusted scene).

Operation 2902-1 (FIG. 29B) may be performed by the UE's determination, without signaling, and may include operations 2902a-1 and 2902d-1, as an example. In operation 2902a-1, the UE's AR/MR application may receive a scene from the server's AR/MR application through an announcement procedure. In operation 2902b-1, the AR/MR application may receive a report of the device status including the device capability from the AR runtime and, in operation 2902c-1, determine that the UE's status is abnormal based on the device status. In operation 2902d-1, the AR/MR application may compare the requirement of the scene with the device capability, identifying a scene having the device capability. In operation 2903, the AR/MR application may select the adjusted content (e.g., adjusted scene).

Returning to operation 2803 of FIG. 28A, the UE's AR/MR application may select an AR content/scene, e.g., operation 2903. In operation 2804, the AR/MR application may obtain service access information from the media AF of the server, if necessary. In operation 2805, the AR/MR application may initialize the AR/MR scene manager using the scene entry point URL. In operation 2806, the AR/MR scene manager may establish a transport session for the scene session. In operation 2807, the AR/MR scene manager may process the scene entry point and create a scene session with the server's scene server. The UE may report the device capability to the server through the media session handler and, if necessary, the media AS may communicate with the scene server to create an adjusted scene. In operation 2808, the AR/MR scene manager may request an AR/MR session from the AR runtime. In operation 2809, the AR runtime may create an AR/MR session. For example, the UE status may be periodically reported to the server by the media session handler through the AR/MR session.

Figure 30:
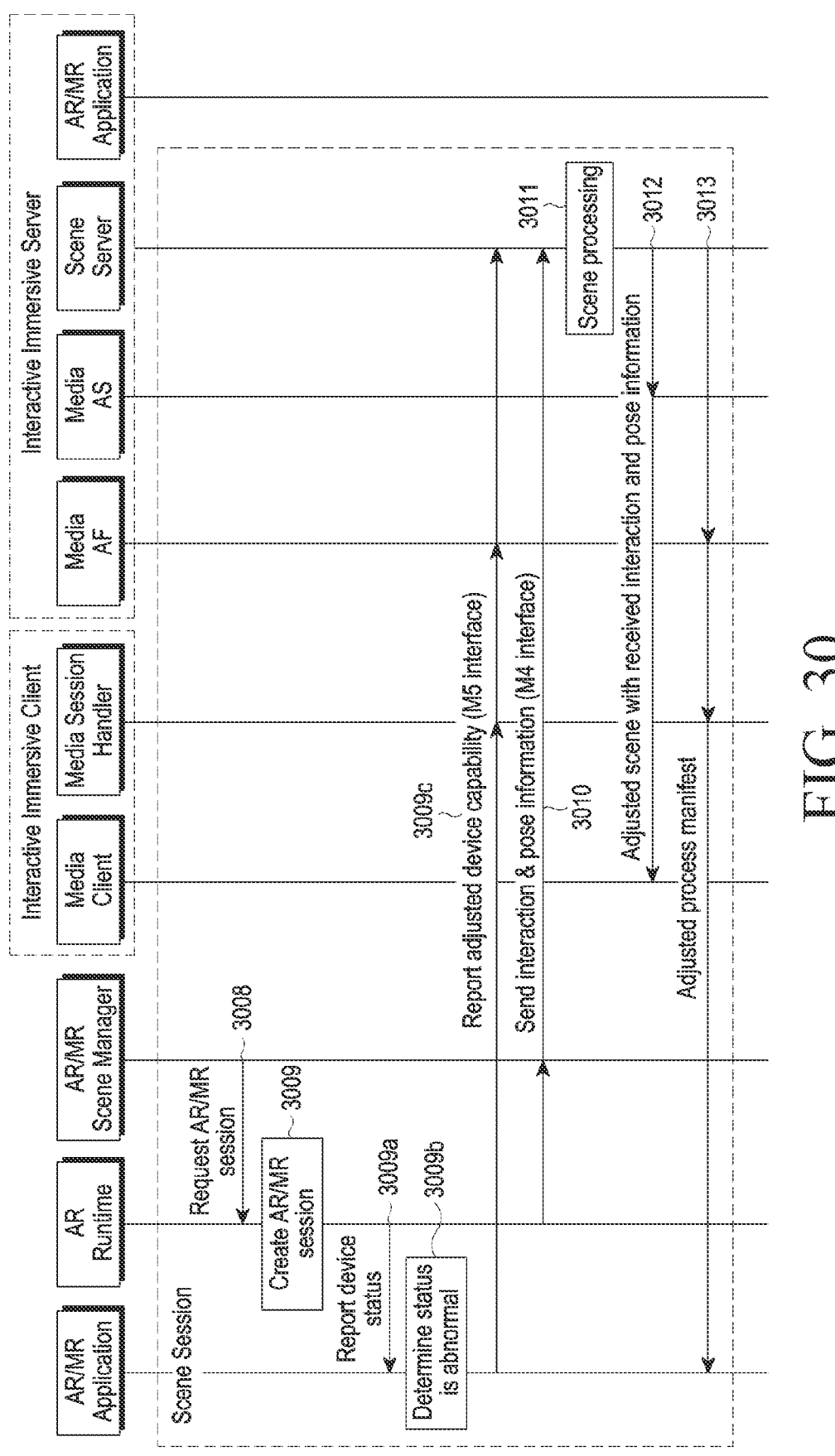
FIG. 30 illustrates a procedure of transferring an adjusted scene through a scene session according to an embodiment.

Operations 2808 to 2813 may be replaced with operations 3008 to 3013 of FIG. 30.

FIG. 30 illustrates a procedure of transferring an adjusted scene through a scene session according to an embodiment.

Operations 3008 and 3009 of FIG. 30 may be the same as operations 2808 and 2809 of FIG. 29A. In operation 3009a, the AR runtime may report the device status to the AR/MR application and, in operation 3009b, the AR/MR application may determine that the status of the UE is abnormal and execute operation 3009c. Operation 3009c may be the same as operation 2810. Operations 3010 to 3013 may be the same as operations 2810 to 2813 and detailed description is not repeated here, for conciseness.

In operation 2810 of FIG. 28A, the AR runtime may transfer the interaction and pose information to the scene server of the server through the M4 interface. In operation 2811, the scene server may perform scene processing and, in operation 2812, the scene server may transmit the processed scene and scene update to the UE's AR/MR scene manager. In operation 2813, the AR/MR manager may request the media session handler to create a streaming session.

In operation 2814 of FIG. 28B, the media session handler may configure a streaming session with the media AF. In operation 2815, the AR/MR scene manager may request the media session handler to create a media session. In operation 2816, the media AS may establish a transport session(s) for delivery manifest(s) with the media client. In operation 2817, the media client may request and receive the delivery manifests from the media AS.

Figure 31:
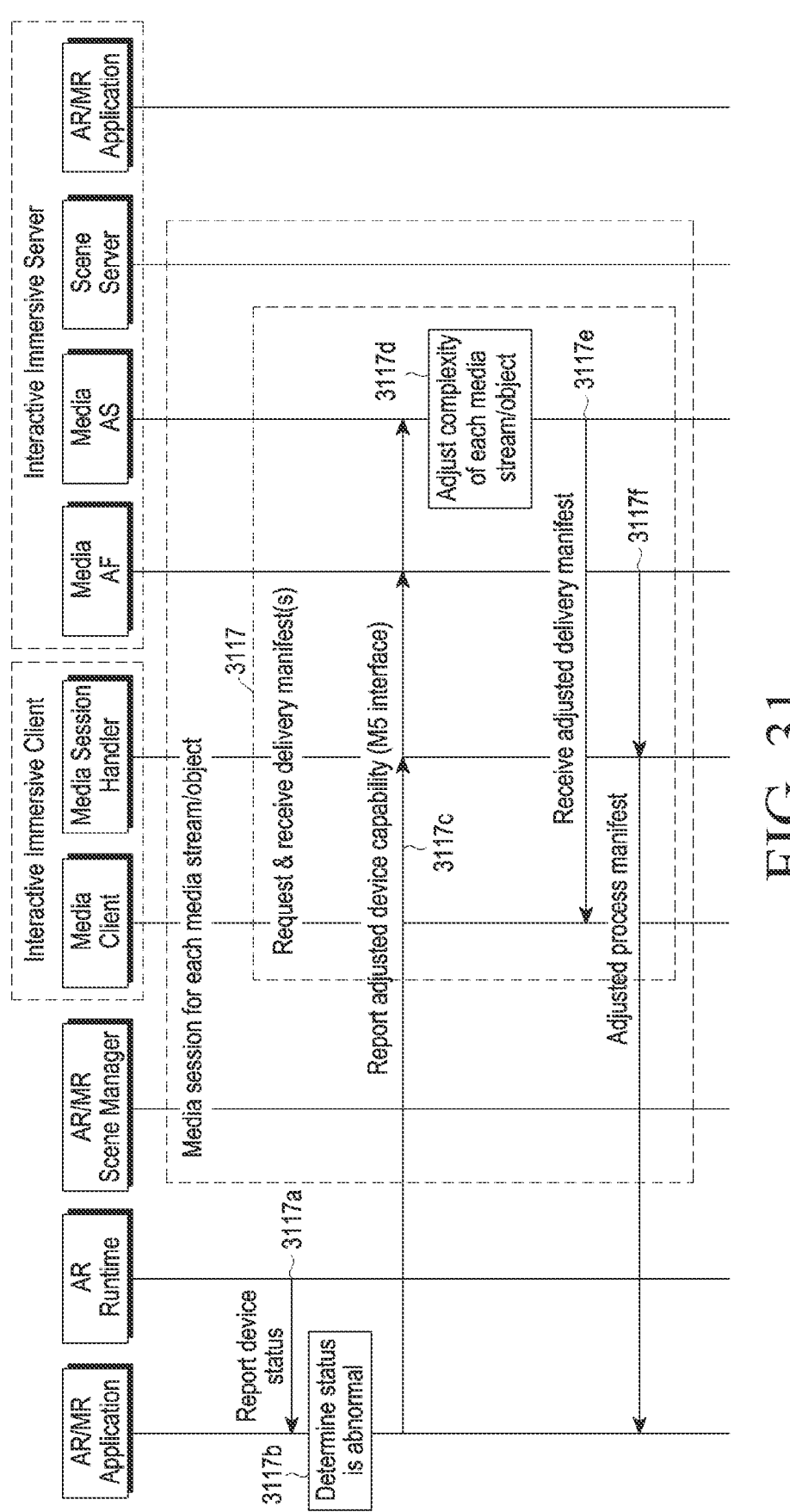
FIG. 31 illustrates a procedure of reporting adjusted device capability and changing the processing level of a media process based thereon according to an embodiment.

Operation 2817 may be replaced with operation 3117 of FIG. 31.

FIG. 31 illustrates a procedure of reporting adjusted device capability and changing the processing level of a media process based thereon according to an embodiment.

Referring to FIG. 31, operation 3117 for requesting and receiving delivery manifest(s) may include operations 3117c to 3117f.

In operation 3117a, the AR/MR application may receive a report of the device status from the AR runtime and, in operation 3117b, determine that the status of the UE is abnormal. In operation 3117c, the AR/MR application may transmit UE capability information including the adjusted device capability to the media AS through the media session handler and the media AF. In operation 3117d, the media AS may adjust the complexity for each media stream/object. In operation 3117e, the media AS may transfer the adjusted delivery manifest including the adjusted complexity to the media client. The media AF may transfer the process manifest adjusted through the media session handler to the UE's AR/MR application.

In operation 2818 of FIG. 28B, the UE's media client may process the delivery manifest(s). In operation 2819, the media client may configure media pipelines for the AR/MR scene manager. In operation 2820, the media client may establish transport sessions for content with the media AS of the server. In operation 2821, the media client may request immersive media from the media AS. In operation 2822, the media AS may transfer immersive media to the media client. In operation 2823, the media client may decode and process media data and, in operation 2824, transfer the processed media data to the AR/MR scene manager. In operation 2825, the AR/MR scene manager may render the transferred media.

Figure 32A:
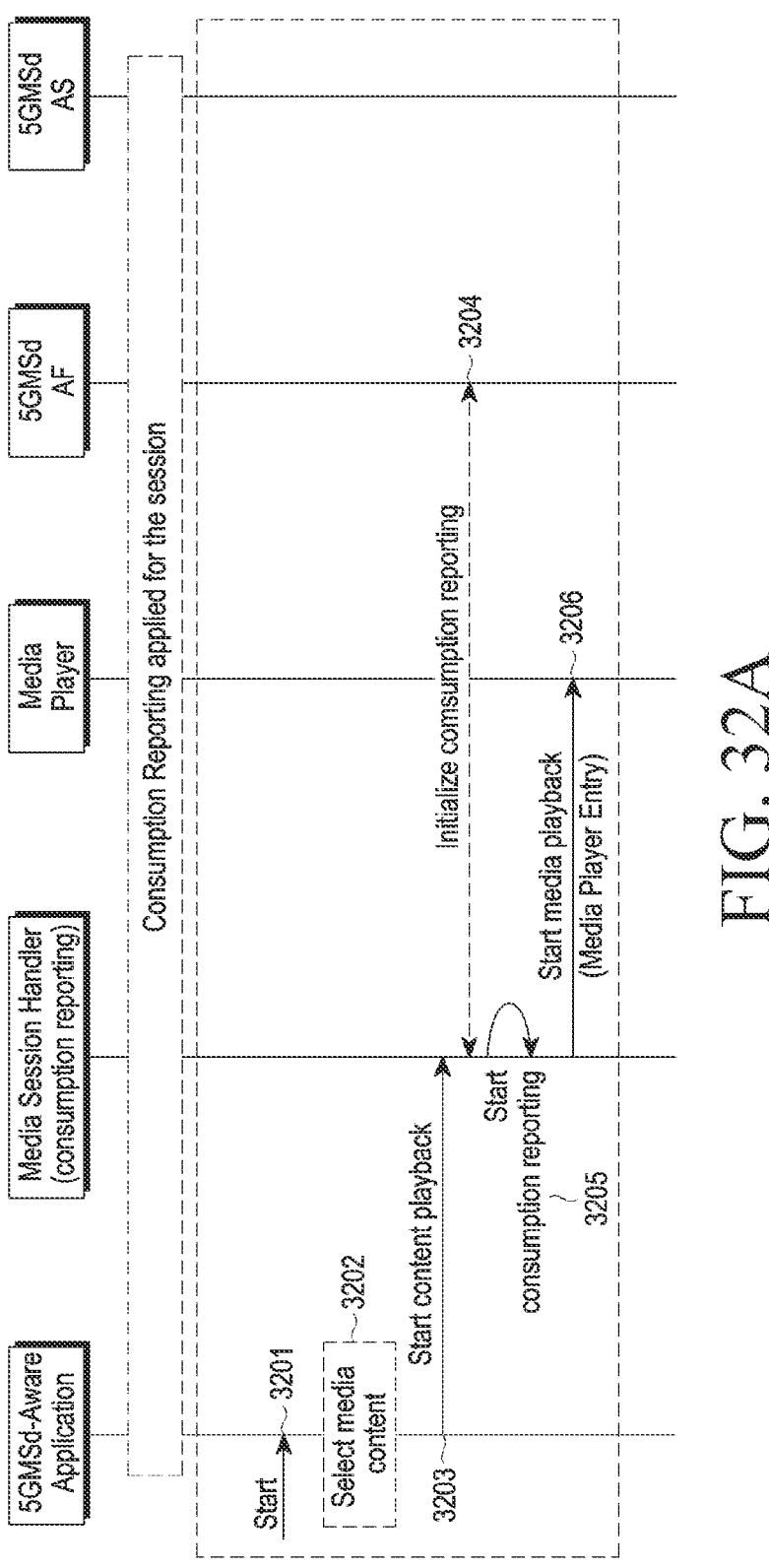
FIGS. 32A and 32B illustrate a consumption reporting procedure according to an embodiment.
Figure 32B:
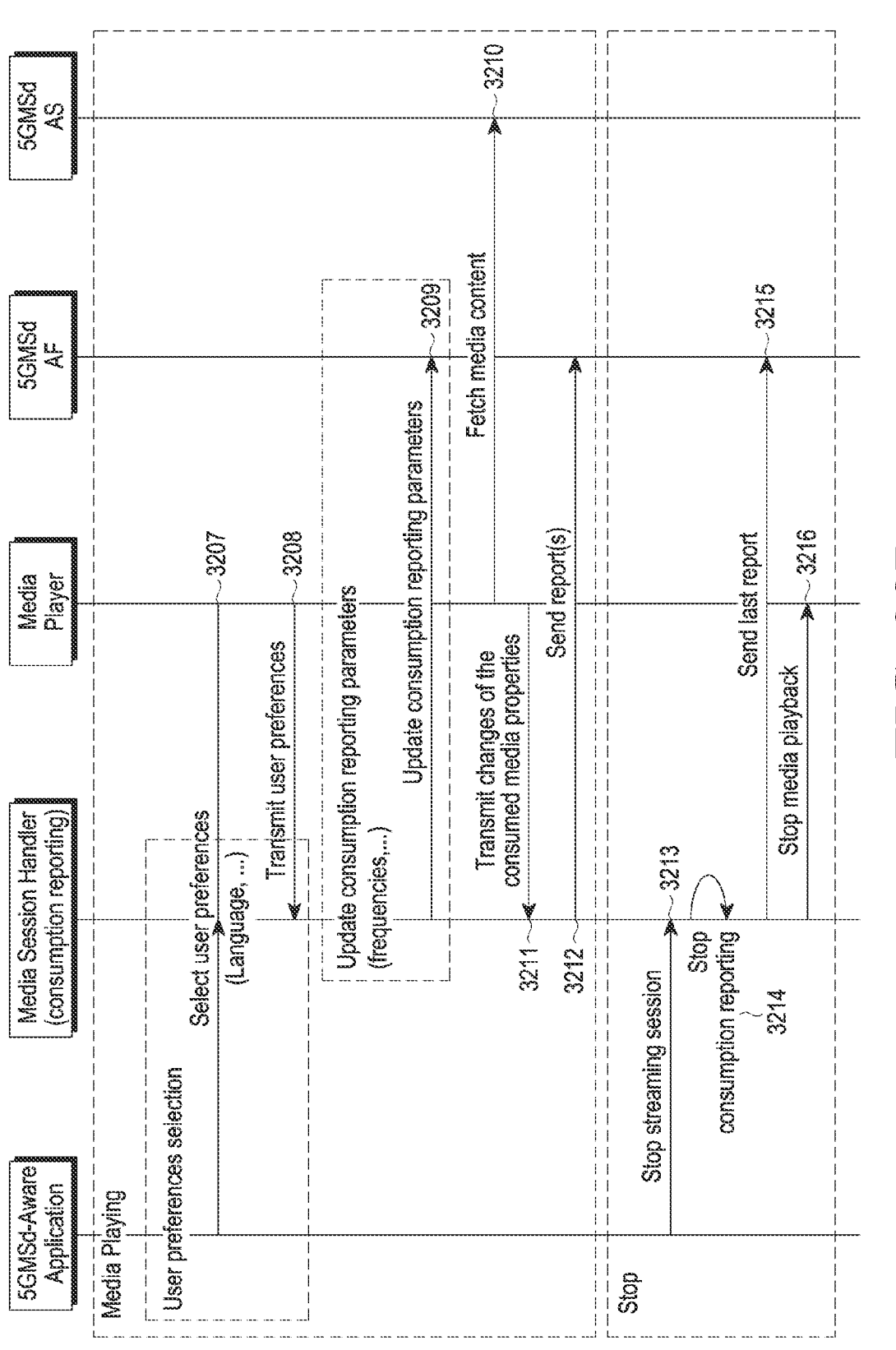

FIGS. 32A and 32B illustrate a consumption reporting procedure according to an embodiment. As an example, for the illustrated procedure, FIG. 5.6-1 of 3GPP TS 26.501 may be referenced.

Referring to FIG. 32A, in operation 3201, the UE's application (e.g., 5GMSd-aware application) may be initiated and, in operation 3202, the application may select media content. In operation 3203, the application may trigger the media session handler to start content playback. The media player entry may be provided. In operation 3204, the server's media AF (e.g., the 5GMSd AF) may initialize parameters (e.g., frequency) for configuring consumption reporting. In operation 3205, the media session handler may trigger consumption reporting.

In operation 3206, the media session handler may start the media player using the media player entry. In operation 3207 (FIG. 32B), the application may select and/or change the user preference. In operation 3208, the media player may transmit the consumption reporting user preference to the media session handler. When media is being played back, the consumption reporting parameter may be updated.

In operation 3209, the server's 5GMSd AF may update the consumption reporting parameters. When media is being played back, the media player may access the media content in operation 3210. In operation 3211, when changed into the consumed media properties, the media player may transmit the changes to the media session handler. In operation 3212, the media session handler may transmit the consumption report to the media AF (e.g., 5GMSd AF).

In operation 3213, the application may trigger the media session handler to stop content playback. In operation 3214, the media session handler may stop consumption reporting. In operation 3215, the media session handler may transmit the last consumption report to the media AF. In operation 3216, the media session handler may stop the media player.

An example of the consumption reporting unit reported by the UE is as shown in FIG. 10.

Figure 33:
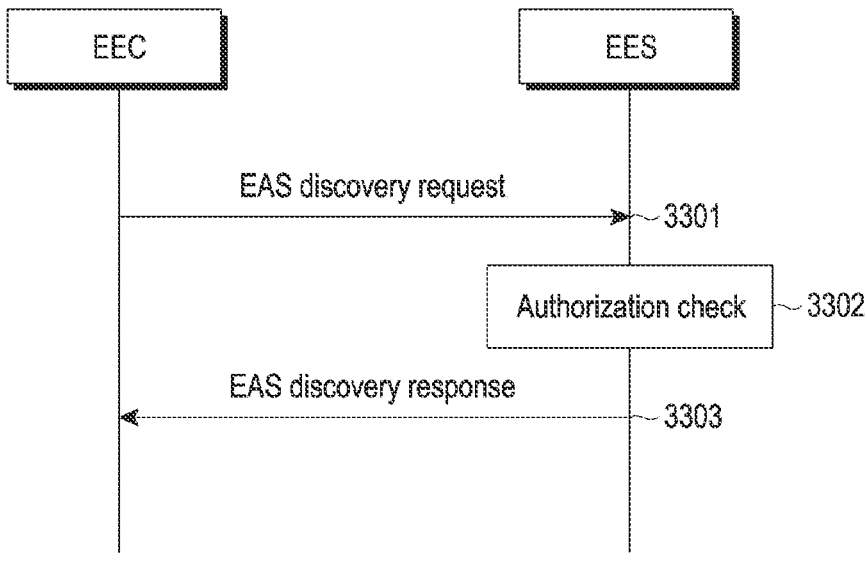
FIG. 33 illustrates an EAS discovery procedure according to an embodiment.

FIG. 33 illustrates an EAS discovery procedure according to an embodiment. For the illustrated procedure, FIG. 8.5.2.2-1 of 3GPP TS 23.558 may be referenced.

Referring to FIG. 33, in operation 3301, the EEC (e.g., the UE's media session handler) may transmit an EAS discovery request message to the EES (e.g., the server's media AF). The request message may include EAS discovery filter(s). In operation 3302, according to reception of the request message, the EES may determine whether the EEC is authenticated to discover the requested EAS. When the EEC is authenticated, in operation 3303, the EES may transfer information about the discovered EAS(s) to the EEC through an EAS discovery response message. For the discovered EASs, the information may include endpoint information.

FIG. 34 illustrates information elements of an EAS discovery filter according to an embodiment.

Referring to FIG. 34, an EAS discovery filter 3400 may include the EAS discovery request message of operation 3301, and the EES may identify EAS(s) based on the UE position and information elements included in the EAS discovery filter 3400.

FIG. 35 illustrates an AC service KPI for transferring device capability according to an embodiment. An AC service KPI 3500 according to the illustrated format may be used, e.g., to represent the execution capability of the own process in the UE, the UE's AC, or EEC.

Figure 36:
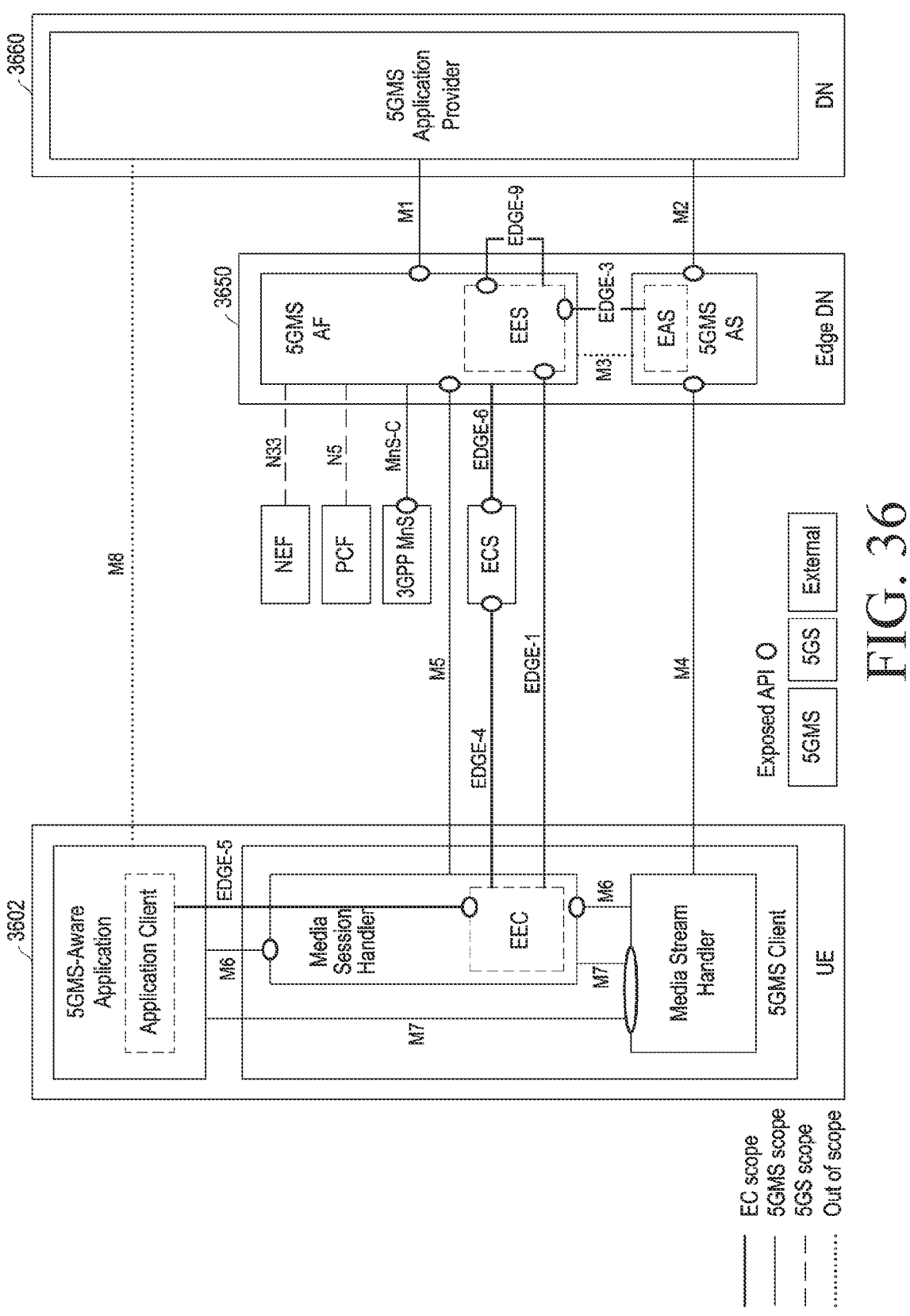
FIG. 36 illustrates session establishment in an EMSA structure according to an embodiment.

FIG. 36 illustrates session establishment in an EMSA structure according to an embodiment. For the illustrated procedure, e.g., the structure of FIG. 8 of 3GPP TR 26.803 may be referenced and be applied to the above-described procedure of FIG. 14, 20, or 21.

Referring to FIG. 36, in the EMSA structure, the UE 3602 may include a media session handler and a media stream handler in the media client (e.g., 5GMS client). The media session handler may operate as an EEC. The edge data network (edge DN) 3650 may include a media AF (e.g., 5GMS AF) operating as an EES and a media AS (e.g., 5GMS AS) operating as an EAS.

For a session establishment procedure driven by the UE using the illustrated structure, client-driven session establishment of FIG. 9 of 3GPP TS 26.803 may be referenced.

The application provider (e.g., ASP) 3660 may communicate with the AF to create an AR split rendering session. The UE's application (e.g., AR application) may communicate with the ECS through the EEC of the media session handler to receive information about the EES of the media AF. The EEC may register with the selected EES and contact the EES to request one or more EASs. The EES may search for available EASs of the KPI requested by the EEC and request the MnS to create a new EAS. The MnS may create a new EAS providing the requested capability, and a newly instantiated EAS may be configured. The EAS may register itself with the EES. The EES may configure provisioned features of the EAS according to a request of the EEC. The EES may transfer a list of available EASs including the EAS to the EEC. The AC may receive the EAS list from the EEC and select one EAS instance from the list based on a desired condition.

The methods according to the embodiments may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described herein.

The programs (software modules or software) may be stored in random access memories, non-volatile memories including flash memories, ROMs, electrically erasable programmable read-only memories (EEPROMs), magnetic disc storage devices, compact-disc ROMs, digital versatile discs DVDs), or other types of optical storage devices, or magnetic cassettes. Alternatively, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WLAN), or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an," and "the" are intended to include the plural forms as well, unless the context clearly indicates otherwise.

In the drawings illustrating methods according to embodiments, the order of description is not necessarily identical to the order of execution, and some operations may be performed in a different order or simultaneously.

Some of the components shown in the drawings illustrating methods according to embodiments may be omitted to such an extent as not to impair the gist or essence of the disclosure.

The methods in the disclosure may be performed in a combination of all or some of the embodiments described herein to such an extent as not to impair the gist or essence of the disclosure.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a user equipment (UE) for providing capability-based split computing, the method comprising:

measuring, by a hardware-component of the UE, a performance parameter of the UE based on an environment parameter for the UE;

determining, by a hardware-processor of the UE, an abnormal status of the UE based on the environment parameter and the performance parameter;

transmitting, by the hardware-processor via a transceiver, to a server, a message including information on UE capability related to the environment parameter and the performance parameter, wherein the UE capability is adjusted based on the determined abnormal status and the UE capability indicates UE requirements for the server;

receiving, by the hardware-processor via the transceiver, from the server, first information on adjusted content and second information on an adjusted process, according to the UE capability information, wherein the second information includes a process manifest, and the adjusted content meets the UE requirements; and executing the adjusted process to receive the adjusted content, wherein the environment parameter includes a temperature of the UE, a voltage of the UE, and an operation frequency of the UE, wherein the performance parameter includes:

first latency information indicating a time taken by the UE from reception of rendered result to display, second latency information indicating a time taken for the UE to decode one or more media, position the decoded one or more media on 3-dimension, and composite them, and frame-drop information indicating a number of frames that are not finally rendered relative to a target frame per second (fps) of content, wherein the adjusted process is determined, according to the performance degradation of the UE, as adjusting process complexity or deleting a process, and wherein the process manifest is created according to at least one of a scheme for specifying a process, a scheme for specifying a complexity of the process, a scheme for specifying a target performance for each option according to the complexity of the process.

2. The method of claim 1, wherein the information on the UE capability includes adjusted device capability of the UE according to at least one of the environment parameter and the performance parameter.

3. The method of claim 1, wherein the information on the UE capability is transferred to the server in a provisioning phase or a streaming phase of a call flowchart.

4. The method of claim 1, wherein the information on the UE capability is transferred through an M8 interface between an application of the UE and an application service provider (ASP) in a provisioning phase for a standalone (STAR) augmented reality (AR)-based call flow.

5. The method of claim 1, wherein the information on the UE capability is transferred through an M5 interface or an M4 interface between an application of the UE and an application server (AS) in a provisioning phase for a STAR-based call flow.

6. The method of claim 1, wherein the information on the UE capability is transferred from a media session handler of the UE to a media application function (AF) of the server in a provisioning phase for a streaming architecture extension for edge processing (EMSA)-based client driven call flow.

7. The method of claim 1, wherein the information on the UE capability is transferred from a media session handler of the UE to a media application function (AF) of the server in a provisioning phase of a call flow for a streaming architecture extension for edge processing (EMSA)-based split rendering.

8. The method of claim 1, wherein the information on the UE capability is transferred to a media application server (AS) of the server through at least one of an augmented reality (AR) session, a mixed reality (MR) session, an interactive scene session, or an interactive media session in a streaming phase of a call flow.

9. The method of claim 1, wherein the process manifest includes at least one of decoding, encoding, rendering, encryption, decryption, compositing, displaying, pose sensing, pose correcting, feature extracting, feature matching, anchor mapping, object tracking, hand tracking, or eye tracking.

10. The method of claim 1, further comprising:

triggering consumption reporting based on parameters for a consumption reporting configuration being initialized while playing back media including the adjusted content;

transmitting updated consumption reporting parameters to the server; and transmitting a consumption report based on the updated consumption reporting parameters to the server.

11. A user equipment (UE) configured to provide capability-based split computing, the UE comprising:

a transceiver;

a hardware component; and a hardware-processor operatively connected with the transceiver, wherein the hardware-processor is configured to:

measure a performance parameter of the UE based on an environment parameter for the UE;

determine an abnormal status of the UE based on the environment parameter and the performance parameter;

transmit, to a server, a message including information on UE capability related to the environment parameter and the performance parameter, wherein the UE capability is adjusted based on the determined abnormal status and the UE capability indicates UE requirements for the server;

receive, from the server, first information on adjusted content and second information on an adjusted process according to the UE capability information, wherein the second information includes a process manifest and the adjusted content meets the UE requirements; and execute the adjusted process to receive the adjusted content, wherein the environment parameter includes a temperature of the UE, a voltage of the UE, and an operation frequency of the UE, wherein the performance parameter includes:

first latency information indicating a time taken by the UE from reception of rendered result to display, second latency information indicating a time taken for the UE to decode one or more media, position the decoded one or more media on 3-dimension, and composite them, and frame-drop information indicating a number of frames that are not finally rendered relative to a target frame per second (fps) of content, wherein the adjusted process is determined, according to the performance degradation of the UE, as adjusting process complexity or deleting a process, and wherein the process manifest is created according to at least one of a scheme for specifying a process, a scheme for specifying a complexity of the process, a scheme for specifying a target performance for each option according to the complexity of the process.

12. The UE of claim 11, wherein the information on the UE capability includes adjusted device capability of the UE according to at least one of the environment parameter and the performance parameter.

13. The UE of claim 11, wherein the information on the UE capability is transferred to the server in a provisioning phase or a streaming phase of a call flowchart.

14. The UE of claim 11, wherein the information on the UE capability is transferred through an M8 interface between an application of the UE and an application service provider (ASP) in a provisioning phase for a standalone (STAR) augmented reality (AR)-based call flow.

15. The UE of claim 11, wherein the information on the UE capability is transferred through an M5 interface or an M4 interface between an application of the UE and an application server (AS) in a provisioning phase for a STAR-based call flow.

16. He UE of claim 11, wherein the information on the UE capability is transferred from a media session handler of the UE to a media application function (AF) of the server in a provisioning phase for a streaming architecture extension for edge processing (EMSA)-based client driven call flow.

17. The UE of claim 11, wherein the information on the UE capability is transferred from a media session handler of the UE to a media application function (AF) of the server in a provisioning phase of a call flow for a streaming architecture extension for edge processing (EMSA)-based split rendering.

18. The UE of claim 11, wherein the information on the UE capability is transferred to a media application server (AS) of the server through at least one of an augmented reality (AR) session, a mixed reality (MR) session, an interactive scene session, or an interactive media session in a streaming phase of a call flow.

19. The UE of claim 11, wherein the process manifest includes at least one of decoding, encoding, rendering, encryption, decryption, compositing, displaying, pose sensing, pose correcting, feature extracting, feature matching, anchor mapping, object tracking, hand tracking, or eye tracking.

20. The UE of claim 11, wherein the hardware-processor is further configured to:

trigger consumption reporting based on parameters for a consumption reporting configuration being initialized while playing back media including the adjusted content;

transmit updated consumption reporting parameters to the server; and transmit a consumption report based on the updated consumption reporting parameters to the server.

* * * * *